United States Patent
Oxford et al.

(10) Patent No.: US 12,210,867 B2
(45) Date of Patent: Jan. 28, 2025

(54) COMPILED SHADER PROGRAM CACHES IN A CLOUD COMPUTING ENVIRONMENT

(71) Applicant: NVIDIA Corporation, Santa Clara, CA (US)

(72) Inventors: Michael Oxford, San Jose, CA (US);
Patrick Neill, Sherwood, OR (US);
Franck Diard, Roquefort les pins (FR);
Paul Albert Lalonde, Victoria (CA)

(73) Assignee: NVIDIA Corporation, Santa Clara, CA (US)

( * ) Notice: Subject to any disclaimer, the term of this patent is extended or adjusted under 35 U.S.C. 154(b) by 447 days.

(21) Appl. No.: 17/473,850

(22) Filed: Sep. 13, 2021

(65) Prior Publication Data
US 2023/0077865 A1    Mar. 16, 2023

(51) Int. Cl.
*G06F 8/70* (2018.01)
*G06F 8/10* (2018.01)
*G06F 8/41* (2018.01)
*G06F 9/455* (2018.01)
*G06T 1/60* (2006.01)
*G06T 15/80* (2011.01)

(52) U.S. Cl.
CPC .............. *G06F 8/70* (2013.01); *G06F 8/10* (2013.01); *G06F 8/441* (2013.01); *G06F 9/45558* (2013.01); *G06T 1/60* (2013.01); *G06T 15/80* (2013.01); *G06F 2009/45562* (2013.01); *G06F 2009/45595* (2013.01)

(58) Field of Classification Search
CPC ... G06F 8/70; G06F 8/10; G06F 8/441; G06F 9/45558; G06F 2009/45562; G06F 2009/45595; G06F 8/71; G06F 2009/4557; G06F 8/41; G06T 1/60; G06T 15/80; G06T 1/20; G06T 15/005
See application file for complete search history.

(56) References Cited

U.S. PATENT DOCUMENTS

| | | |
|---|---|---|
| 10,423,463 B1 | 9/2019 | Wilt |
| 11,069,119 B1 | 7/2021 | Anderegg |
| 11,240,348 B2 | 2/2022 | Vlachogiannis et al. |
| 11,726,755 B2 * | 8/2023 | Lalonde ................ G06N 3/105 |
| | | 717/140 |
| 2016/0070549 A1 | 3/2016 | Hall |
| 2016/0307364 A1 | 10/2016 | Fabius |
| 2017/0308364 A1 | 10/2017 | Munshi et al. |
| 2018/0286008 A1 | 10/2018 | Panneer et al. |
| 2019/0232164 A1 | 8/2019 | Griffais |
| 2019/0308099 A1 | 10/2019 | Lalonde et al. |
| 2020/0167985 A1 | 5/2020 | Brennan |
| 2021/0065441 A1 | 3/2021 | Colbert et al. |
| 2023/0376291 A1 * | 11/2023 | Lalonde ................ G06T 1/20 |

FOREIGN PATENT DOCUMENTS

CN    107 426286 A    12/2017

OTHER PUBLICATIONS

Sitthi-Amorn et al., "An Improved Shading Cache for Modern GPUs", 2008, [Online], pp. 95-101, [Retrieved from internet on Feb. 24, 2023],<https://diglib.eg .org/bitstream/handle/10.2312/EGGH.EGGH08.095-101/095-101.pdf? sequence=1 &isAllowed=y> (Year: 2008).

* cited by examiner

*Primary Examiner* — Chong Wu
(74) *Attorney, Agent, or Firm* — LOWENSTEIN SANDLER LLP

(57) ABSTRACT

Apparatuses, systems, and techniques for a compiled shader program caches in a cloud computing environment.

20 Claims, 22 Drawing Sheets

| SHADER KEY 404 | SHADER VALUE 406 | MEMORY ADDRESS 408 |
|---|---|---|
| 916K3D | 3S09V2S3N3 | 0x10010000 |
| 8N3020 | 74FSW238FN | 0x10010010 |
| 916K3D | KLHF4C3H90 | 0x10010018 |

FIG. 4

| SHADER KEY 504 | SHADER VALUE 506 | CLIENT DEVICE IDs 508 | TEMPORARY BUFFER MEMORY ADDRESS 510 | VALIDATION COUNTER 512 |
|---|---|---|---|---|
| 3DS02F | 3DDG538WD | 1001, 1580,...2671 | 0x00000142 | 14 |
| FD93X3 | ZDG26SF29 | 1008, 1001,...6894 | 0x00000144 | 9 |
| 66HY32 | 25FW5FN20 | 2010 | 0x00000146 | 1 |

Receive a request to modify a shader cache for an application in view of an aggregated set of compiled shader programs for the application 710

Validate a respective compiled shader program of the set of compiled shader programs 712

Modify the shader cache in view of the respective compiled shader program 714

Detect that an instance of the application is initialized at a client device 716

Provide an additional set of compiled shader programs from the modified shader cache to the client device 718

FIG. 7

COMPILED SHADER PROGRAM CACHES IN A CLOUD COMPUTING ENVIRONMENT

TECHNICAL FIELD

At least one embodiment pertains to processing resources used to perform and facilitate operations for an aggregated compiled shader program cache (referred to as an aggregated shader cache herein). For example, at least one embodiment pertains to processors or computing systems used to provide and enable one or more computing systems of a cloud computing environment to access, and in some instances modify, an aggregated compiled shader program cache that is hosted by an application hosting platform, according to various novel techniques described herein.

BACKGROUND

Shader programs are programs executed by a processing device to perform particular tasks for an application running at a computing system. For example, shader programs may be executed by a processing device to render graphics for an application. In another example, shader programs may be executed by a processing device to perform general purpose computing tasks on a graphics processing unit (GPU) or machine learning tasks. A compiler of the computing system may compile a shader program and the processing device may execute the compiled shader program once the shader program is referenced by the application. An application may reference thousands or hundreds of thousands of distinct shader programs during application runtime, which each may take a significant amount of time to compile. Shader programs of an application may be compiled and stored at a cache at the computing system prior to the application runtime. However, existing techniques for shader program caching are computationally expensive and typically do not provide a significant performance benefit at the computing system. Additionally, existing shader program caching techniques usually cannot be implemented for applications hosted on a cloud computing environment in accordance with network and system performance constraints.

BRIEF DESCRIPTION OF DRAWINGS

Various embodiments in accordance with the present disclosure will be described with reference to the drawings, in which:

FIG. 4 depicts an example shader cache data structure, according to at least one embodiment;

FIG. 5 depicts an example temporary buffer data structure, according to at least one embodiment;

FIG. 7 illustrates a flow diagram of an example method of hosting an aggregated shader cache for applications in a cloud computing environment, according to at least one embodiment;

DETAILED DESCRIPTION

Figure 1A:
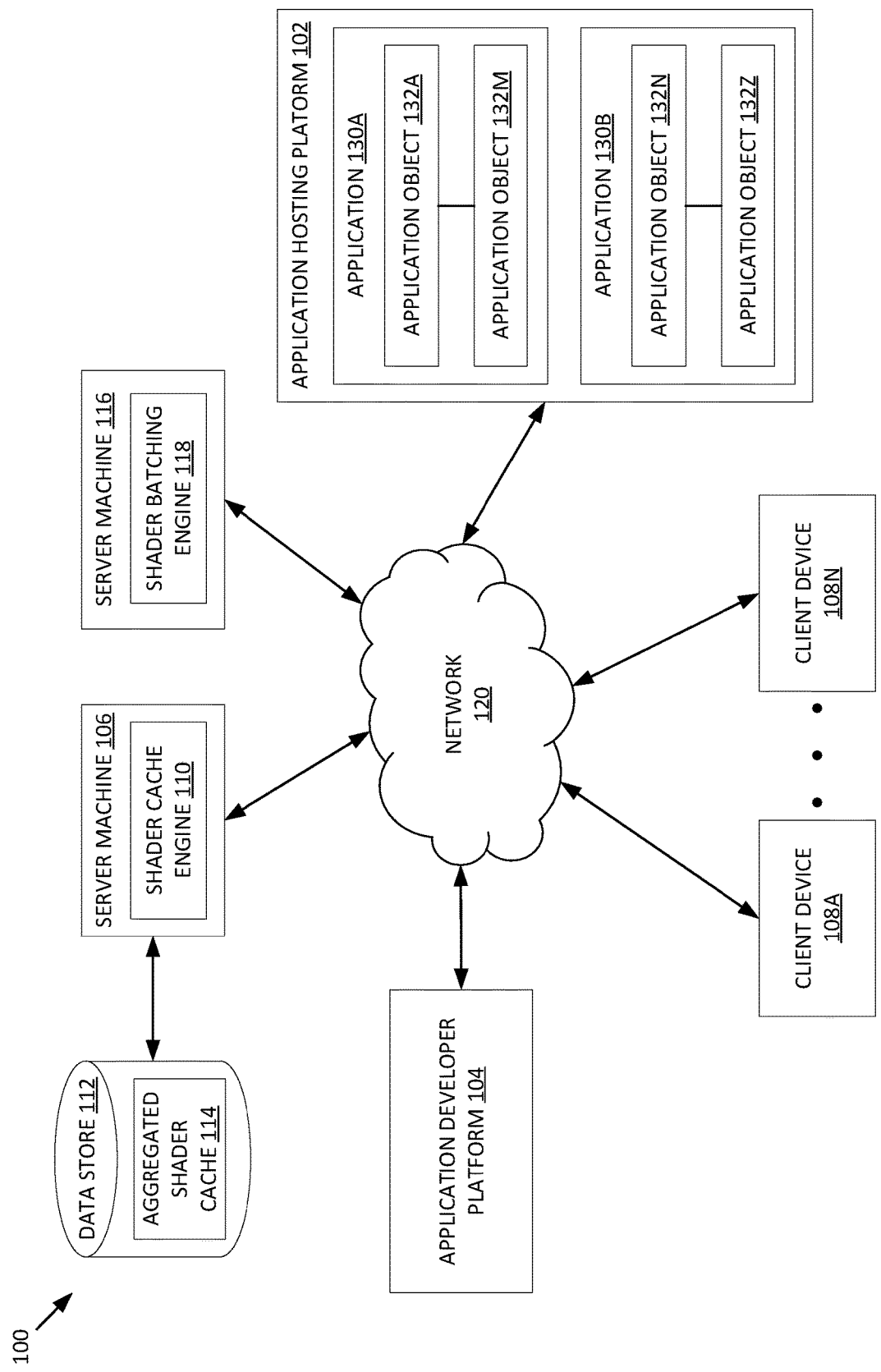
FIG. 1A is a block diagram of an example system architecture, according to at least one embodiment.

Shader programs are programs executed by a processing device (e.g., a graphics processing unit (GPU)) to perform particular tasks (e.g., render graphics, perform general purpose computing tasks, perform machine learning tasks, etc.) for applications running at a computing system. Generally, a compiler may compile a shader program and the compiled shader program may be executed in response to the shader program being referenced by the application. The compiled shader program may be specific to the particular type of hardware (e.g., the processing device) supporting the application at the computing system, a type or version of a driver running on the system hardware, etc. Compiling a shader program may take a significant amount of time (e.g., several milliseconds or longer). Some applications may reference thousands or hundreds of thousands of distinct shader programs during application runtime. Accordingly, compiling each shader program referenced by an application may consume a significant amount of computing system resources and, in some instances, may cause delays (e.g., in graphics rendering) that is noticeable by a user of the computing system.

Some computing systems may maintain a shader cache that stores compiled versions of each shader program referenced by the application during the application runtime. For example, when an application is initialized at a computing system, each shader program that is referenced by the application may be loaded to the computing system, compiled, and stored at the shader cache before the runtime of the application. During the application runtime, the compiler would not need to re-compile a shader program referenced by the application, as the compiled shader program may be retrieved from the shader cache and executed by the processing device.

Although the shader cache prevents the compiler from compiling each shader program each time the shader program is referenced by the application, it is common for the application to reference many shader programs, which requires a significant amount of computing resources and may cause delays (e.g., in graphics rendering). Additionally, due to storage constraints of a computing system, the size of a shader cache may not be sufficient to store each compiled shader program that could be referenced by the application. For example, shader programs that are compiled during an initial period of the application runtime may need to be removed from the shader cache to free up storage space for shader programs that are compiled during a subsequent period of the application runtime. However, the removed shader programs may be subsequently referenced by the application again and therefore the application may need to re-compile the referenced shader programs and re-store the compiled shader programs at the shader cache.

Some applications that reference shader programs are hosted on a cloud computing environment by an application hosting platform. A client device may be virtualized and have a virtual system running an instance of an application hosted by the cloud computing environment (e.g., as part of a virtual machine, a container, a process, etc.). While the instance of the application is initialized by the virtual system of the client device, each shader program that is referenced by the application instance may be loaded to a memory and compiled by a compiler. During the runtime of the application instance, a processing device for the virtual system may retrieve a compiled version of each shader program referenced by the application instance from the shader cache. After the application instance is terminated at the virtual system, the virtual system may be deconstructed at the client device and thus each compiled shader program at the shader cache may be removed from the memory. These operations may be repeated each time that an instance of the application is initialized by the virtualized system at the client device, even when the same client device subsequently executes an instance of the same application referencing the same shader programs.

The shader programs referenced and compiled for each instance of the application may be the same or substantially similar at each respective client device connected to the application hosting platform. As each shader program is compiled and stored at a shader cache located at each client device, each client device may consume a significant amount of computing and storage resources to maintain the shader cache at the respective client device, reducing overall system efficiency and increasing overall system latency. Additionally, a user of each client device running an instance of the application may experience graphics delays caused by shader program compilation at the respective client device, negatively impacting overall user experience for the application. Furthermore, as described above, each respective client device may have to generate and subsequently deconstruct a shader cache for each application instance runtime at the respective client device, which requires a significant amount of computing resources.

Embodiments of the present disclosure address the above and other deficiencies by providing an aggregated compiled shader program cache (referred to as an aggregated shader cache herein) for applications in a cloud computing environment. The aggregated shader cache may be hosted by an application hosting platform that is running on the cloud computing environment and may store compiled shader programs (e.g., at network disk storage) associated with applications (e.g., video game applications) hosted by the platform. A client device connected to the platform (e.g., via a network) may initiate a process to initialize an instance of a respective application hosted by the platform. The client device may be associated with a distinct type of processing device, a distinct version of a driver for the processing device, etc. During the initialization process, the platform may transmit a set of compiled shader programs from the aggregated shader cache to the client device. The set of compiled shader programs may include one or more compiled shader programs that are compatible with the distinct type of processing device, the distinct driver version, etc. associated with the client device. In some embodiments, one or more of the set of compiled shader programs may be compiled at other client devices connected to the platform that are also associated with the distinct type of processing device, the distinct driver version, etc. associated with the client device. In other or similar embodiments, one or more of the set of compiled shader programs may be compiled by the platform.

A shader program may be referenced during a runtime of the instance of the application at the client device. If a compiled version of the referenced shader program is included in the set of compiled shader programs provided by the platform during the initialization process, the client device may execute the compiled shader program, in accordance with the reference by the application instance. If a compiled version of the referenced shader program is not included in the received set of compiled shader programs, the processing device may compile the referenced shader program (e.g., using source code for the shader program) to generate a compiled version of the shader program and may store the compiled shader program at a local memory of the client device. Once the application instance is terminated at the client device (e.g., at the end of a session of the online video game), the client device may request to modify the aggregated shader cache to include the shader program compiled at the client device. The set of compiled shader programs received during the initialization process and the shader programs compiled during the application instance runtime may be removed from the local memory of the client device after the request to modify the aggregated shader cache is transmitted (e.g., to the application hosting platform).

After the application hosting platform validates the compiled shader program, the platform may modify the aggregated shader cache to include the compiled shader program. The application hosting platform may provide an additional set of compiled shader programs from the modified shader cache to an additional client device that has initiated a process to initialize an instance of the application. The additional client device may also be associated with the same type of processing device, the driver version, etc. as the client device that terminated the application instance. In some embodiments, the additional set of compiled shader programs may include the compiled shader program that was compiled at the client device and used to modify the aggregated shader cache.

Aspects and embodiments of the present disclosure enable efficient compilation of shader programs for client devices' instances of applications hosted by a cloud computing environment. Rather than having each client device that is running an instance of an application compile each referenced shader program, each client device may receive, during an initialization process for the application instance, a set of compiled shader programs that are compatible with a processing device type, driver version, etc. associated with the client device. During the runtime of the application instance, each client device may execute the received compiled shader programs as referenced by the application instance, reducing the number of costly compilation processes running at the same client device and across multiple client devices that use the same compiled version of the shader program. Accordingly, a user of the respective client device may experience a fewer number (e.g., zero) of graphics delays caused by shader program compilation at the client device, improving overall user experience for the application.

Additionally, embodiments of the present disclosure enable storing compiled shader programs of an application in a shader cache of the application hosting platform and not at a shader cache at memory of a respective client device. Accordingly, for virtualized client devices, the compiled shader programs are maintained at the shader cache after a virtual system is deconstructed at a respective client device (e.g., after the application instance is terminated at the client device) and are not re-compiled after the respective client device initializes another instance of the application in a virtual system. This also reduces the number of compilation processes that are performed at each respective client device, and across multiple client devices of the overall system. By reducing the number of compilation processes performed for the overall system, a significant number of resources are available for other processes at the cloud computing environment, decreasing an overall system latency and increasing an overall system efficiency.

System Architecture

FIG. 1A is a block diagram of an example system architecture 100, according to at least one embodiment. The system architecture 100 (also referred to as "system" herein) includes application hosting platform 102, application developer platform 104, server machine 106, client devices 108A-N (collectively and individually referred to as client device(s) 108), and data store 112, each connected to a network 120. In some embodiments, system architecture 100 may additionally include server machine 116. In implementations, network 120 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 112 is a persistent storage that is capable of storing content items as well as data structures to tag, organize, and index the content items. Data store 112 may be hosted by one or more storage devices, such as main memory, magnetic or optical storage based disks, tapes or hard drives, NAS, SAN, and so forth. In some implementations, data store 112 may be a network-attached file server, while in other embodiments data store 112 may be some other type of persistent storage such as an object-oriented database, a relational database, and so forth, that may be hosted by platform 102 or one or more different machines coupled to the platform 102 via network 120.

Application hosting platform 102 may be configured to host one or more applications (e.g., application 130A, application 130B, etc.) provided by an application developer (i.e., via application developer platform 104). Application developer platform 104 may be used by an application developer (e.g., a user, company, organization, etc.). For example, an application developer may be a video game developer that develops a video game (represented by an application 130) for users to interact with on client devices 108. Application hosting platform 102 may provide users with access to an application 130 (or an instance of application 130) developed by application developer platform 104 via a respective client device 108A-N. For example, application hosting platform 102 may allow users to consume, upload, download, and/or search for applications 130. In some embodiments, application hosting platform 102 may include a website (e.g., one or more webpages) that may be used to provide users with access to applications 130. In other or similar embodiments, client devices 108 may be virtualized and have a virtual system running an instance of application 130 (e.g., as part of a virtual machine, a container, a process, etc.). It should be noted that although some embodiments of the present disclosure are described with respect to an instance of application 130 running on a virtualized client device 108, embodiments of the present disclosure may also be applied to applications 130 running on a client device 108 that is not virtualized. Similarly, embodiments of the present disclosure that are directed to an application 130 running on a client device 108 that is not virtualized may also be applicable for an instance of application 130 running on a virtualized client device 108.

In some embodiments, each application 130 may consist of one or more application objects (e.g., application objects 132A-M of application 130A, application objects 132N-132Z of application 130B, etc.). Application hosting platform 102 may render each application object 132 for display via a user interface (UI) at each client device 108 running an instance of a respective application 130. Each application object 132 may be provided for application 130 by an application developer via application developer platform 104. A user of the respective client device 108 may interact with the instance of application 130 by engaging with a rendered application object 132 via the client device UI. In an illustrative example, applications 130A and 130B may be video game applications developed by a video game developer. Application objects 132 may be components of a respective video game application (e.g., a gaming object, a gaming map, etc.) that are rendered for display at a UI of a client device 108 running the instance of the respective video game application. A user of client device 108 may engage with (e.g., consume, interact, etc.) the rendered application object 132 in order to progress through the video game via the respective client device 108. Further details regarding rendering application objects 132 are provided below.

The client devices 108 may include devices, including but not limited to: televisions, smart phones, cellular telephones, personal digital assistants (PDAs), portable media players, netbooks, laptop computers, electronic book readers, tablet computers, desktop computers, set-top boxes, gaming consoles, and the like. The individual client devices 108 may include a content viewing component (not shown) that enables a user of client device 108 to consume application objects 132 of an application 130. The content viewing component may be hosted by application hosting platform 102 and may provide a rendered version of the application object 132 for presentation via the UI of a client device 108 during a runtime of the application 130. As described above, client device 108 may have a virtual system running an instance of application 130. The content viewing component may be part of the virtual system and may provide the rendered version of the application object 132, in accordance with embodiments described herein. Further details regarding the virtual system at the client device 108 are provided with respect to FIG. 2.

As described above, application hosting platform 102 may render one or more application objects 132 of an application 130, or an instance of an application 130, running at client device 108. In some embodiments, a shader manager module (e.g., shader manager 204 illustrated in FIG. 2) of the content viewing component at the client device 108 may render an application object 132 by executing one or more programs (referred to as shader programs) at the client device. Each shader program may include a set of operations that enable the content viewing component to render an application object 132 for presentation via the UI of a client device 108. During a runtime of the application 130 at the client device 108, the application 130 may reference an application object 132 that is to be presented via the UI of the client device 108. The shader manager may identify one or more shader programs associated with the referenced application object 132 and may render the referenced application object 132 by executing a compiled version of the one or more shader programs.

Application hosting platform 102 may host an aggregated compiled shader program cache 114 (referred to as aggregated shader cache herein). An aggregated shader cache 114 refers to a repository of compiled shader programs for one or more application objects 132 referenced by an application 130 hosted by application hosting platform 102. In some embodiments, one or more compiled shader programs stored at aggregated shader cache 114 may be compiled during a runtime of an instance of application 130 at a respective client device 108. In other or similar embodiments, one or more compiled shader programs at aggregated shader cache 114 may be compiled by application hosting platform 102. Each compiled shader program may be associated with a particular type of processing device (e.g., a type of graphics processing unit (GPU)) at a client device 108, a particular type of driver of the processing device, etc. In some embodiments, shader cache 114 may reside at data store 112. A shader cache engine 110 of application hosting platform 102 may be configured to maintain aggregated shader cache 114 hosted by application hosting platform 102. Further details regarding shader cache engine 110 are provided with respect to FIGS. 3A-3B. It should be noted that, in some embodiments, shader cache engine 110 may reside on a server machine, such as server machine 106, that is separate from a server machine that supports application hosting platform 102. In other or similar embodiments, shader cache engine 110 may reside on a server machine that supports application hosting platform 102.

In an illustrative example, a client device 108A may initiate a process to initialize application 130 (or an instance of application 130). Shader cache engine 110 may detect the initiation of the initialization process at client device 108A and transmit a set of compiled shader programs extracted from aggregated shader cache 114 to client device 108A. Each of the set of compiled shader programs may be compatible with the particular type of processing device, driver version, etc. associated with client device 108A. The shader manager at client device 108A may store the set of compiled shader programs at a local memory for client device 108A. During a runtime of the application 130 (or the instance of application 130) at client device 108A, the shader manager may detect that application 130 has referenced a shader program for application object 132 that is to be rendered and presented via the UI of client device 108A. The shader manager may determine whether the referenced shader program is associated with a compiled shader program in the set of compiled shader programs received during the initialization process. If the shader program is associated with a compiled shader program in the received set, the shader manager may execute the compiled shader program from the received set to render the referenced application object 132. In response to determining that the shader program is not associated with a compiled shader program in the received set, the shader manager may compile the shader program to generate the compiled version of the shader program and may execute the compiled shader program to render the referenced application object 132. The shader manager may also store the compiled shader program in the local memory for client device 108A.

When application 130 (or the instance of application 130) is terminated at client device 108A, the shader manager may request to modify aggregated shader cache 114 to include the shader program compiled during the runtime. In some embodiments, the shader manager may request to modify aggregated shader cache 114 in response to determining that a modification condition associated with application 130 (or the instance of application 130) is satisfied. For example, the shader manager may request to modify aggregated shader cache 114 responsive to determining that client device 108A is permitted by application hosting platform 102 to modify aggregated shader cache 114. In another example, the shader manager may request to modify aggregated shader cache 114 responsive to determining that the instance of application 130 is terminated during a time period outside of a high traffic time period for application hosting platform 102. Further details regarding the modification condition are provided herein.

Client device 108A may transmit the request to modify aggregated shader cache 114 directly to application hosting platform 102 or, in some embodiments, to a shader batching engine 118. A shader batching engine 118 may be configured to collect compiled versions of shader programs that are compiled at multiple distinct client devices 108 connected to application hosting platform 102 and transmit the collected compiled shader programs to platform 102 as a set (or a batch) of collected compiled shader programs that are to be used to modify aggregated shader cache 114. In some embodiments, shader batching engine 118 may reside on a server machine that is separate from a server machine that supports application hosting platform 102, such as server machine 116. In other or similar embodiments, shader batching engine 118 may reside on a server machine that supports application hosting platform 102. In response to receiving the request to modify aggregated shader cache 114 from client device 108A, shader batching engine 118 may store the compiled shader program at a temporary batching buffer maintained by shader batching engine 118. The compiled shader programs stored at the temporary batching buffer may be associated with distinct applications 130 hosted by application hosting platform 102 (e.g., application 130A, 130B, etc.) and, in some embodiments, may be received from multiple distinct client devices (e.g., client device 108A, 108B, etc.). Responsive to determining that a number of compiled shader programs stored at the temporary batching buffer meets or exceeds a threshold value, shader batching engine 118 may transmit the compiled shader programs at the temporary batching buffer to application hosting platform 102 (e.g., as a batch of collected compiled shader programs) to be used to modify aggregated shader cache 114.

Shader cache engine 114 may validate each compiled shader program received by application hosting platform 102 (e.g., from client device 108A, from shader batching engine 118, etc.) and may modify aggregated shader cache 114 in view of each validated compiled shader program. In response to detecting that another instance of application is initialized at another client device 108 (e.g., client device 108N), application hosting platform may transmit a set of compiled shader programs from modified aggregated shader cache 114 to client device 108N. Further details about aggregated shader cache 114 are provided herein.

Figure 1B:
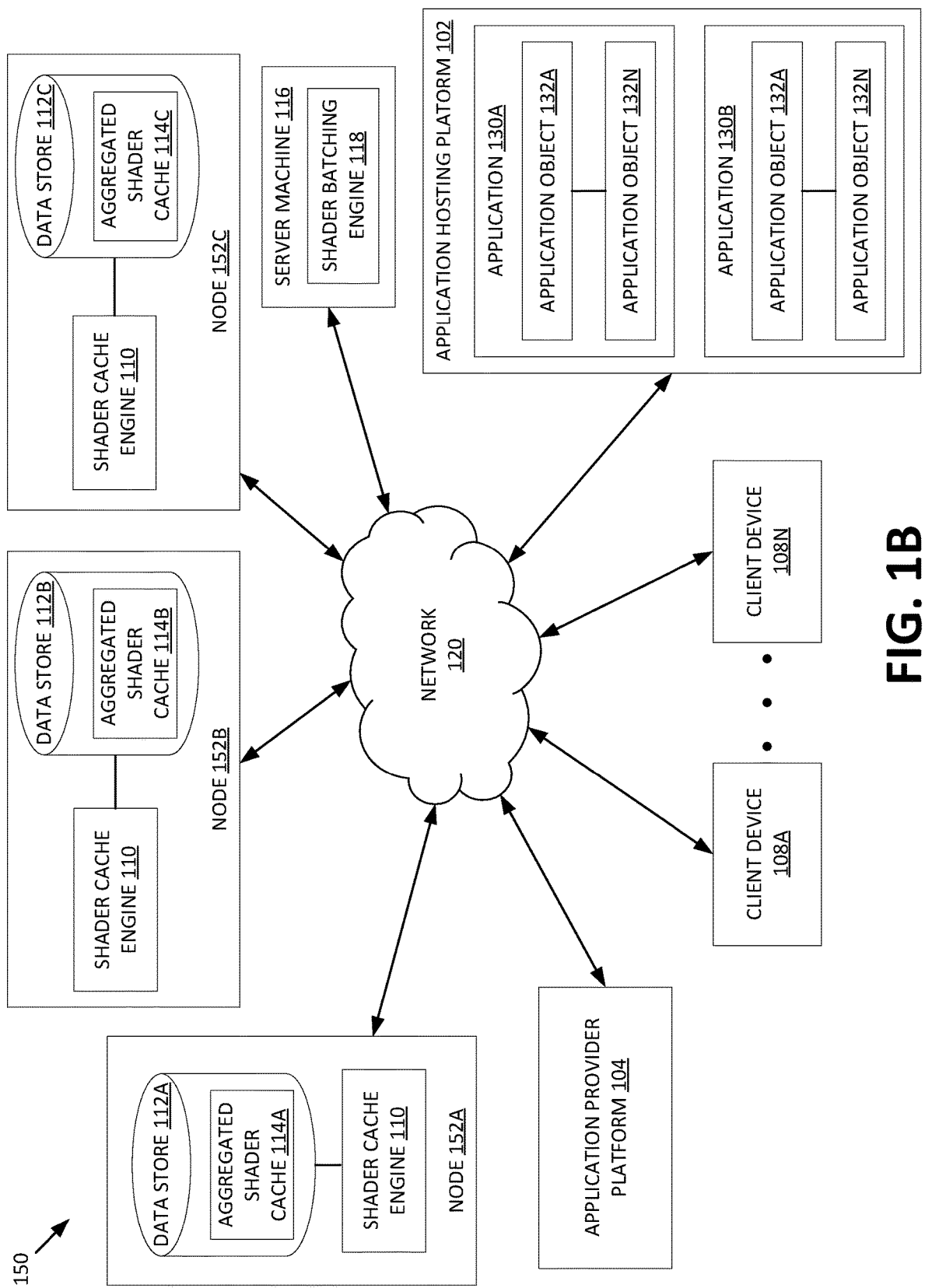
FIG. 1B is a block diagram of another example system architecture, according to at least one embodiment.

FIG. 1B is a block diagram of another example system architecture 150, according to at least one embodiment. In some embodiments, system architecture 150 includes application hosting platform 102, application provider platform 104, nodes 152, and client devices 108, each connected to a network 120, as described with respect to FIG. 1A. In additional or alternative embodiments, system architecture 150 may further include server machine 116. Each node 152 may be a grouping of hardware resources and/or software resources that are allocated to service one or more client devices 108 coupled to application hosting platform 102. In some embodiments, each node 152 may include a shader cache engine, such as shader cache engine 110. Each node 152 may further include a data store, such as data store 112, that stores one or more portions of aggregated shader cache 114. In an illustrative example, node 152A may include data store 112A, node 152B may include data store 112B and node 152C may include data store 112C. Data stores 112A-C may each be configured to store one or more portions of aggregated shader cache 114 (e.g., shader cache portions 114A-C, respectively). In some embodiments, each data store 112A-C may be configured to store the entire aggregated shader cache 114. In other or similar embodiments, each data store 112A-C may be configured to store a portion of shader cache 114 that is smaller than the entire shader cache 114. Nodes 152A-C may also be configured to each host shader cache engine 110, in accordance with embodiments described with respect to FIG. 3.

In an illustrative example, node 152A may include resources that are allocated to service client device 108A. Responsive to detecting an initiation of the initialization process for application 130 (or an instance of application 130) at client device 108A, shader cache engine 110 at node 152A may transmit a set of compiled shader programs extracted from aggregated shader cache 114A to client device 108A, in accordance with embodiments described with respect to FIG. 1A. When application 130 (or the instance of application 130) is terminated at client device 108A, the shader manager at client device 108A may transmit a request to modify aggregated shader cache 114A (i.e., to platform 102 or to shader batching engine 118) in view of one or more shader programs compiled by client device 108A during a runtime of application 130 (or the instance of application instance 130), in accordance with previously described embodiments. Shader cache engine 110 at node 152A may validate the received compiled shader programs and may modify aggregated shader cache 114A, in accordance with previously provided embodiments.

Each portion of aggregated shader cache 114 at a respective node 152 may include a distinct portion of aggregated shader cache 114, in some embodiments. In such embodiments, each portion of aggregated shader cache 114 at a respective node 152 may include shader programs that are compiled by client devices 108 that are serviced by the respective node 152. The shader cache engine 110 at the respective node 152 may be configured to provide compiled shader programs from the portion of the aggregated shader cache 114 hosted at the respective node 152 to client devices 108 serviced by the respective node 152. For example, if client device 108A and client device 108B are serviced by the resources of node 152A and client device 108C is serviced by the resources of node 152B, shader cache engine 110 at node 152A may provide compiled shader programs stored at aggregated shader cache 114A to client devices 108A and 108B and may not provide shader programs from aggregated shader cache 114A to client device 108C. Additionally, shader cache engine 110 at node 152B may provide shader programs stored at aggregated shader cache 114B to client device 108C and may not provide shader programs from aggregated shader cache 114B to client devices 108A and 108B. In additional or alternative embodiments, only client devices 108 that are serviced by a respective node 152 may be permitted to modify the portion of aggregated shader cache 114 that is stored at the respective data store 112 of the respective node 152. In accordance with the previous example, platform 102 may permit client devices 108A and 108B to modify aggregated shader cache 114A, but may not permit client devices 108A and 108B to modify aggregated shader cache 114B. Additionally, platform 102 may not permit client device 108C to modify aggregated shader cache 114A, but may permit client device 108C to modify aggregated shader cache 114B.

In other or similar embodiments, each portion of aggregated shader cache 114 at a respective node 152 may include a portion that is the same or similar to other portions of aggregated shader cache 114 at other nodes 152. For example, data stores 112A-C may each store the same or similar compiled shader programs at aggregated shader caches 114A-C, respectively. In an illustrative example, client device 108A, serviced by node 152A, may request to modify aggregated shader cache 114A in view of one or more compiled shader programs that were compiled by client device 108A during an application instance runtime, in accordance with previously described embodiments. Shader cache engine 110 at node 152A may validate the one or more compiled shader programs and may modify aggregated shader cache 114A, as previously described. Responsive to validating the one or more compiled shader programs from client device 108A, shader cache engine 110 at node 152A may transmit the validated compiled shader programs to shader cache engine 110 at nodes 152B and 152C. The shader cache engines 110 at nodes 152B and 152C may modify aggregated shader caches 114B and 114C, respectively, in view of the validated compiled shader programs, in accordance with previously described embodiments. In a further illustrative example, client device 108C, serviced by node 152B may initiate an application 130 (or an instance of an application 130) at client device 108C. Shader cache engine 110 at node 152B may provide client device 108C with a set of compiled shader programs from aggregated shader cache 114B, as previously described. In some embodiments, the set of compiled shader programs from aggregated shader cache 114B may include a compiled shader program that was compiled by client device 108A and subsequently used to modify aggregated shader cache 114B. During the runtime of application 130 (or the instance of application 130) at client device 108C, client device 108C may execute the compiled shader program that was compiled by client device 108A even though client device 108A and 108C are serviced by distinct nodes 152.

As described above, system architecture 150 may additionally include server machine 116 which may provide shader batching engine 118. In some embodiments, one or more client devices 108 connected to application hosting platform 102 may transmit requests to modify aggregated shader cache 114 to shader batching engine 118, as described with respect to FIG. 1A. For example, shader batching engine 118 may receive a request from client device 108A (serviced by node 152A) to modify aggregated shader cache 114A and a request from client device 108C (serviced by node 152B) to modify aggregated shader cache 114B. In some embodiments, shader batching engine 118 may maintain a distinct temporary batching buffer for each aggregated shader cache 114 hosted by each node 152. For example, shader batching engine 118 may maintain a first temporary batching buffer associated with aggregated shader cache 114A at node 152A and a second temporary batching buffer associated with aggregated shader cache 114B at node 152B. In such embodiments, shader batching engine 118 may store the compiled shader programs received from client devices 108A and 108C at the first temporary batching buffer and the second temporary batching buffer, respectively. In such embodiments, shader batching engine 118 may transmit the batch of collected compiled shader programs stored at a respective temporary batching buffer to application hosting platform 102 in response to determining that the number of compiled shader programs stored at the respective batching buffer meets or exceeds the threshold value. The shader cache engine 110 for the node 152 that hosts the respective portion of aggregated shader cache 114 may receive the batch of collected compiled shader programs and may updated the respective portion of aggregated shader cache 114, as previously described.

In other or similar embodiments, shader batching engine 118 may maintain one batching buffer that is configured to store the compiled shader programs received by each client device 108 connected to application hosting platform 102. In such embodiments, shader batching engine 118 may transmit the batch of collected compiled shader programs from the one batching buffer to application hosting platform 102, in accordance with previously described embodiments. In some embodiments, the shader cache engine 110 at each node may receive the batch of collected compiled shader programs from shader batching engine 118 any may modify a respective portion of aggregated shader cache 114B in view of the received batch, as previously described.

It should be noted that although some embodiments and/or examples of the present disclosure describe a shader program as being used to render graphics for an application, embodiments and/or examples of the present disclosure may be applied to shader programs that are used to perform any type of task. For example, embodiments and/or examples of the present disclosure may be applied to shader programs that are used to perform general computing tasks, machine learning tasks, etc.

Figure 2:
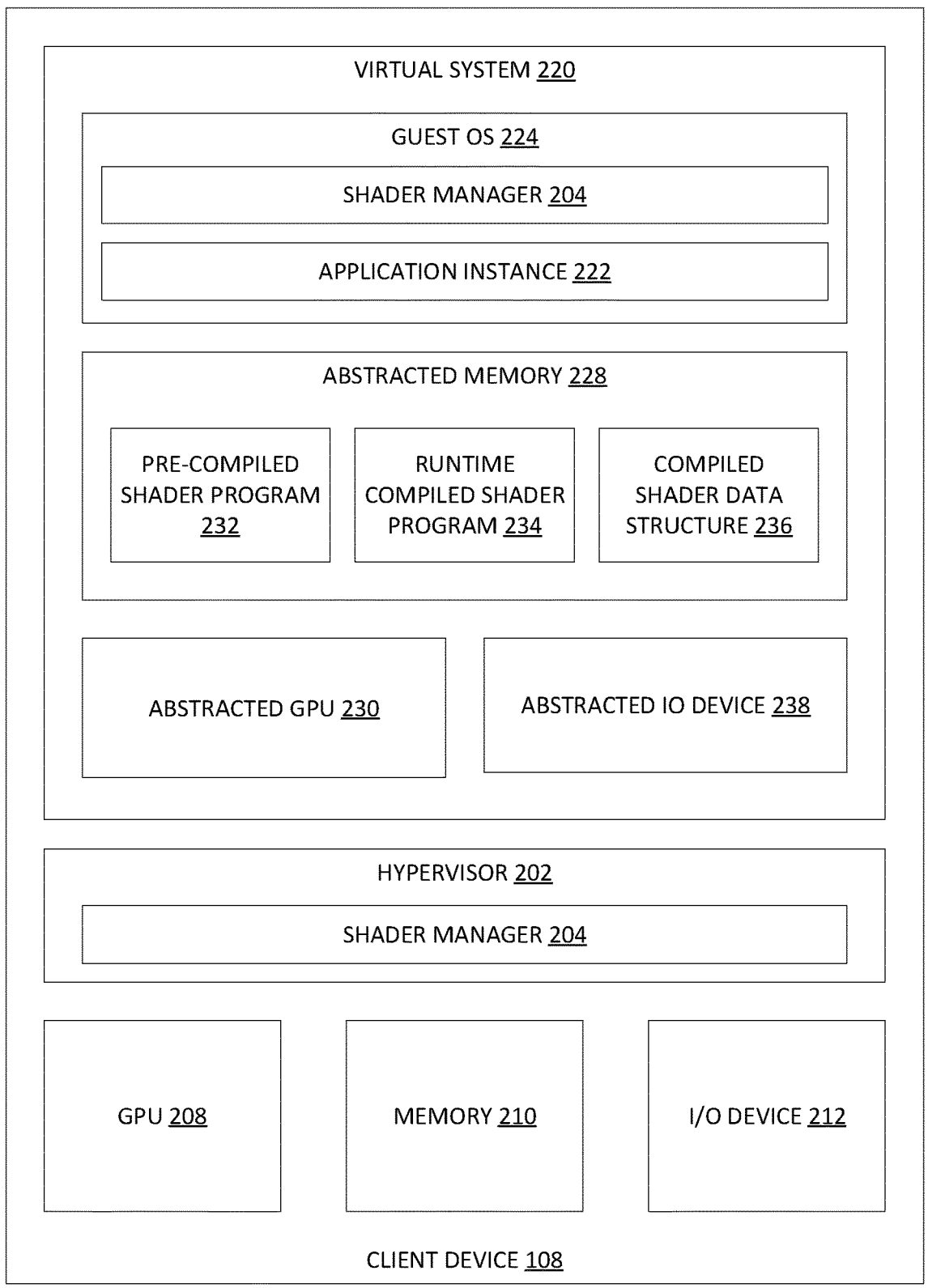
FIG. 2 is a block diagram of a client device hosting a virtual computing system for running an instance of an application, according to at least one embodiment.

FIG. 2 is a block diagram of a client device 108 hosting a virtual system 220 for running an instance 222 of an application, according to at least one embodiment. Client device 108 may execute hypervisor 202, which is configured to manage virtual system 220 running on client device 108. Client device 108 may include one or more physical devices that may be used to support virtual system 220. For example, client device 108 may include a processing device 208 (e.g., a GPU), memory 210, and one or more I/O devices 212.

GPU 208 may be communicatively coupled to memory 210 and I/O device 212 via a host bus. In some embodiments, client device 108 may correspond to computer system 1200 and/or computer system 1300 described with respect to FIGS. 12 and 13.

One or more application instances 222 may run on virtual system 220 under a guest operating system (OS) 224. In some embodiments, application instance 222 may be an instance of an application 130 hosted by application hosting platform 102, described with respect to FIG. 1A and FIG. 1B. For example, application instance 222 may be an instance of a video game application 130 provided by a video game application developer via application developer platform 104 and hosted by application hosting platform 102. In such example, virtual system 220 may correspond to a "game seat" (which may represent, for example, a virtual machine or a container) that is instantiated at client device 108 during an initialization of an application instance 222. The "game seat" may be instantiated to facilitate execution of the application instance 222 at client device 108 and may be deconstructed after a termination of the application instance 222 at client device 108, in accordance with embodiments provided herein.

Hypervisor 202 may abstract physical devices of client device 108 and present this abstraction to virtual system 220 as one or more virtual devices. For example, hypervisor 202 may abstract GPU 208 and present this abstraction to virtual system 220 as abstracted GPU 230. Hypervisor 202 may abstract GPU 230 for virtual system 220 by scheduling time slots on GPU 208, rather than dedicating GPU 208 for virtual system 220, in some embodiments. In other or similar embodiments, hypervisor 202 may abstract memory 210 and present this abstraction to virtual system 220 as abstracted memory 228. Hypervisor 202 may abstract memory 210 by employing a page table for translating memory access associated with abstracted memory 228 with physical memory addresses of memory 210. During a runtime of application instance 222 at virtual system 220, hypervisor 202 may intercept virtual memory access operations (e.g., read operations, write operations, etc.) and may translate a virtual memory address associated with the intercepted operations to a physical memory address at memory 210 using the page table.

Abstracted memory 228 may be configured to store one or more compiled shader programs that are executed by virtual GPU 230 to render one or more application objects 132 during a runtime of application instance 222 at virtual computing system 220. In some embodiments, the one or more compiled shader programs may include shader programs that are compiled prior to or during an initialization of application instance 222 at virtual system 220 (referred to as pre-compiled shader programs 232). The one or more pre-compiled shader programs 232 may be included in the set of compiled shader programs extracted from aggregated shader cache 114, in according with previously described embodiments. In other or similar embodiments, the one or more compiled shader programs may include shader programs that are compiled at client device 108 during a runtime of application instance 222 (referred to as runtime compiled shader programs 234). In some embodiments, abstracted memory 228 may also include a compiled shader data structure 236 that includes mappings between an identifier for a runtime compiled shader program 234 and an indication of a virtual address of abstracted memory 228 that stores the runtime compiled shader program 234. In other or similar embodiments, compiled shader data structure 236 may be stored at memory 210. In yet other or similar embodiments, the data included in compiled shader data structure 236 may be included in the page table for abstracted memory 228. Compiled shader data structure 236 may additionally include mappings between pre-compiled shader programs 232 and memory addresses for portions of abstract memory 228 (or memory 210) that store the pre-compiled shader programs 232, in some embodiments.

Hypervisor 202 may also abstract one or more I/O devices 212 at client device 108 and present this abstraction to virtual system 220 as one or more respective abstracted I/O devices 238. Hypervisor 202 may abstract an I/O device 212 by assigning particular port ranges of an interface slot of the I/O device 212 to virtual system 220 and presenting the assigned port ranges as abstracted I/O device 238A. Guest OS 224 may utilize abstracted GPU 230, abstracted memory 228, and/or one or more abstracted I/O devices 238 to support execution of application instance 222 on virtual system 220.

In some embodiments, hypervisor 202 may include a shader manager module 204 (referred to herein as shader manager 204). In other or similar embodiments, guest OS 224 may include shader manager 204. As described with respect to FIGS. 1A and 1B, shader manager 204 may be a portion of a content viewer component of client device 108 and may manage the execution of one or more compiled shader programs for application objects 132 referenced by application instance 222. As described above, shader manager 204 may receive a set of compiled shader programs from shader cache engine 110 (e.g., during an initialization of application instance 222 at virtual system 220), and may store the received set of compiled shader programs at abstracted memory 228 as pre-compiled shader programs 232. In some embodiments, shader manager 204 may initialize data structure 236 in response to receiving the set of compiled shader programs from shader cache engine 110. In other or similar embodiments, shader manager 204 may initialize data structure 236 after completion of the initialization process for application instance 222 (e.g., during a runtime of application instance 222).

During a runtime of application instance 222, shader manager 204 may detect that application instance 222 has referenced one or more shader programs associated with an application object 132. Shader manager 204 may determine whether a compiled shader program for the referenced application object 132 is already stored at abstracted memory 228 (i.e., as a pre-compiled shader program 232). In response to determining that the pre-compiled shader program 232 is already stored at abstracted memory 228, shader manager 204 may execute the pre-compiled shader program 232 (i.e., via abstracted GPU 230). In response to determining that the compiled version of the referenced shader program is not already stored at abstracted memory 228, shader manager 204 may initiate a compilation process to generate the compiled version of the shader program and may store the compiled version of the shader program as a runtime compiled shader program 234 at abstracted memory 228, as previously described. Shader manager 204 may generate an entry of data structure 236 that indicates a mapping between an identifier for the runtime compiled shader program 234 (e.g., a shader value described below) and an address for a portion of abstracted memory 228 that stores the runtime compiled shader program 234.

Hypervisor 202 may receive a request to deconstruct virtual system 220, in some embodiments. For example, a user accessing application instance 222 via virtual system 220 may log out of an account associated with application instance 222. In response to detecting that the user has "logged out" of the associated account, guest OS 224 may determine that the application instance 222 is terminated and may transmit a request to hypervisor 202 to deconstruct virtual system 220. In some embodiments, hypervisor 202 may deconstruct virtual system 220 by erasing each compiled shader program from abstracted memory 228. Shader manager 204 may identify one or more runtime compiled shader programs 234 that were compiled during the runtime of application instance 222 and generate a request to modify aggregated shader cache 114 in view of the identified runtime compiled shader programs 234. For example, shader manager 204 may identify entries of data structure 236 that correspond to one or more runtime compiled shader programs 234. Responsive to identifying the entries of compiled shader data structure 236, shader manager 204 may retrieve the runtime compiled shader programs 234 from the respective portions of abstract memory 228 (as indicated in the identified entries) and may generate a request to modify aggregated shader cache 114 in view of the retrieved runtime compiled shader programs 234. Shader manager 204 may transmit the generated request to platform 102 or shader batching component 118, in accordance with previously described embodiments.

Hypervisor 202 may erase each compiled shader program (i.e., precompiled shader program(s) 232 and/or runtime compiled shader program(s) 234) from abstracted memory 228 by identifying a physical address of memory 210 that corresponds to a virtual address for a respective compiled shader program at abstracted memory 228 and erasing the compiled shader program from the identified address at memory 210. In some embodiments, hypervisor 202 may erase the compiled shader programs from abstracted memory 228 after shader manager 204 transmits the request to modify aggregated shader cache 114. After hypervisor 202 has deconstructed virtual system 220, memory 210 may not store any compiled shader programs for application instance 222. In some embodiments, hypervisor 202 may receive a request to reconstruct virtual system 220 and re-initialize application instance 222 via the virtual system 220 (i.e., as the same application instance 222 or as a different application instance 222), in accordance with previously described embodiments. Shader manager 204 may receive the set of compiled shader programs of aggregated shader cache 114 from platform 102, as previously described and may store the received compiled shader programs as pre-compiled shader programs 232. In some embodiments, the compiled shader programs received during the re-initialization process for application instance 222 may include one or more pre-compiled shader programs 232 received during the prior initialization process for application instance 222 and one or more runtime compiled shader programs 234 used to modify aggregated shader cache 114 following the prior termination of application instance 222.

Caching Compiled Shader Programs in a Cloud Computing Environment

Figure 3A:
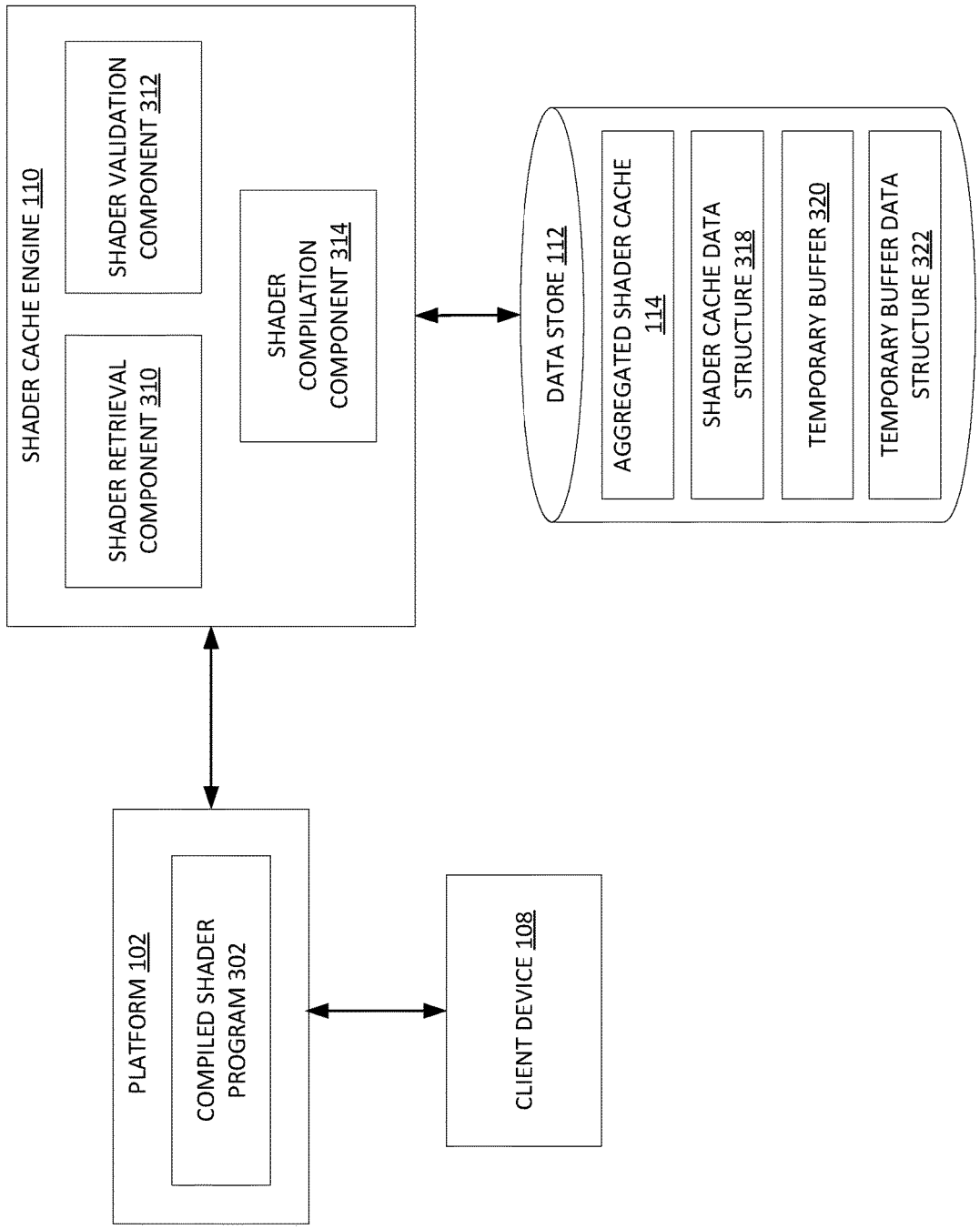
FIG. 3A is a block diagram of an example shader cache engine, according to at least one embodiment.

FIG. 3A is a block diagram of an example shader cache engine 110, according to at least one embodiment. Shader cache engine 110 may include a shader retrieval component 310, a shader validation component 312, and a shader compilation component 314. As described previously, shader cache engine 110 may reside at a server machine, such as server machine 106 of FIG. 1A, that is part of or separate from application hosting platform 102 (referred to herein as platform 102). In some embodiments, shader cache engine 110 may reside at a node 152 of platform 102, as described with respect to FIG. 1B.

As described above, a client device 108 may initiate a process to initialize an application 130 or an instance of an application (e.g., application instance 222 of FIG. 2) hosted by application hosting platform 102 at client device 108. For example, a component for the virtual system 200 at client device 108 (e.g., hypervisor 202, guest OS 224, shader manager 204, etc.) may transmit a request to platform 102 to initiate a process to initialize application instance 222 at the virtual system 200. Platform 102 may forward the request to shader cache engine 110. Shader retrieval component 310 of shader cache engine 110 may be configured to retrieve one or more compiled shader programs 302 from aggregated shader cache 114 that are compatible with client device 108. A compiled shader program 302 may be compatible with client device 108 if the compiled shader program 302 satisfies a hardware condition and/or a software condition associated with client device 108 (e.g., a hardware state, software state, etc. associated with compiled shader program 302 corresponds to a hardware state, software state, etc. associated with client device 108).

In some embodiments, client device 108 may be associated with a shader key that is generated based on state data (e.g., hardware state data, software state data, etc.) for client device 108. A hardware state may correspond to a type of one or more hardware components (e.g., GPU, etc.) at client device 108. A software state may include a type or version of a driver running on the one or more hardware components. In some embodiments, the software state may also include a state of an application pipeline for application instance 222. For example, as described above, application instance 222 may correspond to an instance of a video game application. Instructions for the video game application may correspond to one or more gaming levels for the video game application, where each gaming level corresponds to a series of gaming tasks that a user of the video game is to complete in order to advance through the respective gaming level. Each respective gaming level and/or series of gaming tasks may correspond to application objects 132 that are distinct from application objects 132 that are referenced for other gaming levels and/or series of gaming tasks. In such example, the state of the application pipeline for the video game application instance may correspond to a particular gaming level and/or series of gaming tasks (e.g., the highest gaming level or gaming task to which the user of the video game application has progressed). In some embodiments, one or more components of platform 102 may track the state of the application pipeline associated with a particular client device 108. By tracking the state of the application pipeline associated with the client device, platform 102 may ensure that instructions associated with the highest gaming level or gaming task to which the user of the video game application has progressed is transmitted to client device 108 during the initialization of application instance 222. In other or similar embodiments, one or more components of client device 108 may track the state of the application pipeline associated with the application instance 222.

Shader retrieval component 310 may obtain a shader key associated with client device 108. The shader key may be generated based on data indicating a state of the hardware (e.g., type of GPU, etc.) and/or the software (e.g., the type of driver running on the GPU, the application pipeline state associated with the application instance, etc.) for client device 108. In some embodiments, one or more components at client device 108 (e.g., shader manager 204) may generate the shader key. In such embodiments, shader manager 204 may include the shader key in the request to initiate the initialization process for application instance 222. In other or similar embodiments, shader retrieval component 310 may obtain the state data associated with client device 108 and may generate the shader key associated with client device 108. For example, the request to initiate the initialization process may include state data associated with client device 108. In another example, shader retrieval component 310 may transmit a request to client device 108 and/or platform 102 for state data associated with client device 108. Client device 108 and/or shader retrieval component 310 may generate the shader key by applying a hashing function to the state data associated with client device 108, in some embodiments.

Data store 112 may store a shader cache data structure 318, in some embodiments. Shader cache data structure 318 may be configured to include one or more mappings between a shader key and a memory address at aggregated shader cache 114 that stores a compiled shader program associated with the shader key. FIG. 4 depicts an example shader cache data structure 318, according to at least one embodiment. Each entry 402 of shader cache data structure 318 may include a shader key field 404 and a memory address field 408. In some embodiments, each entry 402 may further include a shader value field 406. Shader key field 404 of each entry 402 may include an indication of a shader key for a client device 108 that is compatible with a compiled shader program 302 stored at the memory address of aggregated shader cache 114, as indicated in memory address field 408. Shader value field 406 may include an indication of a shader value associated with the compiled shader program 302 stored at the memory address of shader cache 114. A shader value may be generated based on a source code for the compiled shader program. In some embodiments, the shader value for a respective compiled shader program 302 may be generated by a processing device (e.g., at client device 108, at server machine 106) applying a hashing function to the source code of the shader program.

The shader key indicated in a shader key field 404 of an entry 402 of shader cache data structure 318 may correspond to a shader key associated with another client device that compiled the shader program and transmitted the shader program to shader cache engine 110 to modify aggregated shader cache 114, in accordance with embodiments described herein. For example, client device 108N may compile a shader program during a runtime of an application instance 222 at client device 108N. When the application instance 222 is terminated at client device 108N, client device 108N may transmit a request to modify aggregated shader cache 114 in view of compiled shader program 302, as previously described. Shader validation component 312 may obtain a shader key (e.g., "9J6K3D") associated with client device 108N and, in response to validating the compiled shader program 302, shader validation component 312 may store the compiled shader program 302 at aggregated shader cache 114. In some embodiments, shader validation component may also obtain a shader value (e.g., "3S09V2S3N3") associated with the compiled shader program 302. Shader validation component 312 may generate an entry 402 of data structure 318 that indicates a mapping of the obtained shader key (e.g., "9J6K3D") and/or obtained shader value (e.g., "3 S09V2S3N3") for the compiled shader program 302 and the memory address at aggregated shader cache 114 (e.g., "0X10010000") that stores the compiled shader program 302. Further details regarding shader validation component 312 are provided herein.

In accordance with the previous example, client device 108A may initiate the initialization component for an application instance 222 at client device 108A. Client device 108A may be associated with the shader key "9J6K3D." Shader retrieval component 310 may obtain the shader key associated with client device 108A and may compare the obtained shader key to the shader key indicated in the shader key field of one or more entries 402 of data structure 318. Shader retrieval component 310 may identify one or more entries 402 of data structure 318 that correspond to the shader key associated with client device 108A (e.g., based on the shader key field 404). One of the one or more identified entries 402 may have been generated in response to client device 108N transmitting the request to modify aggregated shader cache 114, as described above. Responsive to identifying the one or more entries 402 that include shader keys associated with client device 108A, shader retrieval component 310 may determine the memory address for the compiled shader program 302 indicated by the identified entries 402 at aggregated shader cache 114 and may retrieve the compiled shader program 302 from the determined memory address. Shader retrieval component 310 may transmit a set of the one or more retrieved compiled shader programs 302 to client device 108A via platform 102, as described previously.

In additional or alternative embodiments, a compiled shader program 302 associated with an entry 402 of data structure 318 may be compiled by shader compiler component 314, rather than by a client device 108. For example, an application developer may provide platform 102 with an initial set of shader programs that may be referenced during an initial period of an application runtime. Shader compilation component 316 may generate compiled versions of the initial set of shader programs that are compatible with client devices 108 associated with multiple different hardware states and/or software states. Shader compiler component 316 may also generate a shader key for each version of the compiled shader program 302 and, in some embodiments a shader value for each compiled shader program 302. Responsive to storing the different compiled shader program versions to aggregated shader cache 114, shader compilation component 314 may generate an entry for each shader program version at shader cache data structure 318 where each entry includes a mapping between a shader key, a shader value, and a memory address of aggregated shader cache 114 that stores a respective compiled shader program 302.

In some embodiments, shader compilation component 314 may compile one or more shader programs responsive to detecting that a hardware state and/or a software state (e.g., driver version, etc.) at one or more client devices 108 connected to platform 102 has been updated or is going to be updated. In one embodiment, shader compilation component 314 may receive a notification from a client device 108 (e.g., with a request to modify aggregated shader cache 114) and/or another component of platform 102 indicating that a driver running on the client device 108 has been updated or is going to be updated from a first version to a second version. In other or similar embodiments, shader compilation component 316 may detect that a current version of the shader key included in a current request from the client device 108 to modify aggregated shader cache 114 is different from a prior version of the shader key included in one or more prior requests received from the client device 108 or other client devices 108 that share the prior version of the shader key. For example, the difference in the current version of the shader key and the prior version of the shader key for a client device 108 may indicate that a driver running on client device 108 has been updated from a first version to a second version. In response to detecting that the driver running on the client device 108 has been updated or is going to be updated from the first version to a second version, shader compilation component 314 may identify an entry 402 at data structure 318 including a shader key that corresponds to the first version of the driver. Shader compiler component 316 may obtain the source code for the compiled shader program 302 associated with the identified entry and initiate a compilation process to generate an updated compiled version of the shader program that is compatible with the second version of the driver. Shader compiler component 316 may store the updated compiled shader program 302 to the aggregated shader cache 114, in accordance with embodiments provided herein, and may generate an entry 402 for data structure 318 that corresponds to the updated compiled shader program 302. In some embodiments, shader compilation component 314 may remove the entry 402 including the shader key that corresponds to the first version of the driver from data structure 318 (e.g., in response to determining that the first version of the driver is obsolete, etc.).

In some embodiments, entries 402 of data structure 318 may include additional fields that include additional information associated with a compiled shader program 302. For example, entries 402 may include a shader set field (not shown) that is configured to indicate a set of shader programs that includes a particular shader program. The set of shader programs may correspond to one or more shader programs that are associated with one or more related application objects 132 of application 130. For example, a set of shader programs may correspond to one or more shader programs that are associated with a particular gaming level and/or series of gaming tasks of a video game application. In some embodiments, one or more sets of shader programs may be defined by a developer of the application 130. In other or similar embodiments, one or more sets of shader programs may be determined by platform 102 and/or shader cache engine 110 based on one or more runtime compiled shader programs 234 that are compiled at one or more client devices 108. Shader retrieval component 310 may identify an entry 402 of data structure 318 that includes a shader key that corresponds to a shader key for a client device 108 that has initiated the process to initialize application instance 222, as described previously. Shader retrieval component 310 may determine, based on the shader set field, that the compiled shader program 302 associated with the identified entry 402 corresponds to a particular set of shader programs. Shader retrieval component 310 may identify one or more additional entries 402 of data structure 318 that include compiled shader programs 302 that also correspond to the particular set of shader programs and may retrieve the compiled shader programs 302 of the additional entries with the compiled shader program 302 of the initially identified entry 42. In some embodiments, shader retrieval component 310 may determine that one or more shader programs that correspond to the particular set of shader programs are not associated with any entries of data structure 318 and are therefore not stored at aggregated shader cache 114. In such embodiments, shader compilation component 314 may obtain the source code for the one or more shader programs and may initiate a compilation process to compile the one or more shader programs, as described above. Shader retrieval component 310 may transmit, to client device 108, a set of compiled shader programs that includes each of the set of shader programs (i.e., stored at aggregated shader cache 114 and/or compiled by shader compilation component 314), as indicated in the identified entry 402. Responsive to compiling the shader programs of the set of shader programs, shader compilation component 314 may store the compiled shader programs 302 at aggregated shader cache 114 and may generate corresponding entries for the compiled shader programs 302 at data structure 318, in some embodiments.

In additional or alternative embodiments, data structure 318 may not include a shader set field. In such embodiments, shader retrieval component 310 may determine shader programs that should be compiled and sent to client device 108 with corresponding compiled shader programs 302 at aggregated shader cache 114 according to other techniques. For example, in response to identifying an entry 402 of data structure 318 that corresponds to a shader key for client device 108, shader retrieval component 310 may provide a shader key and/or shader value associated with the compiled shader program 302 as input to a machine learning model. The machine learning model may be trained (e.g., based on experimental data, based on application runtime data, etc.) to determine which shader programs are likely to be referenced by an application instance (e.g., within a particular time period). Shader retrieval component 310 may obtain one or more outputs of the trained machine learning model. The outputs may include shader keys and/or shader values for one or more shader programs for an application and an indication of a level of confidence that each respective shader program is to be referenced by the application (or the application instance 222) running on client device 108 (e.g., within the particular time period). Shader retrieval component 310 may identify one or more shader programs associated with a level of confidence that exceeds a threshold level of confidence and may obtain source code for the one or more identified shader programs. Shader compilation component 316 may generate compiled versions of the one or more identified shader programs based on the obtained source code and may transmit a set of compiled shader programs including the compiled shader programs to client device 108, in accordance with previously described embodiments.

Shader retrieval component 310 may retrieve one or more compiled shader programs 302 from aggregated shader cache 114 and may transmit a set of compiled shader programs (including the retrieved compiled shader programs 302 and/or shader programs compiled by shader compilation component 314) to client device 108, as described previously. As described with respect to FIG. 2, shader manager 204 may compile a shader program at client device 108 during the runtime of application 130 or application instance 222 (i.e., runtime compiled shader program 234). Shader manager 204 may transmit the runtime compiled shader program 234 to platform 102 (represented in FIG. 3A as compiled shader program 302) along with a request to modify aggregated shader cache 114 in view of the compiled shader program 302. Shader validation component 314 may validate the received compiled shader program 302 before storing the compiled shader program 302 at aggregated shader cache 114, in some embodiments. In some embodiments, shader validation component 312 may store the received compiled shader program 302 at temporary bugger 320 at data store 112. The temporary buffer 320 may be a portion of memory at data store 112 that is configured to temporarily store compiled shader programs 302 received from client devices before the respective compiled shader program 302 is validated by shader validation component 312.

Shader validation component 312 may track each respective compiled shader program 302 that is temporarily stored at temporary buffer 320 using a temporary buffer data structure 322. Temporary buffer data structure 322 includes a mapping of a shader key and/or shader value associated with a compiled shader program 302 and a memory address for a portion of temporary memory buffer 320 that temporarily stores compiled shader program 302. FIG. 5 depicts an example temporary buffer data structure 322, in accordance with at least one embodiment. Each entry 502 of data structure 322 may include a shader key field 504, shader value field 506, temporary buffer memory address field 510, and validation counter field 512. In some embodiments, each entry 502 of data structure 322 may also include a device identifier field 508.

In response to receiving a request to modify aggregated shader cache 114, shader validation component 312 may determine whether the compiled shader program 302 is already stored at shader cache 114 and/or at temporary buffer 320. The request from client device 108 may include a shader key and/or shader value associated with the compiled shader program 302, in accordance with previously described embodiments. In some embodiments, the request from client device 108 may include a shader key and shader validation component 312 may generate a shader value for the received shader program 302 (e.g., by applying a hashing function to source code of the received compiled shader program 302). Shader validation component 312 may parse through shader cache data structure 318 and determine whether an entry 402 of data structure 318 corresponds to the shader key and/or shader value for the received compiled shader program 302 (i.e., based on the shader key field 404 and/or the shader value field 406 of each entry 402). In some embodiments, responsive to determining that an entry 402 corresponds to the shader key and/or the shader value for the received compiled shader program 302, shader validation component 312 may transmit a notification to client device 108 indicating the received compiled shader program 302 is already stored at shader cache 114. In other or similar embodiments, shader validation component 312 may not transmit any notification to client device 108 and may disregard the request to store the compiled shader program 302 at aggregated shader cache 114.

In response to determining that no entries of data structure 318 correspond to the shader key and/or shader value for the received compiled shader program 302, shader validation component 312 may parse through temporary buffer data structure 320 to determine whether an entry 502 of temporary buffer data structure 322 corresponds to the shader key and/or shader value associated with the received compiled shader program 302 (i.e., via shader key field 504 and/or shader value field 506 for each entry 502). In response to determining that no entry 502 of data structure 322 corresponds to the shader key and/or shader value for the compiled shader program 302, shader validation component 312 may temporarily store the received compiled shader program 302 at temporary buffer 320 and generate an entry 502 of data structure 322 for the compiled shader program 302. Shader validation component 312 may populate the shader key field 504 for the generated entry 502 with the shader key associated with the client device 108 and the shader value field 506 with the shader value generated for the compiled shader program 302. Shader validation component 312 may also obtain an identifier associated with client device 108 and populate the client device identifier field with the obtained identifier. In some embodiments, the request to modify aggregated shader cache 114 may include an identifier associated with the client device 108. In other or similar embodiments, the client device identifier may be associated with the virtualized system 220 constructed at the client device 108 to support the application instance 222, rather than the client device 108 itself. Shader validation component 312 may also populate the temporary buffer memory address field 510 with the physical address of temporary buffer 320 that stores the compiled shader program 302.

In some embodiments, shader validation component 312 may initialize a validation counter for the compiled shader program 302 and add a current value of the validation counter to the validation counter field 512. The validation counter may track a number of distinct client devices 108 or virtualized computing systems 220 running at client devices 108 that have transmitted a request to store a compiled shader program 302 associated with the corresponding shader value and shader key at shader cache 114. Validation component 312 may initialize the validation counter for compiled shader program 302 by setting the current value of the validation counter to a value of "1," in some embodiments. In an illustrative example, client device 108A associated with the shader key of "66HY32" may transmit a request to modify aggregated shader cache 114 to a compiled shader program 302. Shader validation component 312 may obtain a shader value for the compiled shader program 302 (e.g., "25FW5FN20") and may determine whether the compiled shader program 302 is already stored at aggregated shader cache 114 and/or temporary buffer 320, in accordance with previously described embodiments. Responsive to determining that the compiled shader program 302 is not stored at aggregated shader cache 114 or temporary buffer 320, shader validation component 312 may store the compiled shader program 302 at temporary buffer 320 and generate an entry 502 for the compiled shader program 302 at data structure 322. For instance, shader validation component 312 may obtain a client device identifier associated with client device 108A and populate client device identifier field 508 with the obtained client device identifier. Shader validation component 312 may set the current value of the validation counter to "1" as no other client devices 108 have transmitted a request to modify aggregated shader cache 114 to include a compiled shader program 302 associated with the corresponding shader key and shader value.

In some embodiments, shader validation component 312 may determine that a compiled shader program 302 received from a client device 108 is already stored at temporary buffer 320, in accordance with previously described embodiments. Shader validation component 312 may identify an entry 502 of data structure 322 that corresponds to the received compiled shader program 302 (i.e., based on the shader key field 504 and the shader value field 506 for each entry 502). Shader validation component 312 may obtain a client device identifier associated with client device 108 and compare the obtained identifier to the device identifiers included in the client device identifier field 508 of the identified entry 402. In response to determining that the obtained identifier corresponds to a device identifier already included in the client device identifier field 508, shader validation component 312 may transmit a notification to the client device 108 indicating shader validation component 312 has already received a request to modify aggregated shader cache 114 to include the compiled shader program 302. In additional or alternative embodiments, shader validation component 312 may not transmit a notification to client device 108 and instead may dismiss the request to modify aggregated shader cache 114. In response to determining that the obtained identifier does not correspond to a device identifier included in the client device identifier field 508 of the identified entry 502, shader validation component 312 may increase a current value of the validation counter associated with the compiled shader program 302 (e.g., by a value of "1") and update the validation counter field 512 of the identified entry to reflect the increased value of the validation counter.

In one illustrative example, an application 130 or application instance 222 running at client device 108B terminates and shader manager 204 of client device 108B transmits a request to platform 102 to modify aggregated shader cache 114 to include a respective compiled shader program 302. Client device 108B may be associated with a shader key of "3DS02F" and a client device identifier of "5844." Shader validation component 312 may generate a first shader value (e.g., "3DDG538WD") for the compiled shader program 302 received from client device 108B and may identify a first entry 502 that is associated with the first shader value and the shader key associated with client device 108B. In response to determining that the client device identifier associated with client device 108B (i.e., "5844") does not correspond to a device identifier included in client device identifier field 508 of the first entry 502, shader validation component 312 may update a value of a validation counter for the compiled shader program (e.g., by incrementing the current value by "1").

In another illustrative example, an application 130 or application instance 222 running at client device 108N terminates and shader manager 204 at client device 108N transmits a request to platform 102 to modify aggregated shader cache 114 to include another respective compiled shader program 302. Client device 108N may be associated with a shader key of "FD93X3" and a client device identifier of "1008." Shader validation component 312 may generate a second shader value (e.g., "ZDG26SF29") for the compiled shader program 302 received from client device 108N and may identify a second entry 502 that is associated with the second shader value and the shader key associated with client device 108N. In response to determining that the client device identifier associated with client device 108N (e.g., "1008") corresponds to a device identifier included in client device identifier field 508 of the second entry 502, shader validation component 312 transmit a notification to client device 108N, as previously described, or may disregard the request from client device 108N to modify aggregated shader cache 114. In some embodiments, shader validation component 312 may initiate a security procedure with respect to client device 108N (e.g., by reporting client device 108N to a security component of platform 102, etc.).

In some embodiments, shader validation component 312 may determine that a current value of a validation counter associated with a compiled shader program 302 satisfies a validation criterion. For example, shader validation component 312 may determine that a current value of the validation counter indicated in a validation counter field 512 of an entry meets or exceeds a threshold counter value. The threshold counter value may correspond to a previously defined number of client devices that (e.g., by platform 102, by the application developer, etc.) have previously submitted a compiled version of a shader program 302 for storage at aggregated shader cache 114 such that the compiled shader program 302 is determined to be safe (e.g., non-malicious, no bugs present, etc.). In response to determining that a current value of a validation counter satisfies the validation criterion, shader validation component 312 may modify aggregated shader cache 114 to include the compiled shader program 302 and generate an entry for the compiled shader program 302 at shader cache data structure 316, in accordance with previously described embodiments. Shader validation component 312 may also erase the compiled shader program 302 from temporary buffer 320 and remove the entry 502 for the compiled shader program 302 from temporary buffer data structure 322. Once the compiled shader program 302 is moved from temporary buffer 320 to shader cache 114, shader retrieval component 310 may provide the compiled shader program 302 in response to requests from client devices 108, in accordance with previously described embodiments.

In some instances, a compiled shader program 302 may remain at temporary buffer 320 without being moved to aggregated shader cache 114 for a significant period of time. In some embodiments, shader validation component 312 may maintain a timer for each shader program 302 stored at temporary buffer 320. In response to a time for a respective shader program 302 exceeding a threshold value, shader validation component 312 may erase the compiled shader program 302 from temporary buffer 320 and may erase the entry 502 associated with the compiled shader program 302 from data structure 322. Additionally or alternatively, in response to determining that temporary buffer 320 does not have sufficient space to temporarily store each received compiled shader program 302, shader validation component 312 may remove a compiled shader program 302 from temporary buffer 320 that is older than other compiled shader programs 302 at temporary buffer 320 (e.g., in view of the timer).

Figure 3B:
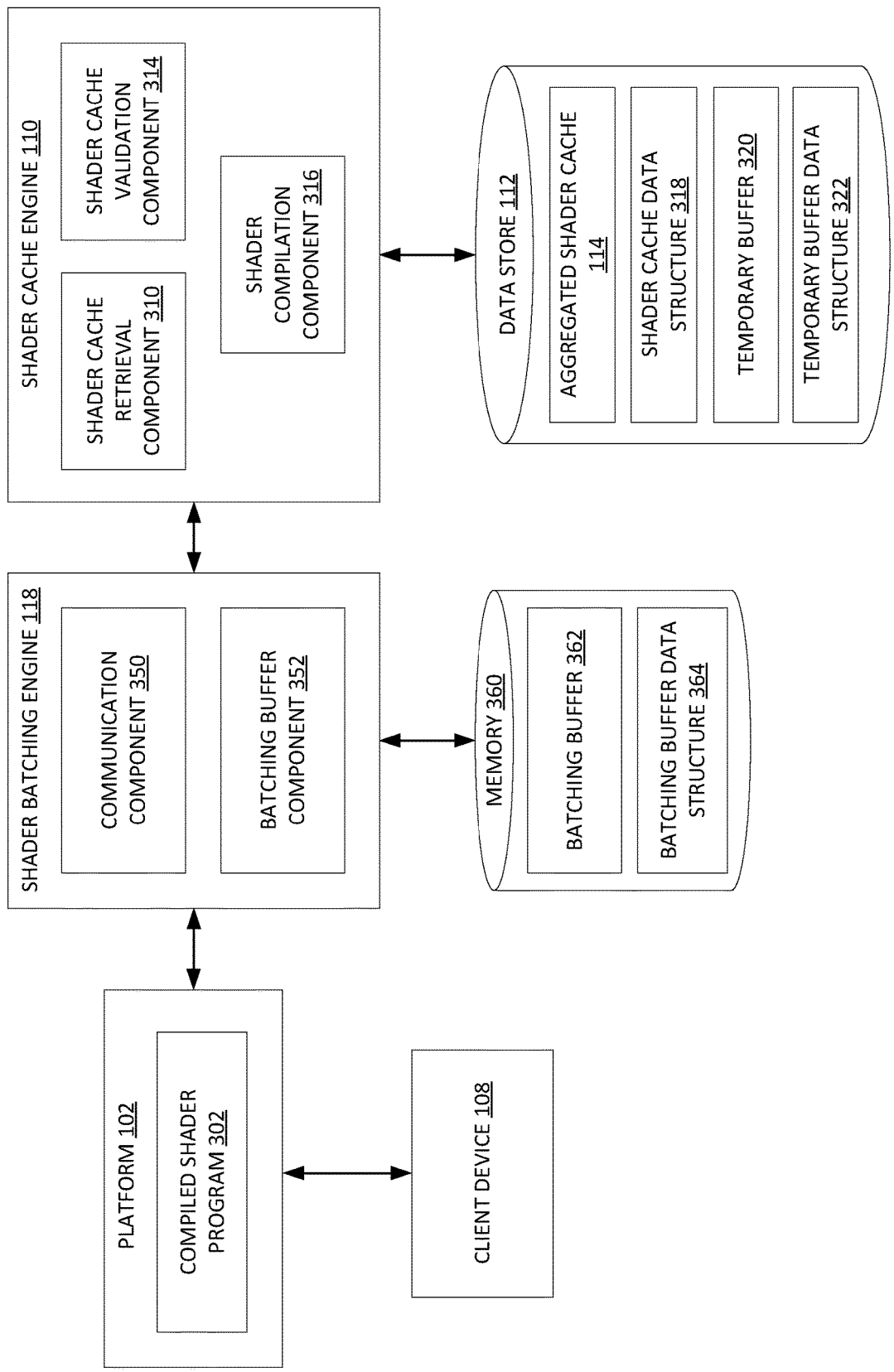
FIG. 3B is a block diagram of an example shader cache engine and an example shader batching engine, according to at least one embodiment.

FIG. 3B is a block diagram of an example shader cache engine 110 and an example shader batching engine 118, according to at least one embodiment. As described with respect to FIGS. 1A and 1B, shader manager 204 may transmit a request to modify aggregated shader cache 114 to shader batching engine 118 instead of shader cache engine 110. Shader batching engine 118 may be configured to collect compiled shader programs 302 from multiple distinct client devices 108 connected to application hosting platform 102 and transmit the collected compiled shader programs 302 to platform 102 as a set (or a batch) of collected compiled shader programs. Shader batching engine 118 may serve, in some embodiments, as an intermediary between client devices 108 and shader cache engine 110, which may reduce an amount of network traffic between client devices 108 and platform 102.

In some embodiments, shader batching engine 118 may reside on a server machine that is separate from a server machine that supports application hosting platform 102 (e.g., server machine 116 of FIGS. 1A and 1B). In other or similar embodiments, server batching engine 118 may reside on a server machine that supports application hosting platform 102. Shader batching engine 118 may include a communication component 350 and a batching buffer component 352. Communication component 350 may be configured to receive compiled shader programs 302 from client devices 108. As described above, a shader manager 204 for a client device 108 may transmit a request to modify aggregated shader cache 114 in response to detecting that an application 130 (or application instance 222) has terminated at client device 108. Communication component 350 of shader batching engine 118 may receive the request to modify aggregated shader cache 114. In some embodiments, the request may include one or more compiled shader programs 302 that are to be used to modify aggregated shader cache 114, as previously described.

Batching buffer component 352 may store one or more compiled shader programs 302 received from a client device to a temporary batching buffer 362 (referred to as batching buffer 362 herein). Batching buffer 362 may be a portion of a memory 360 for shader batching engine 118 that is configured to store compiled shader programs 302 that are to be sent in a batch to platform 102. As described with respect to FIG. 1B, system architecture 150 may include one or more nodes 152 that include hardware and/or software resources that are configured to service one or more client devices 108 connected to platform 102. Each node 152 may host a portion of aggregated shader cache 114. In some embodiments, each portion of aggregated shader cache 114 hosted by a respective node 152 may be the same or similar as other portions of aggregated shader cache 114 hosted by other nodes 152. In such embodiments, batching buffer 362 may be configured to store compiled shader programs 302 that are received from client devices 108 serviced by multiple nodes 152. In other or similar embodiments, each portion of aggregated shader cache 114 may be distinct from the other portions of aggregated shader cache 114, as described with respect to FIG. 1B. In such embodiments, memory 360 may include multiple batching buffers 362 that are each configured to store compiled shader programs 302 received from client devices 108 serviced by a respective node 152.

Batching buffer component 352 may maintain a batching buffer data structure 364 associated with each batching buffer 362 at memory 360, in some embodiments. Each entry of batching buffer data structure 364 may include at least a first field indicating a shader key associated with a received compiled shader program 302 and a second field indicating a memory address for batching buffer 362 that stores the received compiled shader program 302. Batching buffer component 352 may obtain a shader key associated with a received compiled shader program 302 in accordance with embodiments described herein. For example, the shader key associated with a received compiled shader program 302 may be included in the request to modify aggregated shader cache 114. In another example, batching buffer component 352 may generate the shader key, in accordance with previously described embodiments. In response to storing a compiled shader program 302 at batching buffer 362, batching buffer component 352 may generate an entry for batching buffer data structure 364 that corresponds to the stored compiled shader program 302. Batching buffer component 352 may populate the first field of the generated entry with the obtained shader key and the second field of the generated entry with the memory address for batching buffer 362 that stores the compiled shader program 302, in some embodiments. In an illustrative example, a request to modify aggregated shader cache 114 may include two or more compiled shader programs 302 and a shader key associated with the client device 108 that compiled the two or more compiled shader programs 302. Responsive to storing the two or more compiled shader programs 302 at batching buffer 362, batching buffer component 352 may generate two or more entries of batching buffer data structure 362 associated with the two or more compiled shader programs 302. The first field of each of the two or more entries may include an indication of the shader key included in the received request. In other or similar embodiments, batching buffer may generate a single entry of batching buffer data structure 362 associated with the two or more compiled shader programs 302. The first field of the single entry may include an indication of the shader key and the second field of the single entry may include an indication of two or more memory addresses (e.g., a range of memory addresses) that store the two or more compiled shader programs 302 included in the request.

Batching buffer component 352 may maintain a counter to track a number of compiled shader programs 302 that are stored at batching buffer 362, in some embodiments. Batching buffer component 352 may increase a value of the counter (e.g., by a value of "1") for each compiled shader program 302 that is stored at batching buffer 362. In other or similar embodiments, batching buffer component 352 may increase the value of the counter for each request to modify aggregated shader cache 114 received from a respective client device 108 (i.e., regardless of a number of compiled shader programs 302 included in each request). In response to batching buffer component 352 determining that the value of the counter meets or exceeds a threshold value, communication component 350 may block incoming requests to modify aggregated shader cache 114 from client devices 108, in some embodiments. In other or similar embodiments, batching buffer component 352 may modify a setting associated with batching buffer 362 to prevent additional compiled shader programs 302 from being stored at batching buffer 362 after the value of the counter meets or exceeds the threshold value. For example, before the value of the counter meets or exceeds the threshold value, an initial setting associated with batching buffer 362 may be set to allow programming (e.g., write) operations and read operations to be performed at batching buffer 362. After the value of the counter meets or exceeds the threshold value, batching buffer component 352 may update the setting to prevent programming operations from being performed and only allow read operations to be performed at batching buffer 362.

Communication component 350 may transmit a batch of collected compiled shader programs to platform 102 and/or shader cache engine 110, as described above. The batch of collected compiled shader programs may include each compiled shader program 302 that was stored at batching buffer 362 before the value of the counter met or exceeded the threshold value. In some embodiments, communication component 350 may transmit an indication of a corresponding shader key with each compiled shader programs 302 at batching buffer 362. For example, communication component 350 and/or batching buffer component 352 may parse through batching buffer data structure 364 and identify a respective shader key associated with each of the compiled shader programs 302 stored at batching buffer 362. Communication component 350 may transmit an indication of each identified shader key with the batch of collected compiled shader programs to platform 102 and/or shader cache engine 110, in some embodiments. As described above, each batching buffer 362 may be configured to store compiled shader programs 302 received from client devices 108 serviced by a respective node 152, in some embodiments. In such embodiments, communication component 350 may transmit the batch of collected compiled shader programs and the indication of corresponding shader keys to a shader cache engine 110 for the respective node 152.

In response to communication component 350 transmitting the batch of collected compiled shader programs to platform 102 and/or shader cache engine 110, batching buffer component 352 may remove (e.g., erase) the compiled shader programs 302 from batching buffer 362. Batching buffer component 352 may also, in some embodiments, remove one or more entries of batching buffer data structure 364 that correspond to the removed compiled shader programs 302. In some embodiments, batching buffer component 352 may update a setting associated with batching buffer 362 to allow additional compiled shader programs 302 to be stored at batching buffer 362. In accordance with the previous example, batching buffer component 352 may update the setting for batching buffer 362 to allow programming operations and read operations to be performed at batching buffer 362. Communication component 350 may receive additional compiled shader programs 302 from client devices 108, in accordance with described embodiments. Batching buffer component 352 may store the received additional compiled shader programs 302 at batching buffer 362, as previously described.

Figure 6:
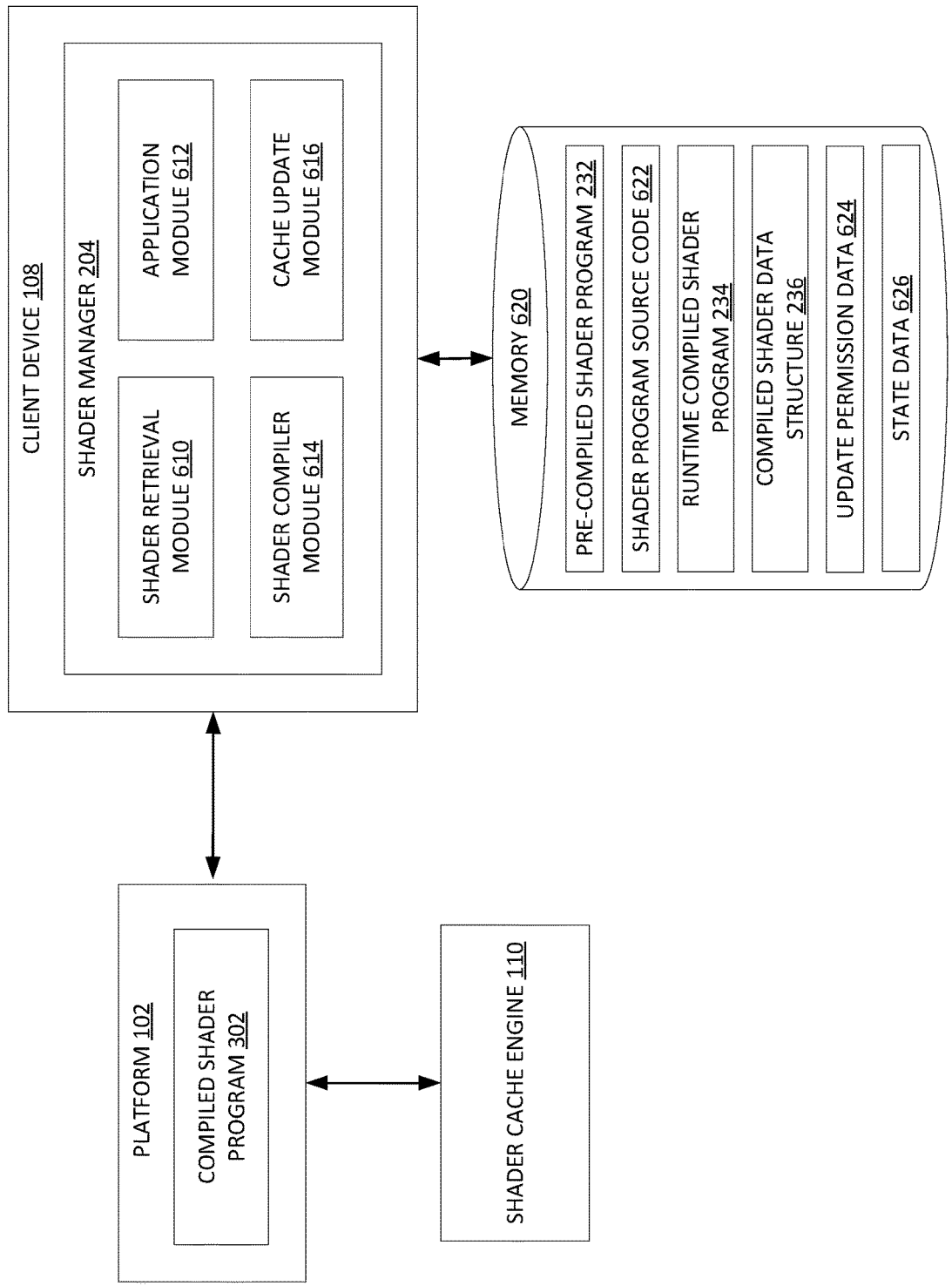
FIG. 6 is a block diagram of a shader manager running on a client device, according to at least one embodiment.

FIG. 6 is a block diagram of a shader manager 204 running on a client device, according to at least one embodiment. In some embodiments, shader manager 204 may be part of a content viewing component at client device 108, as previously described. In other or similar embodiments, shader manager 204 may be executed by hypervisor 202 and or a guest OS 224 of a virtualized system 220. Shader manager 204 may include a shader retrieval module 610, an application module 612, a shader compiler module 614, and a cache update module 616. Client device 108 may be coupled to memory 620, in some embodiments. Memory 620 may correspond to memory 210 and/or memory 228, described with respect to FIG. 2. As described above, an application 130 and/or an instance of application 130 (i.e., application instance 222) may be initialized to run on client device 108. It should be noted that although some embodiments of the present disclosure are directed to initializing an application 130 at client device 108, such embodiments may be applied to an application instance 222 initialized at client device 108. Similarly, embodiments directed to initializing an application instance 222 at client device 108 may be applied to an application 130 initialized at client device 108.

Shader retrieval module 610 may detect that a process to initialize application 130 at client device 108 is initiated. In response to detecting that the initialization process is initiated, shader retrieval module 610 may obtain one or more compiled shader programs 302 associated with application 130. In some embodiments, shader cache engine 110 of platform 102 may detect that the initialization process is initiated at client device 108 and may transmit the set of compiled shader programs to client device 108, as previously described. In other or similar embodiments, shader retrieval module 610 may transmit a request for the set of compiled shader programs to shader cache engine 110 in response to detecting the initialization process is initiated at client device 108, in some embodiments. In response to obtaining the one or more compiled shader programs 302, shader retrieval module 610 may store the compiled shader programs 302 at memory 620 as pre-compiled shader programs 232, as previously described.

Application module 612 may be configured to detect when an application 130, or an application instance 222, running at client device 108 references a particular shader program during an application runtime. In some embodiments, the application 130 may reference the shader program by referencing an application object 132 that is associated with the shader program. In other or similar embodiments, application 130 may reference the shader program by directly referencing the shader program. In response to detecting that application 130 has referenced the shader program, application module 612 may determine whether a compiled version of the shader program (i.e., compiled shader program 302) is stored at memory 620 (i.e., as a pre-compiled shader program 232). If the referenced shader program is stored at memory 620, application module 612 may retrieve the pre-compiled shader program 232 and execute the pre-compiled shader program 232 in accordance with the reference by application 130.

In response to application module 612 determining that the referenced shader program is not stored at memory 620 as a pre-compiled shader program 232, shader compiler module 614 may retrieve a source code 622 of the referenced shader program and may initiate a compilation process to compile the shader program locally. In some embodiments, the shader program source code 622 may be stored at memory 620. For example, during an initialization of application 130 at client device 108, platform 102 may transmit the source code 622 of each shader program for the application 130 to client device 108. Accordingly, shader compiler module 614 may retrieve the source code 622 of the shader program from memory 620 and compile the shader program locally, as previously described. In other or similar embodiments, shader compiler module 614 may transmit a request to platform 102 for the source code 622 of the shader program.

In response to shader compiler module 614 completing the process to generate a compiled version of the referenced shader program, application module 610 may execute the runtime compiled shader program 234, in accordance with the reference by application 130. Shader compiler module 614 may store the compiled shader program at memory 620 as runtime compiled shader program 234. In some embodiments, shader compiler module 614 may generate an entry in a compiled shader data structure 236 associated with the runtime compiled shader program 234, in some embodiments. Each entry of compiled shader data structure 236 may include a first field that includes an identifier associated with the runtime compiled shader program 234 and a second field that includes a memory address of memory 620 that stores the runtime compiled shader program 234. In some embodiments, the identifier associated with the runtime compiled shader program 234 may be a shader value, as described above. Other identifiers associated with the runtime compiled shader program 234 may be included in the identifier field of each entry of data structure 236, in other or similar embodiments. In some embodiments, data structure 236 may also include entries that correspond to pre-compiled shader programs 232 stored at memory 620. In such embodiments, each entry may additionally include a third field that includes an identifier of whether associated compiled shader program is a pre-compiled shader program 232 or a runtime compiled shader program 234.

In some embodiments, memory 620 may not store a compiled shader data structure 236. In such embodiments, a first portion of memory 620 may be allocated (e.g., by shader manager 204) to store pre-compiled shader programs 232 and a second portion of memory 620 may be allocated to store runtime compiled shader programs 234. Accordingly, in response to shader retrieval module 610 receiving the set of compiled shader programs from platform 102, shader retrieval module 610 may store the set of compiled shader programs at the first portion of memory 260 as pre-compiled shader programs 232. In addition, responsive to generating a runtime compiled shader program 234, shader compiler module 614 may store the runtime compiled shader program 234 at the second portion of memory 620.

In some embodiments, application module 612 may detect that application 130 (or application instance 222) has terminated at client device 108, as described previously. In response to application module 612 detecting that application 130 has terminated, cache update module 616 may determine whether any runtime compiled shader programs 234 are stored at memory 620 that are to be included in a request to modify aggregated shader cache 114. In some embodiments, cache update module 616 may parse compiled shader data structure 236 to identify one or more runtime compiled shader programs 234 that were generated during the runtime of the application 130. In other or similar embodiments, cache update module 616 may determine whether any runtime compiled shader programs 234 are stored in the second portion of memory 620, as described above.

In some embodiments, cache update module 616 may further determine whether client device 108 is permitted by platform 102 to modify aggregated shader cache 114 in view of the runtime compiled shader programs 234 generated during the runtime of application 130 (or application instance 222). Cache update module 616 may determine whether client device 108 is permitted to modify aggregated shader cache 114 by determining whether a modification condition associated with application 130 (or application instance 222) is satisfied. In some embodiments, cache update module 616 may determine that the modification condition associated with application 130 is satisfied responsive to determining that application 130 is included in a set of applications running on respective client devices 108 that are permitted by platform 102 to modify aggregated shader cache 114. In an illustrative example, platform 102 may define a cache modification policy that approximately 10% of client devices 108 that are connected to platform 102 and have terminated an application instance 222 within a particular time period are permitted to transmit requests to modify shader cache 114. In such example, update permission data 624 at memory 620 may include an indication of whether the client device 108 is included in a set of the approximately 10% of client devices associated with the cache modification policy. Cache update module 616 may determine that the modification condition associated with application instance 222 is satisfied in response to determining, in view of update permission data 624, that the client device 108 is included in the approximately 10% of client devices associated with the cache modification policy. In another example, platform 102 may define an additional or alternative cache modification policy that no client devices 108 connected to platform 102 are permitted to transmit requests to modify aggregated shader cache 114 if an application instance 222 at a respective client device 108 is terminated within a high traffic time period for the application hosting platform. In such example, update permission data 624 may include an indication of the high traffic time period associated with the cache modification policy. Cache update module 616 may determine that the modification condition associated with application instance 222 is satisfied responsive to determining that application instance 222 is terminated in a time period outside of the high traffic time period indicated by update permission data 624.

In response to determining that client device 108 is permitted to modify aggregated shader cache 114, cache update module 616 may retrieve the identified runtime compiled shader programs 234 at memory 620 and generate a request to modify aggregated shader cache 114 in view of the identified runtime compiled shader programs 234. In some embodiments, cache update module 616 may generate a shader key associated with client device 108 to be included in the generated request. As described above, the shader key may be generated based on a hardware state and/or software state associated with client device 108. The hardware state and/or software state may be stored at memory 620 as state data 626, in some embodiments. In an illustrative example, cache update module 616 may generate the shader key by applying a hashing function to state 626. In additional or alternative embodiments, the generated request may include a shader value for each of the runtime compiled shader programs 234. As described above, each entry of compiled shader data structure 236 may have a field that includes a shader value associated with a respective runtime compiled shader program 234. Accordingly, cache update module 616 may obtain a shader value for each runtime compiled shader program 234 of the request from data structure 236. In other or similar embodiments, cache update module 616 may generate a shader value for each runtime compiled shader program 234 (e.g., by applying a hashing function to the source code 622 for each runtime compiled shader program 234).

In some embodiments, cache update module 616 may transmit the generated request (including the runtime compiled shader program(s) 234, the shader key, and/or one or more shader values) to platform 102 and/or shader cache engine 110. In other or similar embodiments, cache update module 616 may transmit the generated request to shader batching engine 118. In response to cache update module 616 transmitting the generated request, client device 108 may remove at least the pre-compiled shader program(s) 232, the shader program source code 622, the runtime compiled shader program(s) 234 and/or the compiled shader data structure 236 from memory 620. For example, after application instance 222 terminates at the virtual system 220 of client device 108, cache update module 616 may transmit the request to modify aggregated shader cache 114, as provided above. In response to cache update module 616 transmitting the request, hypervisor 202 for virtual system 220 may deconstruct virtual system 220 at client device 108. In some embodiments, hypervisor 202 may deconstruct virtual system 220 by removing (e.g., erasing) all data associated with application instance 222 from abstracted memory 228 (and memory 210), including pre-compiled shader program(s) 232, the shader program source code 622, the runtime compiled shader program(s) 234, the compiled shader data structure 236, etc.

As described above, client device 108 may initiate another process to re-initialize application 130 (or application instance 222) at client device 108. Shader retrieval module 610 may obtain the set of compiled shader programs from platform 102, in accordance with previously described embodiments. In some embodiments, the set of compiled shader programs received during the re-initialization process may include one or more compiled shader programs 302 that were compiled during the previous runtime for application 130 or application instance 222.

FIGS. 7, 8, 9A, and 9B are flow diagrams of example methods 700, 800, 900, and 950, respectively, that are related to an aggregated shader cache for applications in a cloud computing environment, according to at least some embodiments. In at least one embodiment, methods 700, 800, 900, and/or 950 may be performed by server machine 106, server machine 116, client device 108, or some other computing device, or a combination of multiple computing devices. Methods 700, 800, 900, and/or 950 may be performed by one or more processing units (e.g., CPUs and/or GPUs), which may include (or communicate with) one or more memory devices. In at least one embodiment, methods 700, 800, 900, and/or 950 may be performed by multiple processing threads (e.g., CPU threads and/or GPU threads), each thread executing one or more individual functions, routines, subroutines, or operations of the method. In at least one embodiment, processing threads implementing methods 700, 800, 900, and/or 950 may be synchronized (e.g., using semaphores, critical sections, and/or other thread synchronization mechanisms). Alternatively, processing threads implementing methods 700, 800, 900, and/or 950 may be executed asynchronously with respect to each other. Various operations of methods 700, 800, 900, and/or 950 may be performed in a different order compared with the order shown in FIGS. 7, 8, 9A, and 9B. Some operations of the methods may be performed concurrently with other operations. In at least one embodiment, one or more operations shown in FIGS. 7, 8, 9A, and 9B may not always be performed.

FIG. 7 illustrates a flow diagram of an example method 700 of maintaining an aggregated shader cache for applications in a cloud computing environment, according to at least one embodiment. In some embodiments, one or more operations of method 700 may be performed by one or more components or modules of shader cache engine 110, described herein. Processing units performing method 700 may receive, at block 710, a request to modify a shader cache for an application in view of an aggregated set of compiled shader programs for the application. In some embodiments, the shader cache may correspond to aggregated shader cache 114, described herein. Each of the set of compiled shader programs may have been compiled by a first client device (e.g., client device 108A) during a runtime of an instance of the application, in some embodiments. Client device 108A may be connected to platform 102 via a network, as described above. In some embodiments, client device 108A may include a virtual machine that is instantiated using a cloud environment, in accordance with previously described embodiments.

At block 712, processing units performing method 700 may validate a respective compiled shader program of the set of compiled shader programs. Processing units performing method 700 may determine whether the respective compiled shader program corresponds to a compiled shader program stored at a temporary buffer for aggregated shader cache 114. In response to determining that the respective compiled shader program corresponds to a compiled shader program at the temporary buffer, the processing units performing method 700 may update a counter associated with the compiled shader program at the temporary buffer in view of the respective compiled shader program. In response to determining that the respective compiled shader program does not correspond to a compiled shader program at the temporary buffer, the processing units performing method 700 may store the respective compiled shader program at the temporary buffer and may initialize a counter associated with the respective compiled shader program. Processing units performing method 700 may validate the respective compiled shader program by determining that a counter associated with the respective compiled shader program exceeds a threshold value.

At block 714, processing units performing method 700 may modify the shader cache in view of the respective compiled shader program. In some embodiments, the processing units performing method 700 may modify aggregated shader cache 114 by adding the respective compiled shader program to aggregated shader cache 114. For example, the processing units performing method 700 may determine that the respective compiled shader program does not correspond to a precompiled shader program of aggregated shader cache 114 and, in response to the determination, add the compiled respective compiled shader program to aggregated shader cache 114. In other or similar embodiments, the processing units performing method 700 may modify aggregated shader cache 114 by detecting a discrepancy between the respective compiled shader program and a corresponding compiled shader program of aggregated shader cache 114. In response to detecting the discrepancy, the processing units performing method 700 may replace the compiled shader program of aggregated shader cache 114 with the respective compiled shader program.

At block 716, processing units performing method 700 may detect that an instance is initialized at a client device. In some embodiments, the instance may be initialized at a second client device 108 connected to platform 102 (e.g., client device 108B). At block 718, processing units performing method 700 may provide an additional set of compiled shader programs from the modified shader cache to the client device. The additional set of compiled shader programs may include one or more compiled shader programs that satisfy a condition associated with client device 108B. The one or more conditions associated with client device 108B may include a hardware condition and/or a software condition for client device 108B. In an illustrative example, client device 108B may be associated with a particular type of GPU or a particular version of a driver running on the GPU. One or more of the additional set of compiled shader programs may be associated with the particular type of GPU or the particular driver version, thus satisfying a hardware condition and/or a software condition for client device 108B.

In some embodiments the processing units performing method 700 may obtain source code for an additional shader program associated with the application running at client device 108B and/or client device 108B and may generate a compiled version of the additional shader program. For example, the processing units performing method 700 may detect that a hardware state and/or a software state associated with one or more of client device 108A or client device 108B is modified from a first version to a second version. The compiled additional shader program may be compatible with the second version of the hardware state and/or software state associated with the one or more of client device 108A and/or client device 108B. Processing units performing method 700 may add the compiled version of the additional shader program to the aggregated shader cache 114, in some embodiments.

Figure 8:
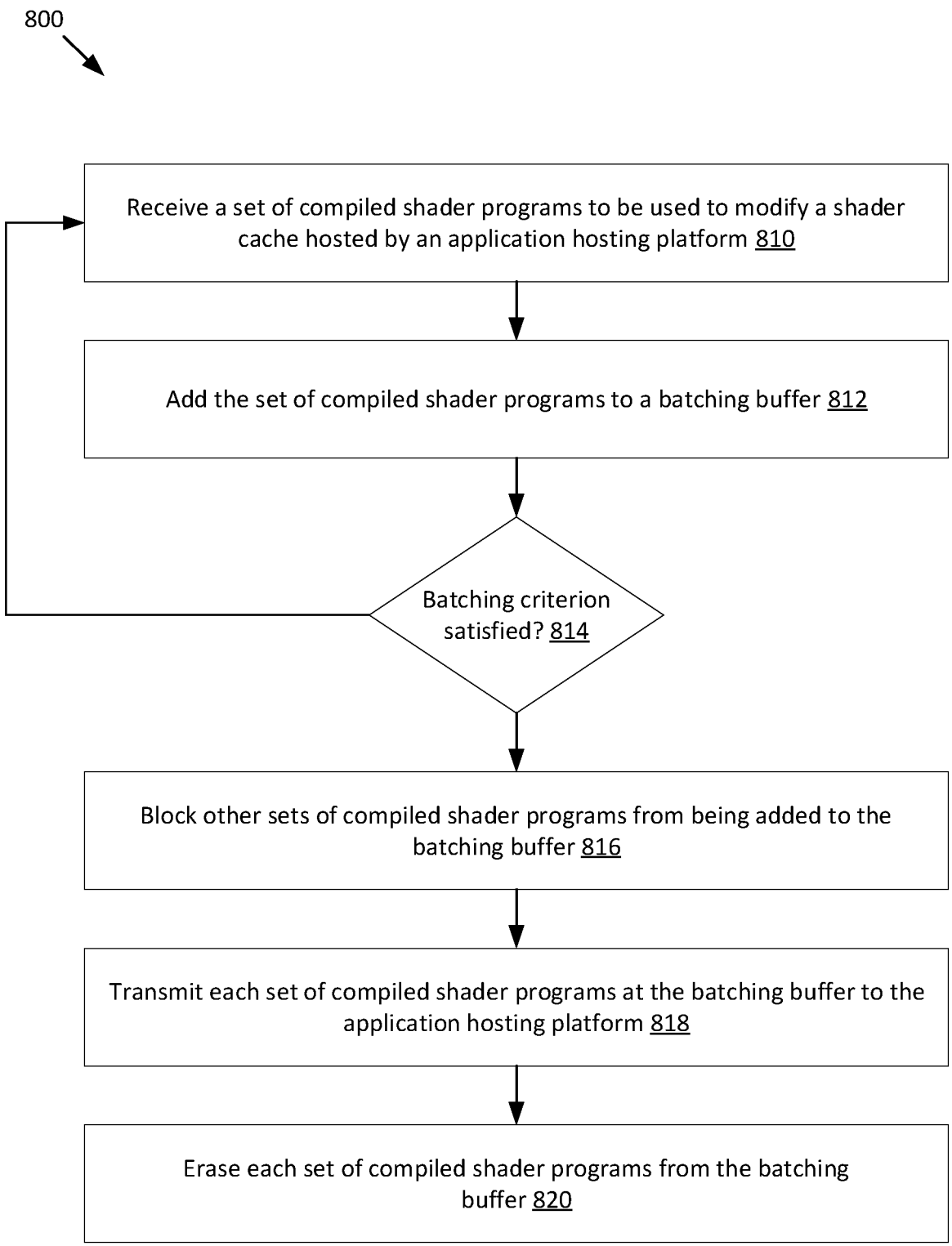
FIG. 8 illustrates a flow diagram of an example method of transmitting a batch of compiled shader programs to an application hosting platform, according to at least one embodiment.

FIG. 8 illustrates a flow diagram of an example method 800 of transmitting a batch of compiled shader programs to an application hosting platform, according to at least one embodiment. In some embodiments, one or more operations of method 800 may be performed by one or more components or modules of shader batching engine 118, described herein. Processing units performing method 800 may receive, at block 810, a set of compiled shader programs to be used to modify a shader cache hosted by an application hosting platform (i.e., aggregated shader cache 114 described herein). Processing units performing method 800 may receive the set of compiled shader programs from a client device connected to platform 102 (e.g., client device 108A).

At block 812, processing units performing method 800 may add the set of compiled shader programs to a temporary batching buffer. The temporary batching buffer may be configured to store compiled shader programs received from one or more client devices (e.g., client device 108A, client device 108B, client device 108C, etc.) connected to platform 102. In some embodiments, processing units performing method 800 may update a batching buffer data structure to include an entry associated with the set of compiled shader programs, as described above.

At block 814, processing units performing method 800 may determine whether a batching criterion is satisfied. Processing units performing method 800 may determine that a batching criterion is satisfied in response to determining that a number of compiled shader programs stored at the batching buffer meets or exceeds a threshold number, in some embodiments. In other or similar embodiments, processing units performing method 800 may determine that the batching criterion is satisfied in response to determining that a threshold number of requests to modify aggregated shader cache 114 have been received. In response to processing units performing method 800 determining that the batching criterion is not satisfied, method 800 may return to block 810. In response to processing units performing method 800 determining that the batching criterion is satisfied, method 800 may proceed to block 816.

At block 816, processing units performing method 800 may block other compiled shader programs from being added to the batching buffer. In some embodiments, processing units performing method 800 may block other compiled shader programs from being added to batching buffer by blocking requests from other client devices (e.g., client device 108B, client device 108C, etc.) to modify aggregated shader cache 114. In other or similar embodiments, processing units performing method 800 may block other compiled shader programs from being added to the batching buffer by modifying a setting associated with the batching buffer (e.g., to a read-only setting). At block 818, processing units performing method 800 may transmit each compiled shader program at the batching buffer to the application hosting platform. At block 820, processing units performing method 800 may erase each compiled shader program from the batching buffer. In some embodiments, processing units performing method 800 may permit other shader programs to be added to the batching buffer after each compiled shader program is erased form the batching buffer. For example, processing units performing method 800 may update a setting associated with the batching buffer to enable programming (i.e., write) and read operations to be performed at the batching buffer.

Figure 9A:
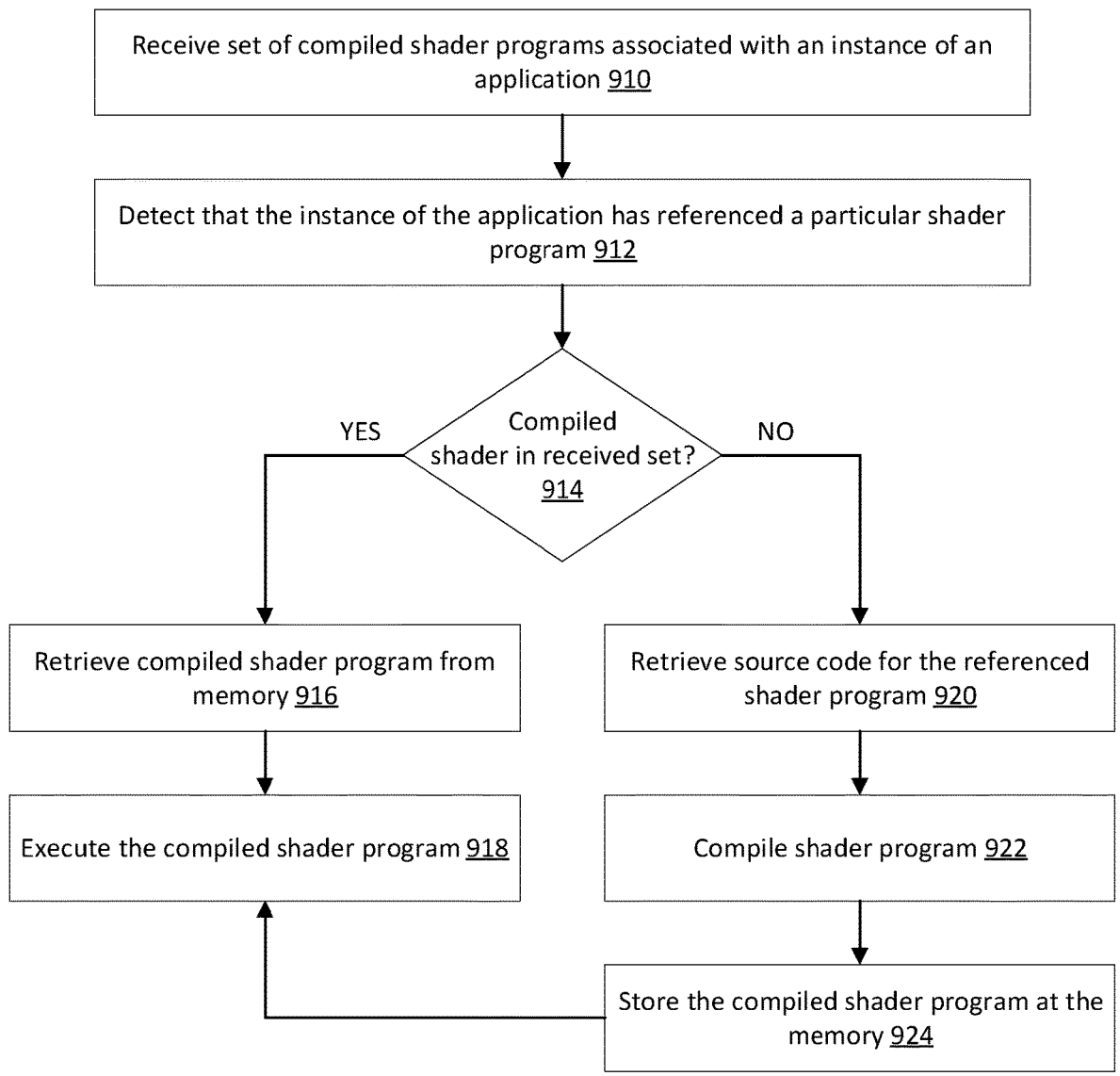
FIG. 9A illustrates a flow diagram of an example method of receiving and using a set of compiled shader programs at a client device, according to at least one embodiment.

FIG. 9A illustrates a flow diagram of an example method 900 of receiving and using a set of compiled shader programs at a client device, according to at least one embodiment. In some embodiments, one or more operations of method 900 may be performed by one or more components or modules of a shader manager 204 for a first client device (e.g., client device 108A), described herein. Processing units performing method 900 may receive, at block 910, a set of compiled shader programs associated with an instance of an application. In some embodiments, the set of compiled shader programs may be included in an aggregated shader cache, such as aggregated shader cache 114, which is associated with the application and is hosted by application hosting platform 102. Processing units performing method 900 may receive the set of compiled shader programs during an initialization of the instance of the application at client device 108A. In some embodiments, client device 108A may include a virtual machine that is instantiated using a cloud computing environment, in accordance with previously described embodiments.

At block 912, processing units performing method 900 may detect that the instance of the application has referenced a particular shader program. At block 914, processing units performing method 900 may determine whether a compiled version of the shader program is included in the received set of compiled shader programs. In response to determining that the compiled version of the shader program is included in the received set of compiled shader programs, method 900 may proceed to block 916. At block 916, processing units performing method 900 may retrieve the compiled shader program from memory (e.g., memory 228 and/or memory 210 of FIG. 2). At block 918, processing units performing method 900 may execute the compiled shader program.

In response to determining, at block 914, that the compiled version of the shader program is not included in the received set of compiled shader programs, method 900 may proceed to block 920. At block 920, processing units performing method 900 may retrieve source code for the referenced shader program. At block 922, processing units performing method 900 may compile the referenced shader program. At block 924, processing units performing method 900 may store the compiled shader program at the memory.

Figure 9B:
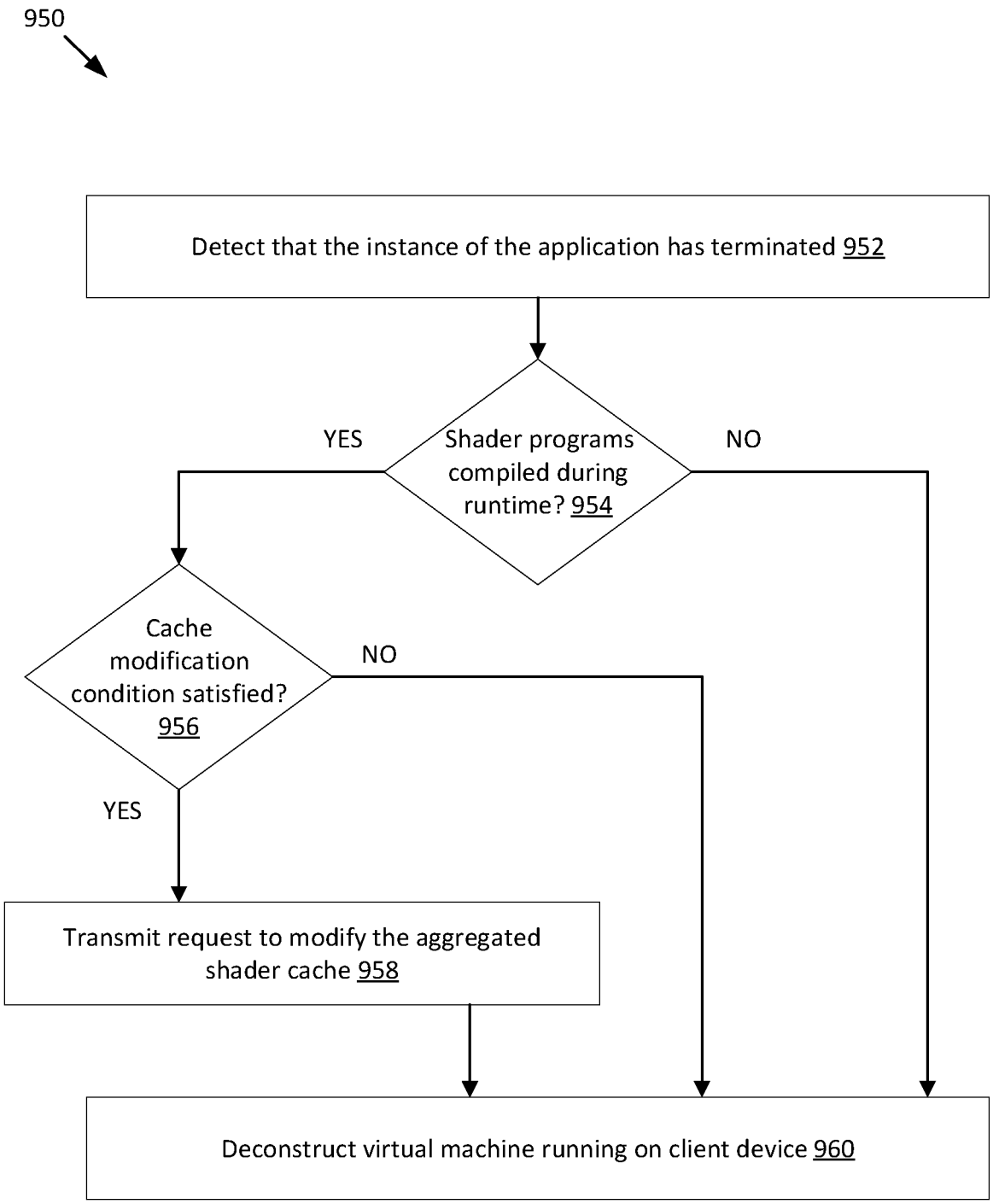
FIG. 9B illustrates a flow diagram of an example method of transmitting a compiled shader program to modify an aggregated shader cache hosted by an application hosting platform, according to at least one embodiment.

FIG. 9B illustrates a flow diagram of an example method 950 of transmitting a compiled shader program to modify an aggregated shader cache hosted by an application hosting platform, according to at least one embodiment. In some embodiments, one or more operations of method 950 may be performed by one or more components or modules of shader manager 204 for a first client device (e.g., client device 108A), described herein. As discussed previously, a virtual machine may be instantiated at client device 108A, in accordance with previously described embodiments. In some embodiments, method 950 may be a continuation of method 900. Processing units performing method 950 may detect, at block 952, that the instance of the application has terminated. At block 954, processing units performing method 950 may determine whether any shader programs were compiled during a runtime for the application instance. In response to determining that no shader programs were compiled during the runtime for the application instance, method 950 may proceed to block 960. At block 960, processing units performing method 950 may deconstruct the virtual machine running on the client device. In response to determining that one or more shader programs were compiled during the runtime for the application instance, method 950 may proceed to block 956.

At block 956, processing units performing method 950 may determine whether a modification condition associated with the instance of the application is satisfied. Processing units performing method 950 may determine that the modification condition is satisfied by determining that the instance of the application terminated at client device 108A is included in a set of application instances terminated at respective client devices connected to platform 102 that are permitted by platform 102 to modify aggregated shader cache 114. For example, processing units performing method 950 may determine whether client device 108A that terminated the application instance is associated with a set of approximately 10% of client devices connected to platform 102 that are permitted to modify aggregated shader cache 114. In other or similar embodiments, processing units performing method 950 may determine that the modification is satisfied by determining that the instance of the application is terminated during a time period that is outside of a high traffic time period for platform 102.

In response to processing units performing method 950 determining, at block 956, that a modification condition associated with the instance of the application is not satisfied, method 905 may proceed to block 960, where the virtual machine running on the client device is deconstructed. In response to processing units performing method 950 determining that a modification condition associated with the instance of the application is satisfied, method 905 may proceed to block 958. At block 958, processing units performing method 950 may transmit a request to modify the aggregated shader cache. The request to modify aggregated shader cache 114 may include the one or more compiled shader programs that were compiled during the runtime of the application instance at client device 108A. In some embodiments, the request may also include a shader key associated with client device 108A and/or shader values associated with each of the one or more compiled shader programs.

Inference and Training Logic

Figure 10A:
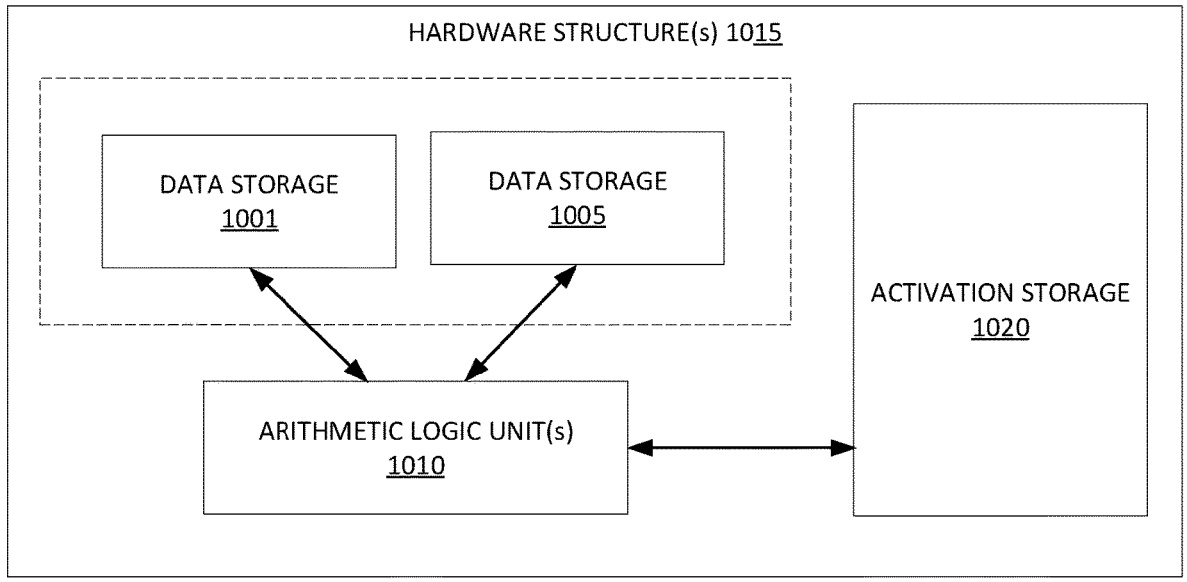
FIG. 10A illustrates inference and/or training logic, according to at least one embodiment.

FIG. 10A illustrates inference and/or training logic 1015 used to perform inferencing and/or training operations associated with one or more embodiments. Details regarding inference and/or training logic 1015 are provided below in conjunction with FIGS. 10A and/or 10B.

In at least one embodiment, inference and/or training logic 1015 may include, without limitation, code and/or data storage 1001 to store forward and/or output weight and/or input/output data, and/or other parameters to configure neurons or layers of a neural network trained and/or used for inferencing in aspects of one or more embodiments. In at least one embodiment, training logic 1015 may include, or be coupled to code and/or data storage 1001 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 1001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 1001 may be included with other on-chip or off-chip data storage, including a processor's L1, L2, or L3 cache or system memory.

In at least one embodiment, any portion of code and/or data storage 1001 may be internal or external to one or more processors or other hardware logic devices or circuits. In at least one embodiment, code and/or code and/or data storage 1001 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 1001 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 may include, without limitation, a code and/or data storage 1005 to store backward and/or output weight and/or input/output data corresponding to neurons or layers of a neural network trained and/or used for inferencing in aspects of one or more embodiments. In at least one embodiment, code and/or data storage 1005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 1015 may include, or be coupled to code and/or data storage 1005 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 1005 may be included with other on-chip or off-chip data storage, including a processor's L1, L2, or L3 cache or system memory. In at least one embodiment, any portion of code and/or data storage 1005 may be internal or external to on one or more processors or other hardware logic devices or circuits. In at least one embodiment, code and/or data storage 1005 may be cache memory, DRAM, SRAM, non-volatile memory (e.g., Flash memory), or other storage. In at least one embodiment, choice of whether code and/or data storage 1005 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 1001 and code and/or data storage 1005 may be separate storage structures. In at least one embodiment, code and/or data storage 1001 and code and/or data storage 1005 may be same storage structure. In at least one embodiment, code and/or data storage 1001 and code and/or data storage 1005 may be partially same storage structure and partially separate storage structures. In at least one embodiment, any portion of code and/or data storage 1001 and code and/or data storage 1005 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 1020 that are functions of input/output and/or weight parameter data stored in code and/or data storage 1001 and/or code and/or data storage 1005. In at least one embodiment, activations stored in activation storage 1020 are generated according to linear algebraic and or matrix-based mathematics performed by ALU(s) 1010 in response to performing instructions or other code, wherein weight values stored in code and/or data storage 1005 and/or code and/or data storage 1001 are used as operands along with other values, such as bias values, gradient information, momentum values, or other parameters or hyperparameters, any or all of which may be stored in code and/or data storage 1005 or code and/or data storage 1001 or another storage on or off-chip.

In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 1001, code and/or data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. 10A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10A may be used in conjunction with central processing unit ("CPU") hardware, graphics processing unit ("GPU") hardware or other hardware, such as data processing unit ("DPU") hardware, or field programmable gate arrays ("FPGAs").

Figure 10B:
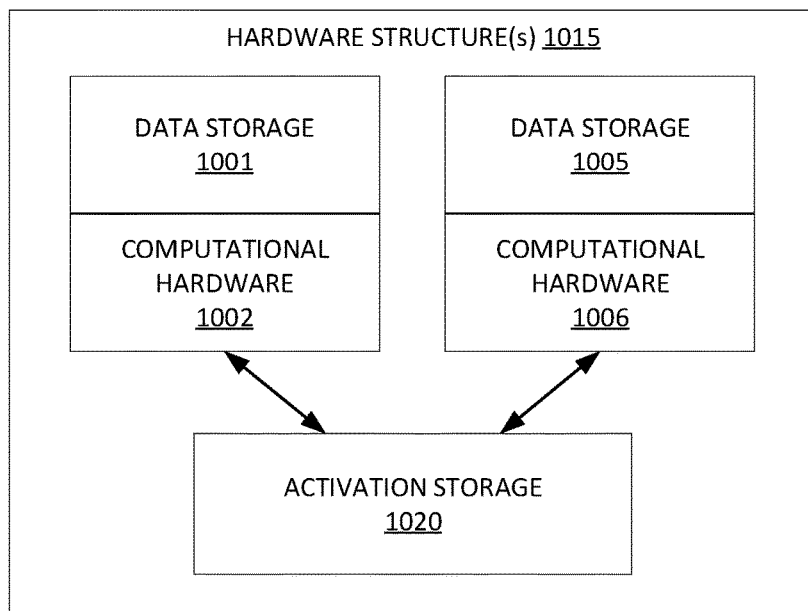
FIG. 10B illustrates inference and/or training logic, according to at least one embodiment.

FIG. 10B illustrates inference and/or training logic 1015, according to at least one or more embodiments. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10B may be used in conjunction with central processing unit (CPU) hardware, graphics processing unit (GPU) hardware or other hardware, such as data processing unit ("DPU") hardware, or field programmable gate arrays (FPGAs). In at least one embodiment, inference and/or training logic 1015 includes, without limitation, code and/or data storage 1001 and code and/or data storage 1005, which may be used to store code (e.g., graph code), weight values and/or other information, including bias values, gradient information, momentum values, and/or other parameter or hyperparameter information. In at least one embodiment illustrated in FIG. 10B, each of code and/or data storage 1001 and code and/or data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in code and/or data storage 1001 and code and/or data storage 1005, respectively, result of which is stored in activation storage 1020.

In at least one embodiment, each of code and/or data storage 1001 and 1005 and corresponding computational hardware 1002 and 1006, respectively, correspond to different layers of a neural network, such that resulting activation from one "storage/computational pair 1001/1002" of code and/or data storage 1001 and computational hardware 1002 is provided as an input to "storage/computational pair 1005/1006" of code and/or data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Data Center

Figure 11:
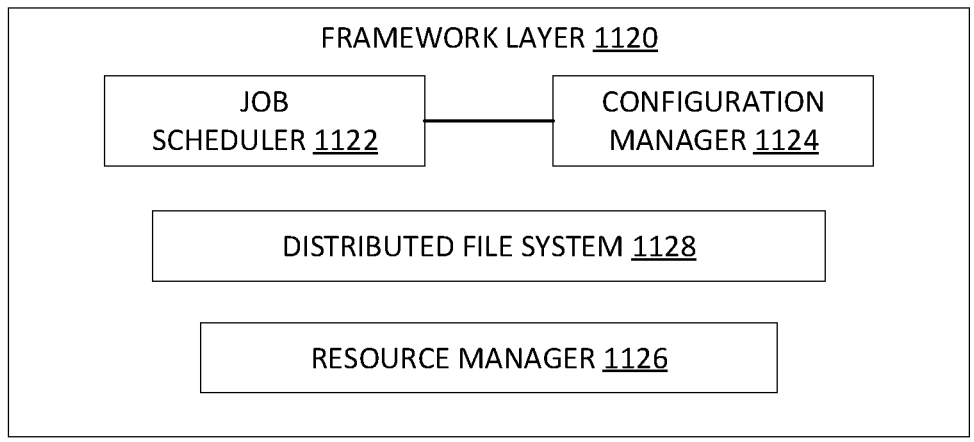
FIG. 11 illustrates an example data center system, according to at least one embodiment.

FIG. 11 illustrates an example data center 1100, in which at least one embodiment may be used. In at least one embodiment, data center 1100 includes a data center infrastructure layer 1110, a framework layer 1120, a software layer 1130, and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), data processing units, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1112 may configure or otherwise control one or more node C.R.s 1116(1)-1116(N) and/or grouped computing resources 1114.

In at least one embodiment, resource orchestrator 1112 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1122, a configuration manager 1124, a resource manager 1126 and a distributed file system 1128. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1128 for large-scale data processing (e.g., "big data"). In at least one embodiment, job scheduler 1122 may include a Spark driver to facilitate scheduling of workloads supported by various layers of data center 1100. In at least one embodiment, configuration manager 1124 may be capable of configuring different layers such as software layer 1130 and framework layer 1120 including Spark and distributed file system 1128 for supporting large-scale data processing. In at least one embodiment, resource manager 1126 may be capable of managing clustered or grouped computing resources mapped to or allocated for support of distributed file system 1128 and job scheduler 1122. In at least one embodiment, clustered or grouped computing resources may include grouped computing resource 1114 at data center infrastructure layer 1110. In at least one embodiment, resource manager 1126 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1128 of framework layer 1120. The one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1128 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1124, resource manager 1126, and resource orchestrator 1112 may implement any number and type of self-modifying actions based on any amount and type of data acquired in any technically feasible fashion. In at least one embodiment, self-modifying actions may relieve a data center operator of data center 1100 from making possibly bad configuration decisions and possibly avoiding underutilized and/or poor performing portions of a data center.

In at least one embodiment, data center 1100 may include tools, services, software, or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, DPUs FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 11 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Computer Systems

Figure 12:
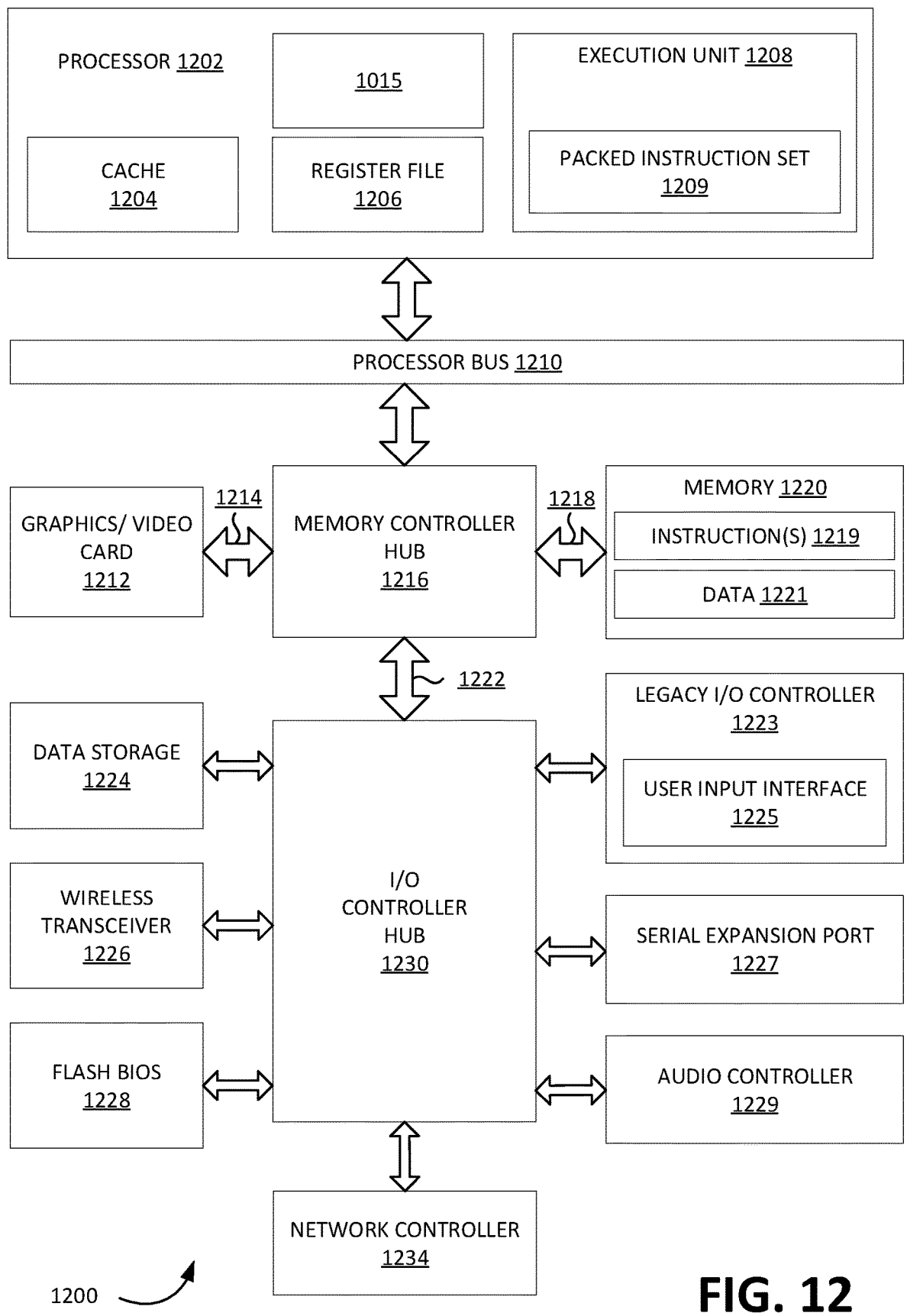
FIG. 12 illustrates a computer system, according to at least one embodiment.

FIG. 12 is a block diagram illustrating an exemplary computer system, which may be a system with interconnected devices and components, a system-on-a-chip (SOC) or some combination thereof 1200 formed with a processor that may include execution units to execute an instruction, according to at least one embodiment. In at least one embodiment, computer system 1200 may include, without limitation, a component, such as a processor 1202 to employ execution units including logic to perform algorithms for process data, in accordance with present disclosure, such as in embodiment described herein. In at least one embodiment, computer system 1200 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1200 may execute a version of WINDOWS' operating system available from Microsoft Corporation of Redmond, Washington, although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, edge devices, Internet-of-Things ("IoT") devices, or any other system that may perform one or more instructions in accordance with at least one embodiment.

In at least one embodiment, computer system 1200 may include, without limitation, processor 1202 that may include, without limitation, one or more execution units 1208 to perform machine learning model training and/or inferencing according to techniques described herein. In at least one embodiment, computer system 1200 is a single processor desktop or server system, but in another embodiment computer system 1200 may be a multiprocessor system. In at least one embodiment, processor 1202 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1202 may be coupled to a processor bus 1210 that may transmit data signals between processor 1202 and other components in computer system 1200.

In at least one embodiment, processor 1202 may include, without limitation, a Level 1 ("L1") internal cache memory ("cache") 1204. In at least one embodiment, processor 1202 may have a single internal cache or multiple levels of internal cache. In at least one embodiment, cache memory may reside external to processor 1202. Other embodiments may also include a combination of both internal and external caches depending on particular implementation and needs. In at least one embodiment, register file 1206 may store different types of data in various registers including, without limitation, integer registers, floating point registers, status registers, and instruction pointer register.

In at least one embodiment, execution unit 1208, including, without limitation, logic to perform integer and floating point operations, also resides in processor 1202. In at least one embodiment, processor 1202 may also include a microcode ("ucode") read only memory ("ROM") that stores microcode for certain macro instructions. In at least one embodiment, execution unit 1208 may include logic to handle a packed instruction set 1209. In at least one embodiment, by including packed instruction set 1209 in an instruction set of a general-purpose processor 1202, along with associated circuitry to execute instructions, operations used by many multimedia applications may be performed using packed data in a general-purpose processor 1202. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1208 may also be used in microcontrollers, embedded processors, graphics devices, DSPs, and other types of logic circuits. In at least one embodiment, computer system 1200 may include, without limitation, a memory 1220. In at least one embodiment, memory 1220 may be implemented as a Dynamic Random Access Memory ("DRAM") device, a Static Random Access Memory ("SRAM") device, flash memory device, or other memory device. In at least one embodiment, memory 1220 may store instruction(s) 1219 and/or data 1221 represented by data signals that may be executed by processor 1202.

In at least one embodiment, system logic chip may be coupled to processor bus 1210 and memory 1220. In at least one embodiment, system logic chip may include, without limitation, a memory controller hub ("MCH") 1216, and processor 1202 may communicate with MCH 1216 via processor bus 1210. In at least one embodiment, MCH 1216 may provide a high bandwidth memory path 1218 to memory 1220 for instruction and data storage and for storage of graphics commands, data and textures. In at least one embodiment, MCH 1216 may direct data signals between processor 1202, memory 1220, and other components in computer system 1200 and to bridge data signals between processor bus 1210, memory 1220, and a system I/O 1222. In at least one embodiment, system logic chip may provide a graphics port for coupling to a graphics controller. In at least one embodiment, MCH 1216 may be coupled to memory 1220 through a high bandwidth memory path 1218 and graphics/video card 1212 may be coupled to MCH 1216 through an Accelerated Graphics Port ("AGP") interconnect 1214.

In at least one embodiment, computer system 1200 may use system I/O 1222 that is a proprietary hub interface bus to couple MCH 1216 to I/O controller hub ("ICH") 1230. In at least one embodiment, ICH 1230 may provide direct connections to some I/O devices via a local I/O bus. In at least one embodiment, local I/O bus may include, without limitation, a high-speed I/O bus for connecting peripherals to memory 1220, chipset, and processor 1202. Examples may include, without limitation, an audio controller 1229, a firmware hub ("flash BIOS") 1228, a wireless transceiver 1226, a data storage 1224, a legacy I/O controller 1223 containing user input and keyboard interfaces 1225, a serial expansion port 1227, such as Universal Serial Bus ("USB"), and a network controller 1234, which may include in some embodiments, a data processing unit. Data storage 1224 may comprise a hard disk drive, a floppy disk drive, a CD-ROM device, a flash memory device, or other mass storage device.

In at least one embodiment, FIG. 12 illustrates a system, which includes interconnected hardware devices or "chips," whereas in other embodiments, FIG. 12 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 1200 are interconnected using compute express link (CXL) interconnects.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 12 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 13:
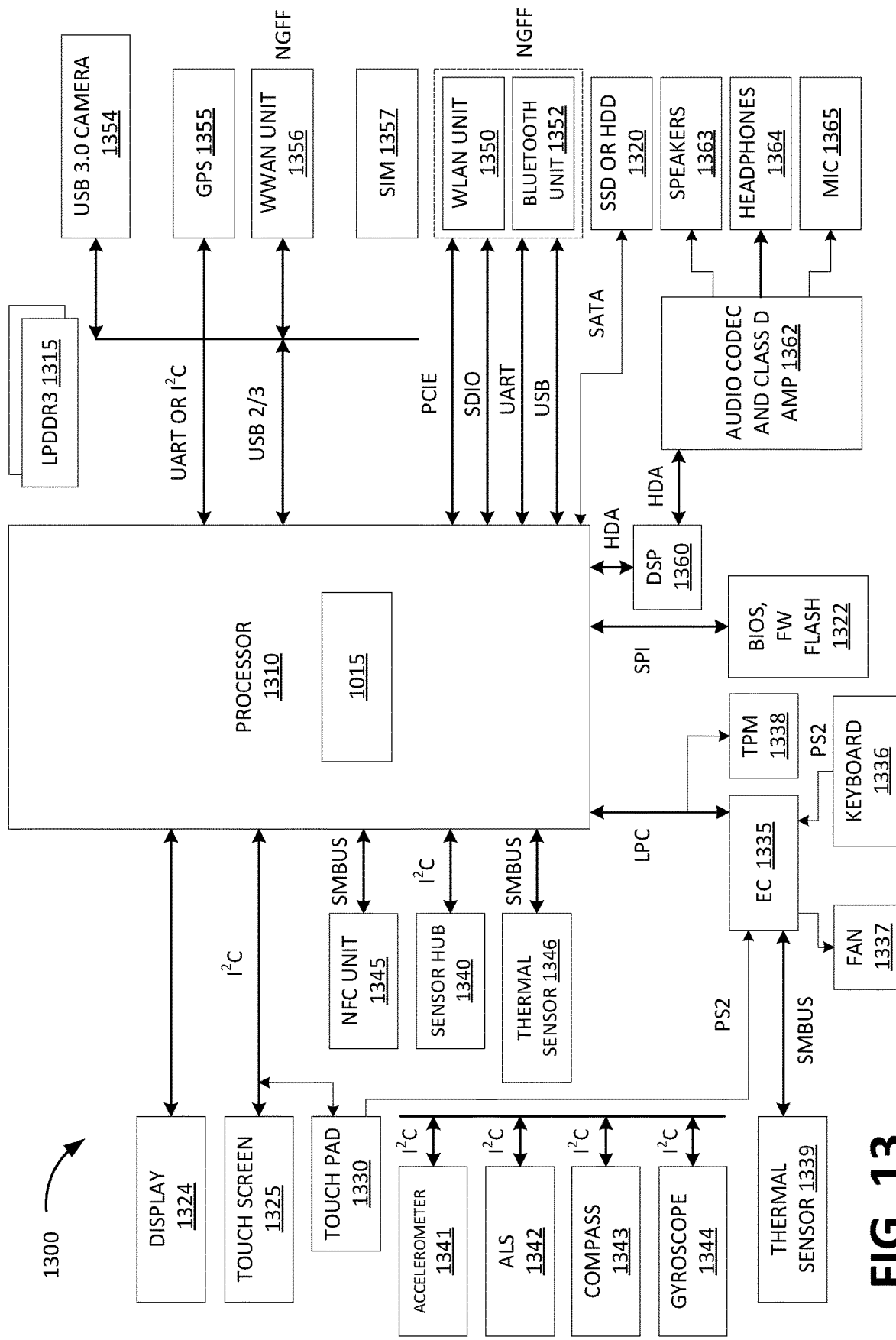
FIG. 13 illustrates a computer system, according to at least one embodiment.

FIG. 13 is a block diagram illustrating an electronic device 1300 for utilizing a processor 1310, according to at least one embodiment. In at least one embodiment, electronic device 1300 may be, for example and without limitation, a notebook, a tower server, a rack server, a blade server, a laptop, a desktop, a tablet, a mobile device, a phone, an embedded computer, an edge device, an IoT device, or any other suitable electronic device.

In at least one embodiment, system 1300 may include, without limitation, processor 1310 communicatively coupled to any suitable number or kind of components, peripherals, modules, or devices. In at least one embodiment, processor 1310 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 13 illustrates a system, which includes interconnected hardware devices or "chips," whereas in other embodiments, FIG. 13 may illustrate an exemplary System on a Chip ("SoC"). In at least one embodiment, devices illustrated in FIG. 13 may be interconnected with proprietary interconnects, standardized interconnects (e.g., PCIe) or some combination thereof. In at least one embodiment, one or more components of FIG. 13 are interconnected using compute express link (CXL) interconnects.

In at least one embodiment, FIG. 13 may include a display 1324, a touch screen 1325, a touch pad 1330, a Near Field Communications unit ("NFC") 1345, a sensor hub 1340, a thermal sensor 1346, an Express Chipset ("EC") 1335, a Trusted Platform Module ("TPM") 1338, BIOS/firmware/flash memory ("BIOS, FW Flash") 1322, a DSP 1360, a drive 1320 such as a Solid State Disk ("SSD") or a Hard Disk Drive ("HDD"), a wireless local area network unit ("WLAN") 1350, a Bluetooth unit 1352, a Wireless Wide Area Network unit ("WWAN") 1356, a Global Positioning System (GPS) 1355, a camera ("USB 3.0 camera") 1354 such as a USB 3.0 camera, and/or a Low Power Double Data Rate ("LPDDR") memory unit ("LPDDR3") 1315 implemented in, for example, LPDDR3 standard. These components may each be implemented in any suitable manner.

In at least one embodiment, other components may be communicatively coupled to processor 1310 through components discussed above. In at least one embodiment, an accelerometer 1341, Ambient Light Sensor ("ALS") 1342, compass 1343, and a gyroscope 1344 may be communicatively coupled to sensor hub 1340. In at least one embodiment, thermal sensor 1339, a fan 1337, a keyboard 1336, and a touch pad 1330 may be communicatively coupled to EC 1335. In at least one embodiment, speaker 1363, headphones 1364, and microphone ("mic") 1365 may be communicatively coupled to an audio unit ("audio codec and class d amp") 1362, which may in turn be communicatively coupled to DSP 1360. In at least one embodiment, audio unit 1364 may include, for example and without limitation, an audio coder/decoder ("codec") and a class D amplifier. In at least one embodiment, SIM card ("SIM") 1357 may be communicatively coupled to WWAN unit 1356. In at least one embodiment, components such as WLAN unit 1350 and Bluetooth unit 1352, as well as WWAN unit 1356 may be implemented in a Next Generation Form Factor ("NGFF").

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 13 for inferencing or predicting operations based, at least in part, on weight parameters calculated using neural network training operations, neural network functions and/or architectures, or neural network use cases described herein.

Such components may be used to generate synthetic data imitating failure cases in a network training process, which may help to improve performance of the network while limiting the amount of synthetic data to avoid overfitting.

Figure 14:
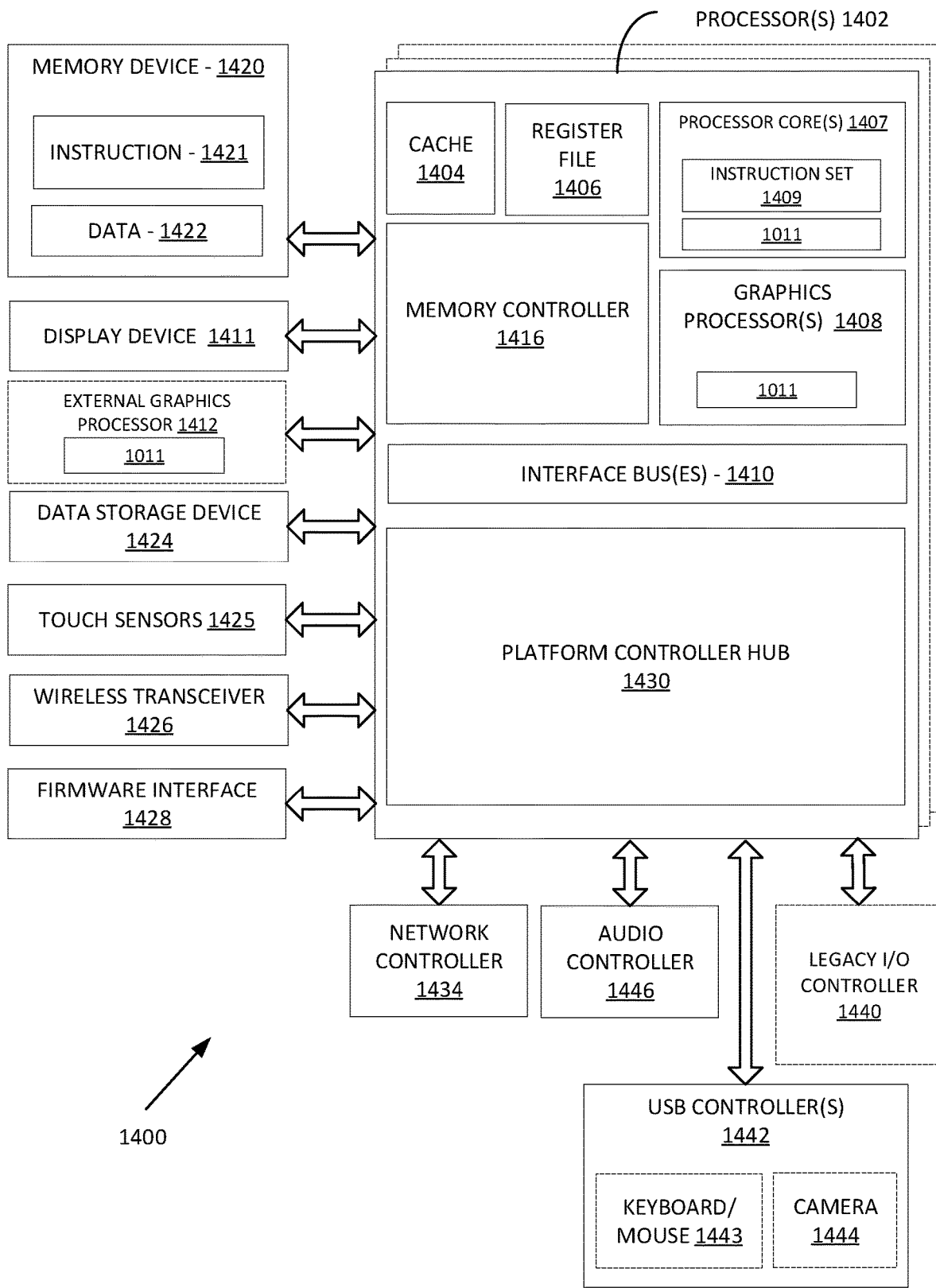
FIG. 14 illustrates at least portions of a graphics processor, according to one or more embodiments.

FIG. 14 is a block diagram of a processing system, according to at least one embodiment. In at least one embodiment, system 1400 includes one or more processors 1402 and one or more graphics processors 1408, and may be a single processor desktop system, a multiprocessor workstation system, or a server system having a large number of processors 1402 or processor cores 1407. In at least one embodiment, system 1400 is a processing platform incorporated within a system-on-a-chip (SoC) integrated circuit for use in mobile, handheld, edge, or embedded devices.

In at least one embodiment, system 1400 may include, or be incorporated within a server-based gaming platform, a game console, including a game and media console, a mobile gaming console, a handheld game console, or an online game console. In at least one embodiment, system 1400 is a mobile phone, smart phone, tablet computing device or mobile Internet device. In at least one embodiment, processing system 1400 may also include, couple with, or be integrated within a wearable device, such as a smart watch wearable device, smart eyewear device, augmented reality device, or virtual reality device. In at least one embodiment, processing system 1400 is a television or set top box device having one or more processors 1402 and a graphical interface generated by one or more graphics processors 1408.

In at least one embodiment, one or more processors 1402 each include one or more processor cores 1407 to process instructions which, when executed, perform operations for system and user software. In at least one embodiment, each of one or more processor cores 1407 is configured to process a specific instruction set 1409. In at least one embodiment, instruction set 1409 may facilitate Complex Instruction Set Computing (CISC), Reduced Instruction Set Computing (RISC), or computing via a Very Long Instruction Word (VLIW). In at least one embodiment, processor cores 1407 may each process a different instruction set 1409, which may include instructions to facilitate emulation of other instruction sets. In at least one embodiment, processor core 1407 may also include other processing devices, such a Digital Signal Processor (DSP).

In at least one embodiment, processor 1402 includes cache memory 1404. In at least one embodiment, processor 1402 may have a single internal cache or multiple levels of internal cache. In at least one embodiment, cache memory is shared among various components of processor 1402. In at least one embodiment, processor 1402 also uses an external cache (e.g., a Level-3 (L3) cache or Last Level Cache (LLC)) (not shown), which may be shared among processor cores 1407 using known cache coherency techniques. In at least one embodiment, register file 1406 is additionally included in processor 1402 which may include different types of registers for storing different types of data (e.g., integer registers, floating point registers, status registers, and an instruction pointer register). In at least one embodiment, register file 1406 may include general-purpose registers or other registers.

In at least one embodiment, one or more processor(s) 1402 are coupled with one or more interface bus(es) 1410 to transmit communication signals such as address, data, or control signals between processor 1402 and other components in system 1400. In at least one embodiment, interface bus 1410, in one embodiment, may be a processor bus, such as a version of a Direct Media Interface (DMI) bus. In at least one embodiment, interface 1410 is not limited to a DMI bus, and may include one or more Peripheral Component Interconnect buses (e.g., PCI, PCI Express), memory busses, or other types of interface busses. In at least one embodiment processor(s) 1402 include an integrated memory controller 1416 and a platform controller hub 1430. In at least one embodiment, memory controller 1416 facilitates communication between a memory device and other components of system 1400, while platform controller hub (PCH) 1430 provides connections to I/O devices via a local I/O bus.

In at least one embodiment, memory device 1420 may be a dynamic random access memory (DRAM) device, a static random access memory (SRAM) device, flash memory device, phase-change memory device, or some other memory device having suitable performance to serve as process memory. In at least one embodiment memory device 1420 may operate as system memory for system 1400, to store data 1422 and instructions 1421 for use when one or more processors 1402 executes an application or process. In at least one embodiment, memory controller 1416 also couples with an optional external graphics processor 1412, which may communicate with one or more graphics processors 1408 in processors 1402 to perform graphics and media operations. In at least one embodiment, a display device 1411 may connect to processor(s) 1402. In at least one embodiment display device 1411 may include one or more of an internal display device, as in a mobile electronic device or a laptop device or an external display device attached via a display interface (e.g., DisplayPort, etc.). In at least one embodiment, display device 1411 may include a head mounted display (HMD) such as a stereoscopic display device for use in virtual reality (VR) applications or augmented reality (AR) applications.

In at least one embodiment, platform controller hub 1430 enables peripherals to connect to memory device 1420 and processor 1402 via a high-speed I/O bus. In at least one embodiment, I/O peripherals include, but are not limited to, an audio controller 1446, a network controller 1434, a firmware interface 1428, a wireless transceiver 1426, touch sensors 1425, a data storage device 1424 (e.g., hard disk drive, flash memory, etc.). In at least one embodiment, data storage device 1424 may connect via a storage interface (e.g., SATA) or via a peripheral bus, such as a Peripheral Component Interconnect bus (e.g., PCI, PCI Express). In at least one embodiment, touch sensors 1425 may include touch screen sensors, pressure sensors, or fingerprint sensors. In at least one embodiment, wireless transceiver 1426 may be a Wi-Fi transceiver, a Bluetooth transceiver, or a mobile network transceiver such as a 3G, 4G, or Long Term Evolution (LTE) transceiver. In at least one embodiment, firmware interface 1428 enables communication with system firmware, and may be, for example, a unified extensible firmware interface (UEFI). In at least one embodiment, network controller 1434 may enable a network connection to a wired network. In at least one embodiment, a high-performance network controller (not shown) couples with interface bus 1410. In at least one embodiment, audio controller 1446 is a multi-channel high definition audio controller. In at least one embodiment, system 1400 includes an optional legacy I/O controller 1440 for coupling legacy (e.g., Personal System 2 (PS/2)) devices to system. In at least one embodiment, platform controller hub 1430 may also connect to one or more Universal Serial Bus (USB) controllers 1442 connect input devices, such as keyboard and mouse 1443 combinations, a camera 1444, or other USB input devices.

In at least one embodiment, an instance of memory controller 1416 and platform controller hub 1430 may be integrated into a discreet external graphics processor, such as external graphics processor 1412. In at least one embodiment, platform controller hub 1430 and/or memory controller 1416 may be external to one or more processor(s) 1402. For example, in at least one embodiment, system 1400 may include an external memory controller 1416 and platform controller hub 1430, which may be configured as a memory controller hub and peripheral controller hub within a system chipset that is in communication with processor(s) 1402.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Figure 15:
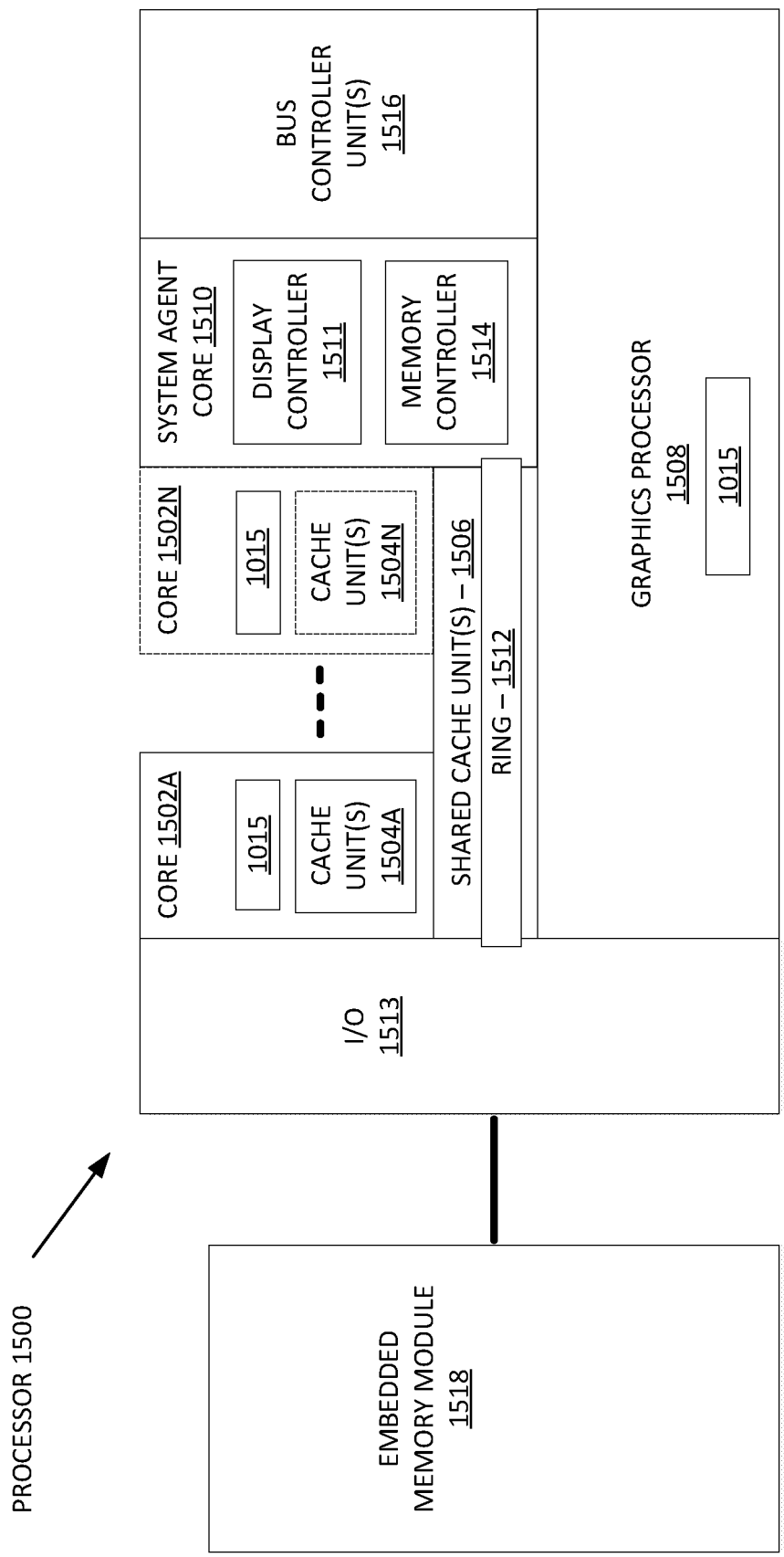
FIG. 15 illustrates at least portions of a graphics processor, according to one or more embodiments.

FIG. 15 is a block diagram of a processor 1500 having one or more processor cores 1502A-1502N, an integrated memory controller 1514, and an integrated graphics processor 1508, according to at least one embodiment. In at least one embodiment, processor 1500 may include additional cores up to and including additional core 1502N represented by dashed lined boxes. In at least one embodiment, each of processor cores 1502A-1502N includes one or more internal cache units 1504A-1504N. In at least one embodiment, each processor core also has access to one or more shared cached units 1506.

In at least one embodiment, internal cache units 1504A-1504N and shared cache units 1506 represent a cache memory hierarchy within processor 1500. In at least one embodiment, cache memory units 1504A-1504N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1506 and 1504A-1504N.

In at least one embodiment, processor 1500 may also include a set of one or more bus controller units 1516 and a system agent core 1510. In at least one embodiment, one or more bus controller units 1516 manage a set of peripheral buses, such as one or more PCI or PCI express busses. In at least one embodiment, system agent core 1510 provides management functionality for various processor components. In at least one embodiment, system agent core 1510 includes one or more integrated memory controllers 1514 to manage access to various external memory devices (not shown).

In at least one embodiment, one or more of processor cores 1502A-1502N include support for simultaneous multi-threading. In at least one embodiment, system agent core 1510 includes components for coordinating and operating cores 1502A-1502N during multi-threaded processing. In at least one embodiment, system agent core 1510 may additionally include a power control unit (PCU), which includes logic and components to regulate one or more power states of processor cores 1502A-1502N and graphics processor 1508.

In at least one embodiment, processor 1500 additionally includes graphics processor 1508 to execute graphics processing operations. In at least one embodiment, graphics processor 1508 couples with shared cache units 1506, and system agent core 1510, including one or more integrated memory controllers 1514. In at least one embodiment, system agent core 1510 also includes a display controller 1511 to drive graphics processor output to one or more coupled displays. In at least one embodiment, display controller 1511 may also be a separate module coupled with graphics processor 1508 via at least one interconnect, or may be integrated within graphics processor 1508.

In at least one embodiment, a ring based interconnect unit 1512 is used to couple internal components of processor 1500. In at least one embodiment, an alternative interconnect unit may be used, such as a point-to-point interconnect, a switched interconnect, or other techniques. In at least one embodiment, graphics processor 1508 couples with ring interconnect 1512 via an I/O link 1513.

In at least one embodiment, I/O link 1513 represents at least one of multiple varieties of I/O interconnects, including an on package I/O interconnect which facilitates communication between various processor components and a high-performance embedded memory module 1518, such as an eDRAM module. In at least one embodiment, each of processor cores 1502A-1502N and graphics processor 1508 use embedded memory modules 1518 as a shared Last Level Cache.

In at least one embodiment, processor cores 1502A-1502N are homogenous cores executing a common instruction set architecture. In at least one embodiment, processor cores 1502A-1502N are heterogeneous in terms of instruction set architecture (ISA), where one or more of processor cores 1502A-1502N execute a common instruction set, while one or more other cores of processor cores 1502A-1502N executes a subset of a common instruction set or a different instruction set. In at least one embodiment, processor cores 1502A-1502N are heterogeneous in terms of microarchitecture, where one or more cores having a relatively higher power consumption couple with one or more power cores having a lower power consumption. In at least one embodiment, processor 1500 may be implemented on one or more chips or as a SoC integrated circuit.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into processor 1500. For example, in at least one embodiment, training and/or inferencing techniques described herein may use one or more of ALUs embodied in graphics processor 1508, graphics core(s) 1502A-1502N, or other components in FIG. 15. Moreover, in at least one embodiment, inferencing and/or training operations described herein may be done using logic other than logic illustrated in FIG. 10A or 10B. In at least one embodiment, weight parameters may be stored in on-chip or off-chip memory and/or registers (shown or not shown) that configure ALUs of graphics processor 1500 to perform one or more machine learning algorithms, neural network architectures, use cases, or training techniques described herein.

Such components may be used to generate synthetic data imitating failure cases in a network training process, which may help to improve performance of the network while limiting the amount of synthetic data to avoid overfitting.

Virtualized Computing Platform

Figure 16:
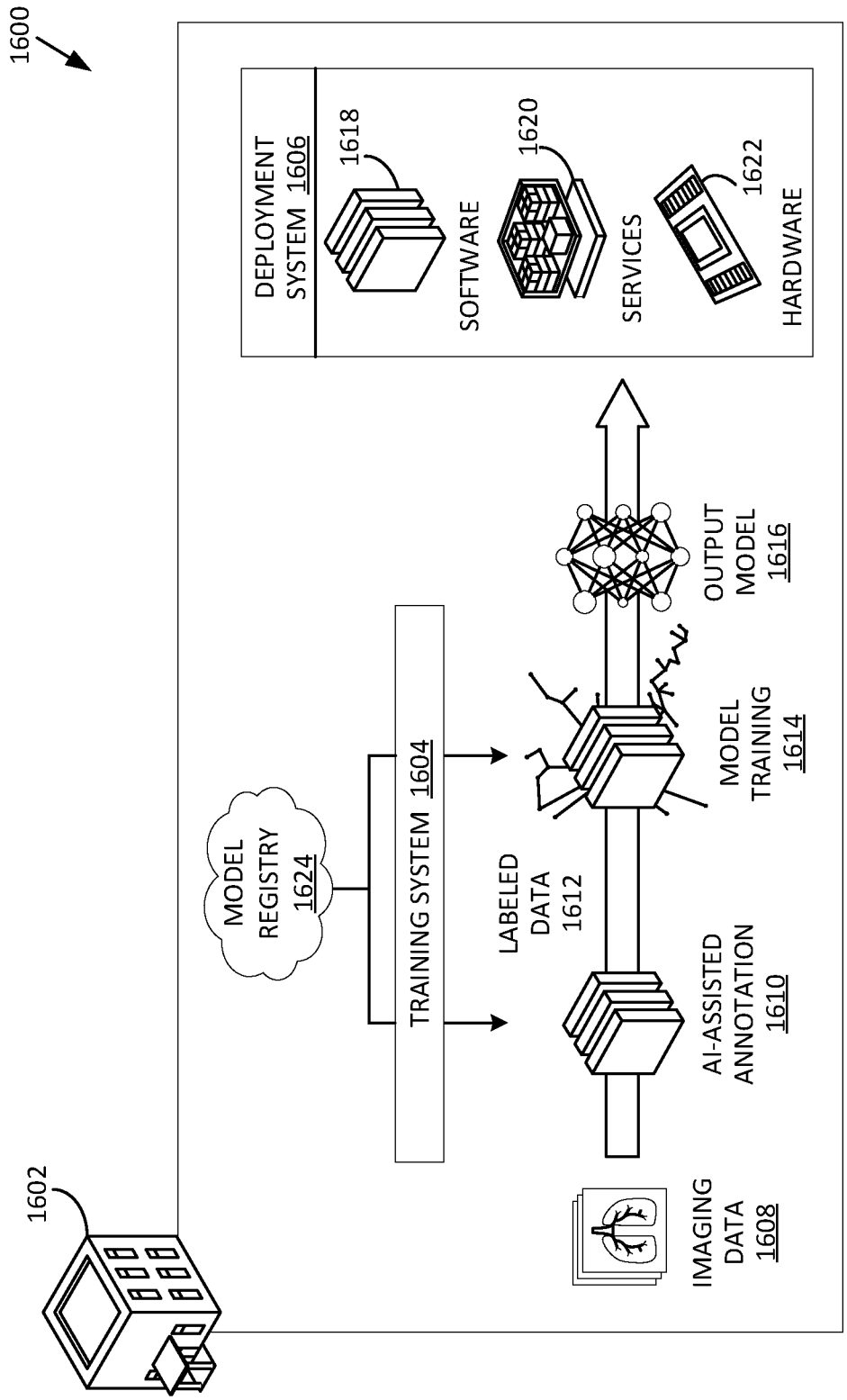
FIG. 16 is an example data flow diagram for an advanced computing pipeline, in accordance with at least one embodiment.

FIG. 16 is an example data flow diagram for a process 1600 of generating and deploying an image processing and inferencing pipeline, in accordance with at least one embodiment. In at least one embodiment, process 1600 may be deployed for use with imaging devices, processing devices, and/or other device types at one or more facilities 1602. Process 1600 may be executed within a training system 1604 and/or a deployment system 1606. In at least one embodiment, training system 1604 may be used to perform training, deployment, and implementation of machine learning models (e.g., neural networks, object detection algorithms, computer vision algorithms, etc.) for use in deployment system 1606. In at least one embodiment, deployment system 1606 may be configured to offload processing and compute resources among a distributed computing environment to reduce infrastructure requirements at facility 1602. In at least one embodiment, one or more applications in a pipeline may use or call upon services (e.g., inference, visualization, compute, AI, etc.) of deployment system 1606 during execution of applications.

In at least one embodiment, some of applications used in advanced processing and inferencing pipelines may use machine learning models or other AI to perform one or more processing steps. In at least one embodiment, machine learning models may be trained at facility 1602 using data 1608 (such as imaging data) generated at facility 1602 (and stored on one or more picture archiving and communication system (PACS) servers at facility 1602), may be trained using imaging or sequencing data 1608 from another facility (ies), or a combination thereof. In at least one embodiment, training system 1604 may be used to provide applications, services, and/or other resources for generating working, deployable machine learning models for deployment system 1606.

In at least one embodiment, model registry 1624 may be backed by object storage that may support versioning and object metadata. In at least one embodiment, object storage may be accessible through, for example, a cloud storage (e.g., cloud 1726 of FIG. 17) compatible application programming interface (API) from within a cloud platform. In at least one embodiment, machine learning models within model registry 1624 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1704 (FIG. 17) may include a scenario where facility 1602 is training their own machine learning model, or has an existing machine learning model that needs to be optimized or updated. In at least one embodiment, imaging data 1608 generated by imaging device(s), sequencing devices, and/or other device types may be received. In at least one embodiment, once imaging data 1608 is received, AI-assisted annotation 1610 may be used to aid in generating annotations corresponding to imaging data 1608 to be used as ground truth data for a machine learning model. In at least one embodiment, AI-assisted annotation 1610 may include one or more machine learning models (e.g., convolutional neural networks (CNNs)) that may be trained to generate annotations corresponding to certain types of imaging data 1608 (e.g., from certain devices). In at least one embodiment, AI-assisted annotations 1610 may then be used directly, or may be adjusted or fine-tuned using an annotation tool to generate ground truth data. In at least one embodiment, AI-assisted annotations 1610, labeled clinic data 1612, or a combination thereof may be used as ground truth data for training a machine learning model. In at least one embodiment, a trained machine learning model may be referred to as output model 1616, and may be used by deployment system 1606, as described herein.

In at least one embodiment, training pipeline 1704 (FIG. 17) may include a scenario where facility 1602 needs a machine learning model for use in performing one or more processing tasks for one or more applications in deployment system 1606, but facility 1602 may not currently have such a machine learning model (or may not have a model that is optimized, efficient, or effective for such purposes). In at least one embodiment, an existing machine learning model may be selected from a model registry 1624. In at least one embodiment, model registry 1624 may include machine learning models trained to perform a variety of different inference tasks on imaging data. In at least one embodiment, machine learning models in model registry 1624 may have been trained on imaging data from different facilities than facility 1602 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1624. In at least one embodiment, a machine learning model may then be retrained, or updated, at any number of other facilities, and a retrained or updated model may be made available in model registry 1624. In at least one embodiment, a machine learning model may then be selected from model registry 1624—and referred to as output model 1616—and may be used in deployment system 1606 to perform one or more processing tasks for one or more applications of a deployment system.

In at least one embodiment, training pipeline 1704 (FIG. 17), a scenario may include facility 1602 requiring a machine learning model for use in performing one or more processing tasks for one or more applications in deployment system 1606, but facility 1602 may not currently have such a machine learning model (or may not have a model that is optimized, efficient, or effective for such purposes). In at least one embodiment, a machine learning model selected from model registry 1624 may not be fine-tuned or optimized for imaging data 1608 generated at facility 1602 because of differences in populations, robustness of training data used to train a machine learning model, diversity in anomalies of training data, and/or other issues with training data. In at least one embodiment, AI-assisted annotation

1610 may be used to aid in generating annotations corresponding to imaging data 1608 to be used as ground truth data for retraining or updating a machine learning model. In at least one embodiment, labeled data 1612 may be used as ground truth data for training a machine learning model. In at least one embodiment, retraining or updating a machine learning model may be referred to as model training 1614. In at least one embodiment, model training 1614—e.g., AI-assisted annotations 1610, labeled clinic data 1612, or a combination thereof—may be used as ground truth data for retraining or updating a machine learning model. In at least one embodiment, a trained machine learning model may be referred to as output model 1616, and may be used by deployment system 1606, as described herein.

In at least one embodiment, deployment system 1606 may include software 1618, services 1620, hardware 1622, and/or other components, features, and functionality. In at least one embodiment, deployment system 1606 may include a software "stack," such that software 1618 may be built on top of services 1620 and may use services 1620 to perform some or all of processing tasks, and services 1620 and software 1618 may be built on top of hardware 1622 and use hardware 1622 to execute processing, storage, and/or other compute tasks of deployment system 1606. In at least one embodiment, software 1618 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1608, in addition to containers that receive and configure imaging data for use by each container and/or for use by facility 1602 after processing through a pipeline (e.g., to convert outputs back to a usable data type). In at least one embodiment, a combination of containers within software 1618 (e.g., that make up a pipeline) may be referred to as a virtual instrument (as described in more detail herein), and a virtual instrument may leverage services 1620 and hardware 1622 to execute some or all processing tasks of applications instantiated in containers.

In at least one embodiment, a data processing pipeline may receive input data (e.g., imaging data 1608) in a specific format in response to an inference request (e.g., a request from a user of deployment system 1606). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1616 of training system 1604.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1624 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1620 as a system (e.g., system 1700 of FIG. 17). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1700 (e.g., for accuracy), an application may be available in a container registry for selection and/or implementation by a user to perform one or more processing tasks with respect to data at a facility (e.g., a second facility) of a user.

Figure 17:
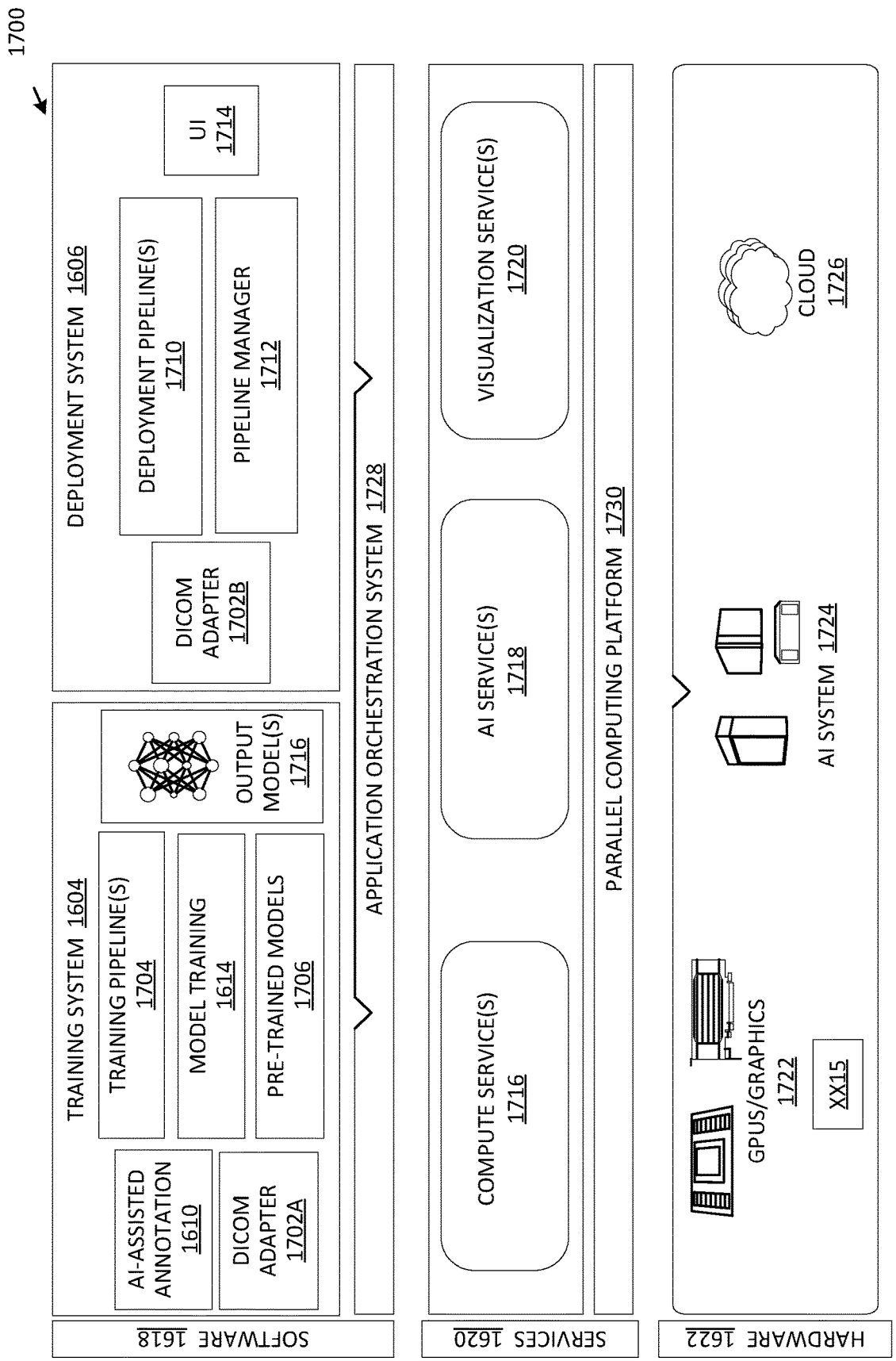
FIG. 17 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1700 of FIG. 17). In at least one embodiment, completed and validated applications or containers may be stored in a container registry and associated machine learning models may be stored in model registry 1624. In at least one embodiment, a requesting entity—who provides an inference or image processing request—may browse a container registry and/or model registry 1624 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1606 (e.g., a cloud) to perform processing of data processing pipeline. In at least one embodiment, processing by deployment system 1606 may include referencing selected elements (e.g., applications, containers, models, etc.) from a container registry and/or model registry 1624. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1620 may be leveraged. In at least one embodiment, services 1620 may include compute services, artificial intelligence (AI) services, visualization services, and/or other service types. In at least one embodiment, services 1620 may provide functionality that is common to one or more applications in software 1618, so functionality may be abstracted to a service that may be called upon or leveraged by applications. In at least one embodiment, functionality provided by services 1620 may run dynamically and more efficiently, while also scaling well by allowing applications to process data in parallel (e.g., using a parallel computing platform 1730 (FIG. 17)). In at least one embodiment, rather than each application that shares a same functionality offered by a service 1620 being required to have a respective instance of service 1620, service 1620 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1620 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1618 implementing advanced processing and inferencing pipeline that includes segmentation application and anomaly detection application may be streamlined because each application may call upon a same inference service to perform one or more inferencing tasks.

In at least one embodiment, hardware 1622 may include GPUs, CPUs, DPUs, graphics cards, an AI/deep learning system (e.g., an AI supercomputer, such as NVIDIA's DGX), a cloud platform, or a combination thereof. In at least one embodiment, different types of hardware 1622 may be used to provide efficient, purpose-built support for software 1618 and services 1620 in deployment system 1606. In at least one embodiment, use of GPU processing may be implemented for processing locally (e.g., at facility 1602), within an AI/deep learning system, in a cloud system, and/or in other processing components of deployment system 1606 to improve efficiency, accuracy, and efficacy of image processing and generation. In at least one embodiment, software 1618 and/or services 1620 may be optimized for GPU processing with respect to deep learning, machine learning, and/or high-performance computing, as non-limiting examples. In at least one embodiment, at least some of computing environment of deployment system 1606 and/or training system 1604 may be executed in a datacenter one or more supercomputers or high performance computing systems, with GPU optimized software (e.g., hardware and software combination of NVIDIA's DGX System). In at least one embodiment, hardware 1622 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform may further include DPU processing to transmit data received over a network and/or through a network controller or other network interface directly to (e.g., a memory of) one or more GPU(s). In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

FIG. 17 is a system diagram for an example system 1700 for generating and deploying an imaging deployment pipeline, in accordance with at least one embodiment. In at least one embodiment, system 1700 may be used to implement process 1600 of FIG. 16 and/or other processes including advanced processing and inferencing pipelines. In at least one embodiment, system 1700 may include training system 1604 and deployment system 1606. In at least one embodiment, training system 1604 and deployment system 1606 may be implemented using software 1618, services 1620, and/or hardware 1622, as described herein.

In at least one embodiment, system 1700 (e.g., training system 1604 and/or deployment system 1606) may implemented in a cloud computing environment (e.g., using cloud 1726). In at least one embodiment, system 1700 may be implemented locally with respect to a healthcare services facility, or as a combination of both cloud and local computing resources. In at least one embodiment, access to APIs in cloud 1726 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1700, may be restricted to a set of public IPs that have been vetted or authorized for interaction.

In at least one embodiment, various components of system 1700 may communicate between and among one another using any of a variety of different network types, including but not limited to local area networks (LANs) and/or wide area networks (WANs) via wired and/or wireless communication protocols. In at least one embodiment, communication between facilities and components of system 1700 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1604 may execute training pipelines 1704, similar to those described herein with respect to FIG. 16. In at least one embodiment, where one or more machine learning models are to be used in deployment pipelines 1710 by deployment system 1606, training pipelines 1704 may be used to train or retrain one or more (e.g. pre-trained) models, and/or implement one or more of pre-trained models 1706 (e.g., without a need for retraining or updating). In at least one embodiment, as a result of training pipelines 1704, output model(s) 1616 may be generated. In at least one embodiment, training pipelines 1704 may include any number of processing steps, such as but not limited to imaging data (or other input data) conversion or adaption In at least one embodiment, for different machine learning models used by deployment system 1606, different training pipelines 1704 may be used. In at least one embodiment, training pipeline 1704 similar to a first example described with respect to FIG. 16 may be used for a first machine learning model, training pipeline 1704 similar to a second example described with respect to FIG. 16 may be used for a second machine learning model, and training pipeline 1704 similar to a third example described with respect to FIG. 16 may be used for a third machine learning model. In at least one embodiment, any combination of tasks within training system 1604 may be used depending on what is required for each respective machine learning model. In at least one embodiment, one or more of machine learning models may already be trained and ready for deployment so machine learning models may not undergo any processing by training system 1604, and may be implemented by deployment system 1606.

In at least one embodiment, output model(s) 1616 and/or pre-trained model(s) 1706 may include any types of machine learning models depending on implementation or embodiment. In at least one embodiment, and without limitation, machine learning models used by system 1700 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 18A:
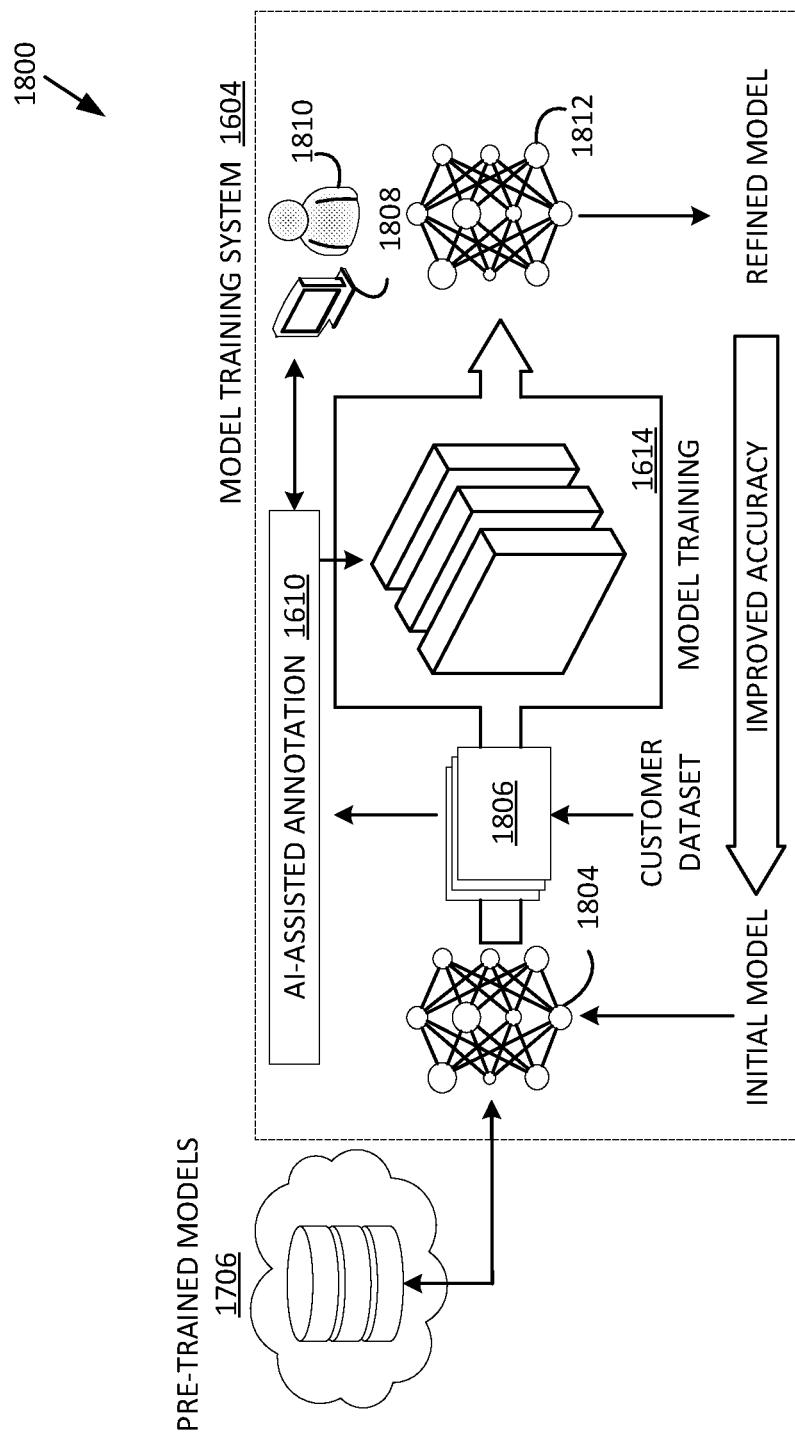
FIGS. 18A and 18B illustrate a data flow diagram for a process to train a machine learning model, as well as client-server architecture to enhance annotation tools with pre-trained annotation models, in accordance with at least one embodiment.
Figure 18B:
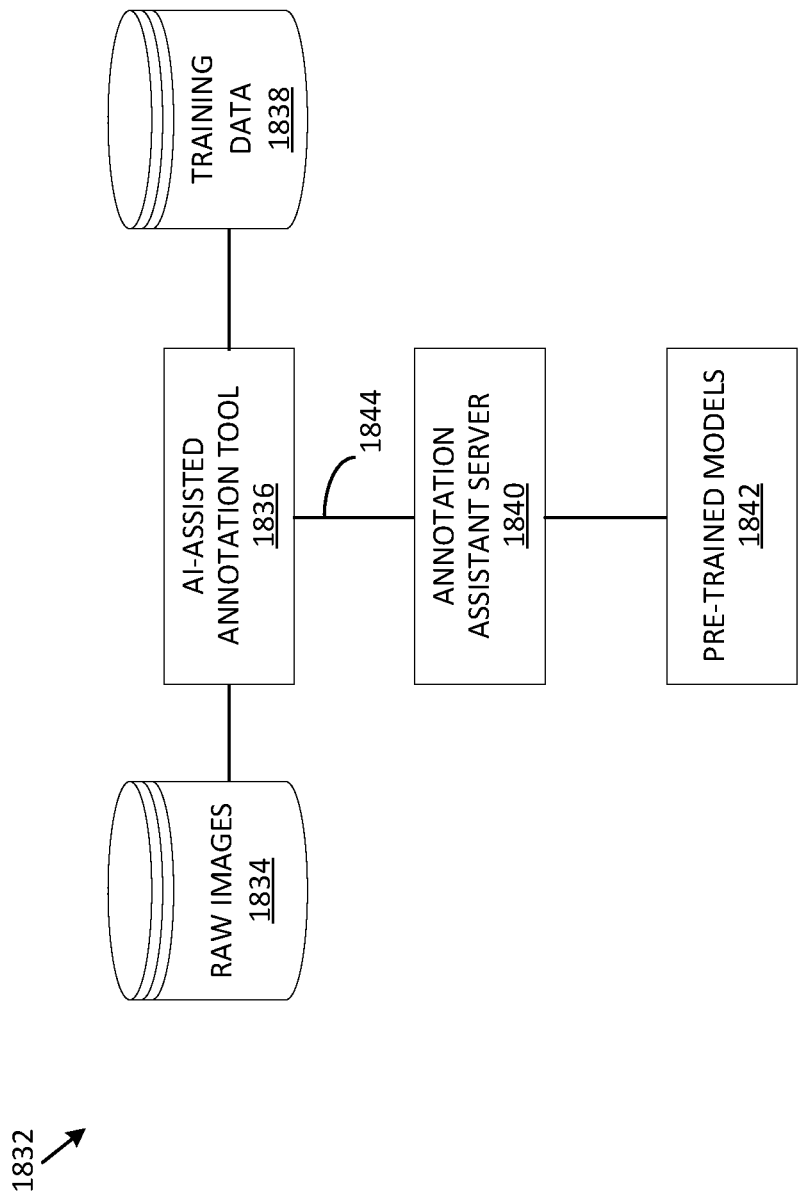

In at least one embodiment, training pipelines 1704 may include AI-assisted annotation, as described in more detail herein with respect to at least FIG. 18B. In at least one embodiment, labeled data 1612 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1608 (or other data type used by machine learning models), there may be corresponding ground truth data generated by training system 1604. In at least one embodiment, AI-assisted annotation may be performed as part of deployment pipelines 1710; either in addition to, or in lieu of AI-assisted annotation included in training pipelines 1704. In at least one embodiment, system 1700 may include a multi-layer platform that may include a software layer (e.g., software 1618) of diagnostic applications (or other application types) that may perform one or more medical imaging and diagnostic functions. In at least one embodiment, system 1700 may be communicatively coupled to (e.g., via encrypted links) PACS server networks of one or more facilities. In at least one embodiment, system 1700 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1602). In at least one embodiment, applications may then call or execute one or more services 1620 for performing compute, AI, or visualization tasks associated with respective applications, and software 1618 and/or services 1620 may leverage hardware 1622 to perform processing tasks in an effective and efficient manner.

In at least one embodiment, deployment system 1606 may execute deployment pipelines 1710. In at least one embodiment, deployment pipelines 1710 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1710 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1710 depending on information desired from data generated by a device. In at least one embodiment, where detections of anomalies are desired from an MRI machine, there may be a first deployment pipeline 1710, and where image enhancement is desired from output of an MRI machine, there may be a second deployment pipeline 1710.

In at least one embodiment, an image generation application may include a processing task that includes use of a machine learning model. In at least one embodiment, a user may desire to use their own machine learning model, or to select a machine learning model from model registry 1624. In at least one embodiment, a user may implement their own machine learning model or select a machine learning model for inclusion in an application for performing a processing task. In at least one embodiment, applications may be selectable and customizable, and by defining constructs of applications, deployment, and implementation of applications for a particular user are presented as a more seamless user experience. In at least one embodiment, by leveraging other features of system 1700—such as services 1620 and hardware 1622—deployment pipelines 1710 may be even more user friendly, provide for easier integration, and produce more accurate, efficient, and timely results.

In at least one embodiment, deployment system 1606 may include a user interface 1714 (e.g., a graphical user interface, a web interface, etc.) that may be used to select applications for inclusion in deployment pipeline(s) 1710, arrange applications, modify, or change applications or parameters or constructs thereof, use and interact with deployment pipeline(s) 1710 during set-up and/or deployment, and/or to otherwise interact with deployment system 1606. In at least one embodiment, although not illustrated with respect to training system 1604, user interface 1714 (or a different user interface) may be used for selecting models for use in deployment system 1606, for selecting models for training, or retraining, in training system 1604, and/or for otherwise interacting with training system 1604.

In at least one embodiment, pipeline manager 1712 may be used, in addition to an application orchestration system 1728, to manage interaction between applications or containers of deployment pipeline(s) 1710 and services 1620 and/or hardware 1622. In at least one embodiment, pipeline manager 1712 may be configured to facilitate interactions from application to application, from application to service 1620, and/or from application or service to hardware 1622. In at least one embodiment, although illustrated as included in software 1618, this is not intended to be limiting, and in some examples (e.g., as illustrated in FIG. 15) pipeline manager 1712 may be included in services 1620. In at least one embodiment, application orchestration system 1728 (e.g., Kubernetes, DOCKER, etc.) may include a container orchestration system that may group applications into containers as logical units for coordination, management, scaling, and deployment. In at least one embodiment, by associating applications from deployment pipeline(s) 1710 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1712 and application orchestration system 1728. In at least one embodiment, so long as an expected input and/or output of each container or application is known by a system (e.g., based on constructs of applications or containers), application orchestration system 1728 and/or pipeline manager 1712 may facilitate communication among and between, and sharing of resources among and between, each of applications or containers. In at least one embodiment, because one or more of applications or containers in deployment pipeline(s) 1710 may share same services and resources, application orchestration system 1728 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1728) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1620 leveraged by and shared by applications or containers in deployment system 1606 may include compute services 1716, AI services 1718, visualization services 1720, and/or other service types. In at least one embodiment, applications may call (e.g., execute) one or more of services 1620 to perform processing operations for an application. In at least one embodiment, compute services 1716 may be leveraged by applications to perform super-computing or other high-performance computing (HPC) tasks. In at least one embodiment, compute service(s) 1716 may be leveraged to perform parallel processing (e.g., using a parallel computing platform 1730) for processing data through one or more of applications and/or one or more tasks of a single application, substantially simultaneously. In at least one embodiment, parallel computing platform 1730 (e.g., NVIDIA's CUDA) may enable general purpose computing on GPUs (GPGPU) (e.g., GPUs 1722). In at least one embodiment, a software layer of parallel computing platform 1730 may provide access to virtual instruction sets and parallel computational elements of GPUs, for execution of compute kernels. In at least one embodiment, parallel computing platform 1730 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1730 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1718 may be leveraged to perform inferencing services for executing machine learning model(s) associated with applications (e.g., tasked with performing one or more processing tasks of an application). In at least one embodiment, AI services 1718 may leverage AI system 1724 to execute machine learning model(s) (e.g., neural networks, such as CNNs) for segmentation, reconstruction, object detection, feature detection, classification, and/or other inferencing tasks. In at least one embodiment, applications of deployment pipeline(s) 1710 may use one or more of output models 1616 from training system 1604 and/or other models of applications to perform inference on imaging data. In at least one embodiment, two or more examples of inferencing using application orchestration system 1728 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1728 may distribute resources (e.g., services 1620 and/or hardware 1622) based on priority paths for different inferencing tasks of AI services 1718.

In at least one embodiment, shared storage may be mounted to AI services 1718 within system 1700. In at least one embodiment, shared storage may operate as a cache (or other storage device type) and may be used to process inference requests from applications. In at least one embodiment, when an inference request is submitted, a request may be received by a set of API instances of deployment system 1606, and one or more instances may be selected (e.g., for best fit, for load balancing, etc.) to process a request. In at least one embodiment, to process a request, a request may be entered into a database, a machine learning model may be located from model registry 1624 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1712) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s) and/or DPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<13 min). In at least one embodiment, model execution times may be measured from requesting institution or entity and may include partner network traversal time, as well as execution on an inference service.

In at least one embodiment, transfer of requests between services 1620 and inference applications may be hidden behind a software development kit (SDK), and robust transport may be provided through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1726, and an inference service may perform inferencing on a GPU.

In at least one embodiment, visualization services 1720 may be leveraged to generate visualizations for viewing outputs of applications and/or deployment pipeline(s) 1710. In at least one embodiment, GPUs 1722 may be leveraged by visualization services 1720 to generate visualizations. In at least one embodiment, rendering effects, such as ray-tracing, may be implemented by visualization services 1720 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1720 may include an internal visualizer, cinematics, and/or other rendering or image processing capabilities or functionality (e.g., ray tracing, rasterization, internal optics, etc.).

In at least one embodiment, hardware 1622 may include GPUs 1722, AI system 1724, cloud 1726, and/or any other hardware used for executing training system 1604 and/or deployment system 1606. In at least one embodiment, GPUs 1722 (e.g., NVIDIA's TESLA and/or QUADRO GPUs) may include any number of GPUs that may be used for executing processing tasks of compute services 1716, AI services 1718, visualization services 1720, other services, and/or any of features or functionality of software 1618. For example, with respect to AI services 1718, GPUs 1722 may be used to perform pre-processing on imaging data (or other data types used by machine learning models), post-processing on outputs of machine learning models, and/or to perform inferencing (e.g., to execute machine learning models). In at least one embodiment, cloud 1726, AI system 1724, and/or other components of system 1700 may use GPUs 1722. In at least one embodiment, cloud 1726 may include a GPU-optimized platform for deep learning tasks. In at least one embodiment, AI system 1724 may use GPUs, and cloud 1726—or at least a portion tasked with deep learning or inferencing—may be executed using one or more AI systems 1724. As such, although hardware 1622 is illustrated as discrete components, this is not intended to be limiting, and any components of hardware 1622 may be combined with, or leveraged by, any other components of hardware 1622.

In at least one embodiment, AI system 1724 may include a purpose-built computing system (e.g., a super-computer or an HPC) configured for inferencing, deep learning, machine learning, and/or other artificial intelligence tasks. In at least one embodiment, AI system 1724 (e.g., NVIDIA's DGX)

may include GPU-optimized software (e.g., a software stack) that may be executed using a plurality of GPUs 1722, in addition to DPUs, CPUs, RAM, storage, and/or other components, features, or functionality. In at least one embodiment, one or more AI systems 1724 may be implemented in cloud 1726 (e.g., in a data center) for performing some or all of AI-based processing tasks of system 1700.

In at least one embodiment, cloud 1726 may include a GPU-accelerated infrastructure (e.g., NVIDIA's NGC) that may provide a GPU-optimized platform for executing processing tasks of system 1700. In at least one embodiment, cloud 1726 may include an AI system(s) 1724 for performing one or more of AI-based tasks of system 1700 (e.g., as a hardware abstraction and scaling platform). In at least one embodiment, cloud 1726 may integrate with application orchestration system 1728 leveraging multiple GPUs to enable seamless scaling and load balancing between and among applications and services 1620. In at least one embodiment, cloud 1726 may tasked with executing at least some of services 1620 of system 1700, including compute services 1716, AI services 1718, and/or visualization services 1720, as described herein. In at least one embodiment, cloud 1726 may perform small and large batch inference (e.g., executing NVIDIA's TENSOR RT), provide an accelerated parallel computing API and platform 1730 (e.g., NVIDIA's CUDA), execute application orchestration system 1728 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1700.

FIG. 18A illustrates a data flow diagram for a process 1800 to train, retrain, or update a machine learning model, in accordance with at least one embodiment. In at least one embodiment, process 1800 may be executed using, as a non-limiting example, system 1700 of FIG. 17. In at least one embodiment, process 1800 may leverage services 1620 and/or hardware 1622 of system 1700, as described herein. In at least one embodiment, refined models 1812 generated by process 1800 may be executed by deployment system 1606 for one or more containerized applications in deployment pipelines 1710.

In at least one embodiment, model training 1614 may include retraining or updating an initial model 1804 (e.g., a pre-trained model) using new training data (e.g., new input data, such as customer dataset 1806, and/or new ground truth data associated with input data). In at least one embodiment, to retrain, or update, initial model 1804, output or loss layer(s) of initial model 1804 may be reset, or deleted, and/or replaced with an updated or new output or loss layer(s). In at least one embodiment, initial model 1804 may have previously fine-tuned parameters (e.g., weights and/or biases) that remain from prior training, so training or retraining 1614 may not take as long or require as much processing as training a model from scratch. In at least one embodiment, during model training 1614, by having reset or replaced output or loss layer(s) of initial model 1804, parameters may be updated and re-tuned for a new data set based on loss calculations associated with accuracy of output or loss layer(s) at generating predictions on new, customer dataset 1806 (e.g., image data 1608 of FIG. 16).

In at least one embodiment, pre-trained models 1706 may be stored in a data store, or registry (e.g., model registry 1624 of FIG. 16). In at least one embodiment, pre-trained models 1706 may have been trained, at least in part, at one or more facilities other than a facility executing process 1800. In at least one embodiment, to protect privacy and rights of patients, subjects, or clients of different facilities, pre-trained models 1706 may have been trained, on-premise, using customer or patient data generated on-premise. In at least one embodiment, pre-trained models 1706 may be trained using cloud 1726 and/or other hardware 1622, but confidential, privacy protected patient data may not be transferred to, used by, or accessible to any components of cloud 1726 (or other off premise hardware). In at least one embodiment, where a pre-trained model 1706 is trained at using patient data from more than one facility, pre-trained model 1706 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1706 on-premise and/or off premise, such as in a datacenter or other cloud computing infrastructure.

In at least one embodiment, when selecting applications for use in deployment pipelines 1710, a user may also select machine learning models to be used for specific applications. In at least one embodiment, a user may not have a model for use, so a user may select a pre-trained model 1706 to use with an application. In at least one embodiment, pre-trained model 1706 may not be optimized for generating accurate results on customer dataset 1806 of a facility of a user (e.g., based on patient diversity, demographics, types of medical imaging devices used, etc.). In at least one embodiment, prior to deploying pre-trained model 1706 into deployment pipeline 1710 for use with an application(s), pre-trained model 1706 may be updated, retrained, and/or fine-tuned for use at a respective facility.

In at least one embodiment, a user may select pre-trained model 1706 that is to be updated, retrained, and/or fine-tuned, and pre-trained model 1706 may be referred to as initial model 1804 for training system 1604 within process 1800. In at least one embodiment, customer dataset 1806 (e.g., imaging data, genomics data, sequencing data, or other data types generated by devices at a facility) may be used to perform model training 1614 (which may include, without limitation, transfer learning) on initial model 1804 to generate refined model 1812. In at least one embodiment, ground truth data corresponding to customer dataset 1806 may be generated by training system 1604. In at least one embodiment, ground truth data may be generated, at least in part, by clinicians, scientists, doctors, practitioners, at a facility (e.g., as labeled clinic data 1612 of FIG. 16).

In at least one embodiment, AI-assisted annotation 1610 may be used in some examples to generate ground truth data. In at least one embodiment, AI-assisted annotation 1610 (e.g., implemented using an AI-assisted annotation SDK) may leverage machine learning models (e.g., neural networks) to generate suggested or predicted ground truth data for a customer dataset. In at least one embodiment, user 1810 may use annotation tools within a user interface (a graphical user interface (GUI)) on computing device 1808.

In at least one embodiment, user 1810 may interact with a GUI via computing device 1808 to edit or fine-tune (auto)annotations. In at least one embodiment, a polygon editing feature may be used to move vertices of a polygon to more accurate or fine-tuned locations.

In at least one embodiment, once customer dataset 1806 has associated ground truth data, ground truth data (e.g., from AI-assisted annotation, manual labeling, etc.) may be used by during model training 1614 to generate refined model 1812. In at least one embodiment, customer dataset 1806 may be applied to initial model 1804 any number of times, and ground truth data may be used to update parameters of initial model 1804 until an acceptable level of accuracy is attained for refined model 1812. In at least one embodiment, once refined model 1812 is generated, refined model 1812 may be deployed within one or more deployment pipelines 1710 at a facility for performing one or more processing tasks with respect to medical imaging data.

In at least one embodiment, refined model 1812 may be uploaded to pre-trained models 1706 in model registry 1624 to be selected by another facility. In at least one embodiment, his process may be completed at any number of facilities such that refined model 1812 may be further refined on new datasets any number of times to generate a more universal model.

FIG. 18B is an example illustration of a client-server architecture 1832 to enhance annotation tools with pre-trained annotation models, in accordance with at least one embodiment. In at least one embodiment, AI-assisted annotation tools 1836 may be instantiated based on a client-server architecture 1832. In at least one embodiment, annotation tools 1836 in imaging applications may aid radiologists, for example, identify organs and abnormalities. In at least one embodiment, imaging applications may include software tools that help user 1810 to identify, as a non-limiting example, a few extreme points on a particular organ of interest in raw images 1834 (e.g., in a 3D MRI or CT scan) and receive auto-annotated results for all 2D slices of a particular organ. In at least one embodiment, results may be stored in a data store as training data 1838 and used as (for example and without limitation) ground truth data for training. In at least one embodiment, when computing device 1808 sends extreme points for AI-assisted annotation 1610, a deep learning model, for example, may receive this data as input and return inference results of a segmented organ or abnormality. In at least one embodiment, pre-instantiated annotation tools, such as AI-Assisted Annotation Tool 1836B in FIG. 18B, may be enhanced by making API calls (e.g., API Call 1844) to a server, such as an Annotation Assistant Server 1840 that may include a set of pre-trained models 1842 stored in an annotation model registry, for example. In at least one embodiment, an annotation model registry may store pre-trained models 1842 (e.g., machine learning models, such as deep learning models) that are pre-trained to perform AI-assisted annotation on a particular organ or abnormality. These models may be further updated by using training pipelines 1704. In at least one embodiment, pre-installed annotation tools may be improved over time as new labeled clinic data 1612 is added.

Such components may be used to generate synthetic data imitating failure cases in a network training process, which may help to improve performance of the network while limiting the amount of synthetic data to avoid overfitting.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but may be more when so indicated either explicitly or by context. Further, unless stated otherwise or otherwise clear from context, phrase "based on" means "based at least in part on" and not "based solely on."

Operations of processes described herein may be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data may be accomplished in a variety of ways such as by receiving data as a parameter of a function call or a call to an application programming interface. In some implementations, process of obtaining, acquiring, receiving, or inputting analog or digital data may be accomplished by transferring data via a serial or parallel interface. In another implementation, process of obtaining, acquiring, receiving, or inputting analog or digital data may be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data may be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   receiving, by an application hosting platform, a request to modify a shader cache associated with an application based on a set of compiled shader programs for the application, wherein at least one compiled shader program of the set of compiled shader programs was compiled by a first client device while running a first instance of the application;
   modifying, by the application hosting platform, the shader cache for the application to produce a modified shader cache that includes the at least one compiled shader program of the set of compiled shader programs; and
   responsive to modifying the shader cache, providing, by the application hosting platform, an additional set of compiled shader programs from the modified shader cache to a second client device that has initialized a second instance of the application, wherein the additional set of compiled shader programs comprises the at least one compiled shader program of the set of compiled shader programs.

2. The method of claim 1, wherein modifying the shader cache for the application comprises:
determining that the at least one compiled shader program does not correspond to a compiled shader program of the shader cache; and
adding the at least one compiled shader program to the shader cache.

3. The method of claim 1, further comprising:
detecting a discrepancy between the at least one compiled shader program and a corresponding compiled shader program of the shader cache; and
replacing the compiled shader program of the shader cache with the at least one compiled shader program.

4. The method of claim 1, further comprising:
responsive to determining that the at least one compiled shader program corresponds to a compiled shader program stored at a temporary buffer for the shader cache, updating a counter associated with the compiled shader program at the temporary buffer.

5. The method of claim 4, further comprising:
responsive to determining that the at least one compiled shader program does not correspond to a compiled shader program stored at the temporary buffer, storing the at least one compiled shader program at the temporary buffer; and
initializing an additional counter associated with the at least one compiled shader program.

6. The method of claim 4, wherein the shader cache for the application is modified responsive to determining that the counter associated with the at least one compiled shader program exceeds a threshold value.

7. The method of claim 1, wherein each of the additional set of compiled shader programs from the modified shader cache satisfies one or more conditions associated with the second client device.

8. The method of claim 7, wherein the one or more conditions associated with the second client device comprise at least one of a hardware parameter or a software parameter corresponding to the second client device.

9. The method of claim 1, further comprising:
obtaining a source code for an additional shader program associated with the application;
generating a compiled version of the additional shader program; and
adding the compiled version of the additional shader program to the shader cache associated with the application.

10. The method of claim 9, wherein the source code for the additional shader program is obtained responsive to determining that at least one of a hardware state or a software state of one or more of the first client device or the second client device has been modified from a first version to a second version, and wherein the compiled version of the additional shader program is compatible with the second version of the at least one of the hardware state or the software state.

11. The method of claim 1, wherein at least one of the first client device or the second client device comprises a virtual machine instantiated using a cloud computing environment.

12. A non-transitory computer-readable medium storing instructions thereon, wherein the instructions, when executed by a processing device, cause the processing device to:
receive a request to modify an shader cache associated with an application based on a set of compiled shader programs for the application, wherein at least one compiled shader program of the set of compiled shader programs was compiled by a first client device while running a first instance of the application;
modify the shader cache for the application to produce a modified shader cache that includes the at least one compiled shader program of the set of compiled shader programs;
and
responsive to modifying the shader cache, provide an additional set of compiled shader programs from the modified shader cache to a second client device that has initialized a second instance of the application, wherein the additional set of compiled shader programs comprises the at least one compiled shader program of the set of compiled shader programs.

13. The non-transitory computer-readable medium of claim 12, wherein to modify the shader cache for the application, the processing device is to:
determine that the at least one compiled shader program does not correspond to a compiled shader program of the shader cache; and
add the at least one compiled shader program to the shader cache.

14. The non-transitory computer-readable medium of claim 12, wherein the processing device is further to:
detect a discrepancy between the at least one compiled shader program and a corresponding compiled shader program of the shader cache; and
replace the compiled shader program of the shader cache with the at least one compiled shader program.

15. The non-transitory computer-readable medium of claim 12, wherein the processing device is further to:
responsive to determining that the at least one compiled shader program corresponds to a compiled shader program stored at a temporary buffer for the shader cache, update a counter associated with the compiled shader program at the temporary buffer.

16. The non-transitory computer-readable medium of claim 15, wherein the processing device is further to:
responsive to determining that the at least one compiled shader program does not correspond to a compiled shader program stored at the temporary buffer, store the at least one compiled shader program at the temporary buffer; and
initialize an additional counter associated with the at least one compiled shader program.

17. The non-transitory computer-readable medium of claim 15, wherein the shader cache for the application is modified responsive to determining that the counter associated with the at least one compiled shader program exceeds a threshold value.

18. The non-transitory computer-readable medium of claim 12, wherein each of the additional set of compiled shader programs from the modified shader cache satisfies one or more conditions associated with the second client device.

19. The non-transitory computer-readable medium of claim 18, wherein the one or more conditions associated with the second client device comprise at least one of a hardware parameter or a software parameter corresponding to the second client device.

20. A system comprising:

a memory device; and a processing device coupled to the memory device, the processing device to perform operations comprising:

receiving, by an application hosting platform, a request to modify a shader cache associated with an application based on a set of compiled shader programs for the application, wherein at least one compiled shader program of the set of compiled shader programs was compiled by a first client device while running a first instance of the application;

modifying, by the application hosting platform, the shader cache for the application to produce a modified shader cache that includes the at least one compiled shader program of the set of compiled shader programs;

and responsive to modifying the shader cache, providing, by the application hosting platform, an additional set of compiled shader programs from the modified shader cache to a second client device that has initialized a second instance of the application, wherein the additional set of compiled shader programs comprises the at least one compiled shader program of the set of compiled shader programs.

* * * * *